(12) United States Patent
Miyazawa et al.

(10) Patent No.: US 10,985,354 B2
(45) Date of Patent: Apr. 20, 2021

(54) SEPARATOR FOR ELECTRICITY STORAGE DEVICES, ELECTRODE BODY USING SAME, AND ELECTRICITY STORAGE DEVICE

(71) Applicant: Asahi Kasei Kabushiki Kaisha, Tokyo (JP)

(72) Inventors: Hiroshi Miyazawa, Tokyo (JP); Masanori Nakazawa, Tokyo (JP); Masatoshi Ikemi, Tokyo (JP); Naoki Machida, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 345 days.

(21) Appl. No.: 15/776,354

(22) PCT Filed: Nov. 18, 2016

(86) PCT No.: PCT/JP2016/084327
§ 371 (c)(1),
(2) Date: May 15, 2018

(87) PCT Pub. No.: WO2017/086466
PCT Pub. Date: May 26, 2017

(65) Prior Publication Data
US 2020/0259148 A1 Aug. 13, 2020

(30) Foreign Application Priority Data
Aug. 24, 2016 (JP) .............................. JP2016-163955

(51) Int. Cl.
*H01M 2/16* (2006.01)
*C08F 220/06* (2006.01)
(Continued)

(52) U.S. Cl.
CPC .......... *H01M 2/168* (2013.01); *C08F 220/06* (2013.01); *C08F 220/14* (2013.01);
(Continued)

(58) Field of Classification Search
CPC .. H01M 2/1653; H01M 2/1673; H01M 2/168; H01M 2/1686; H01M 10/0525;
(Continued)

(56) References Cited

U.S. PATENT DOCUMENTS 6,468,698 B1 10/2002 Hamano et al.
2001/0038941 A1 11/2001 Sunano
(Continued)

FOREIGN PATENT DOCUMENTS

JP H10-275633 A 10/1998
JP 2001-176483 A 6/2001
(Continued)

OTHER PUBLICATIONS

EPO website (www.espacenet.com) machine translation of the detailed description of JP 5708872B1. (Year: 2015).*
(Continued)

*Primary Examiner* — Gregg Cantelmo
(74) *Attorney, Agent, or Firm* — Morgan, Lewis & Bockius LLP

(57) ABSTRACT

This separator for electricity storage devices comprises a porous base and a thermoplastic polymer layer that is arranged in at least a part of the outermost surface of at least one surface of the porous base, and wherein: a thermoplastic polymer contained in the thermoplastic polymer layer contains a copolymer that has, as a monomer unit, an ethylenically unsaturated monomer (P) having a polyalkylene glycol group; and the thermoplastic polymer layer contains the thermoplastic polymer in an amount of more than 3% by
(Continued)

mass but 100% by mass or less if the thermoplastic polymer layer is taken as 100% by mass.

18 Claims, 4 Drawing Sheets

(51) Int. Cl.
| | |
|---|---|
| C08F 220/14 | (2006.01) |
| C08F 265/06 | (2006.01) |
| C08J 3/24 | (2006.01) |
| H01M 4/62 | (2006.01) |
| H01M 10/0525 | (2010.01) |
| H01M 10/0565 | (2010.01) |
| H01G 11/52 | (2013.01) |
| H01M 4/02 | (2006.01) |

(52) U.S. Cl.
CPC .............. *C08F 265/06* (2013.01); *C08J 3/245* (2013.01); *H01G 11/52* (2013.01); *H01M 2/1653* (2013.01); *H01M 2/1686* (2013.01); *H01M 4/622* (2013.01); *H01M 10/0525* (2013.01); *H01M 10/0565* (2013.01); *H01M 2004/021* (2013.01); *H01M 2004/027* (2013.01); *H01M 2004/028* (2013.01)

(58) Field of Classification Search
CPC .............. H01M 10/0565; H01M 4/622; H01M 2004/021; H01M 2004/027; H01M 2004/028; H01G 11/52; C08F 220/06; C08F 220/14; C08F 265/06; C08J 3/245
See application file for complete search history.

(56) References Cited

U.S. PATENT DOCUMENTS

| | | | |
|---|---|---|---|
| 2001/0053475 A1 | 12/2001 | Ying et al. | |
| 2004/0101757 A1* | 5/2004 | Kii | ..................... H01M 2/1673 |
| | | | 429/253 |
| 2008/0003506 A1* | 1/2008 | Suzuki | ................. C08F 220/44 |
| | | | 429/314 |
| 2010/0325877 A1 | 12/2010 | Murata et al. | |
| 2011/0152388 A1 | 6/2011 | Niitani et al. | |
| 2013/0202944 A1* | 8/2013 | Song | .................... H01M 2/1673 |
| | | | 429/144 |
| 2013/0330590 A1* | 12/2013 | Toyoda | ............... H01M 2/1653 |
| | | | 429/142 |
| 2014/0004400 A1* | 1/2014 | Ueki | ................... H01M 2/1646 |
| | | | 429/94 |
| 2017/0263907 A1* | 9/2017 | Ameyama | ............. C08F 212/08 |

FOREIGN PATENT DOCUMENTS

| | | | |
|---|---|---|---|
| JP | 2001-283927 A | | 10/2001 |
| JP | 2002-194133 A | | 7/2002 |
| JP | 2002-241533 A | | 8/2002 |
| JP | 2003-096232 A | | 4/2003 |
| JP | 2003-100349 A | | 4/2003 |
| JP | 2003-268053 A | | 9/2003 |
| JP | 2007-059271 A | | 3/2007 |
| JP | 2009-110683 A | | 5/2009 |
| JP | 5354735 B2 | | 11/2013 |
| JP | 5708872 B1 | | 4/2015 |
| JP | 2015061900 A | * | 4/2015 |
| JP | 2015-128059 A | | 7/2015 |
| JP | 2016-107642 A | | 6/2016 |
| WO | 2014/103791 A1 | | 7/2014 |
| WO | 2016/110894 A1 | | 7/2016 |

OTHER PUBLICATIONS

EPO website (www.espacenet.com) machine translation of the detailed description of JP 2015-061900A (Year: 2015).*
Supplementary European Search Report issued in corresponding European Patent Application No. 16866466.2 dated Jul. 20, 2018.
International Search Report issued in corresponding International Patent Application No. PCT/JP2016/084327 dated Dec. 27, 2016.
International Preliminary Report on Patentability and Written Opinion issued in corresponding PCT/JP2016/084327 dated May 31, 2018.

* cited by examiner

SEPARATOR FOR ELECTRICITY STORAGE DEVICES, ELECTRODE BODY USING SAME, AND ELECTRICITY STORAGE DEVICE

TECHNICAL FIELD

The present invention relates to a separator for an electricity storage device.

BACKGROUND ART

Electricity storage devices such as lithium-ion secondary batteries have been undergoing active development in recent years. An electricity storage device is usually designed with a microporous film (separator) between positive and negative electrodes. The separator has the function of preventing direct contact between the positive and negative electrodes, while also allowing ions to pass through the electrolytic solution that is held in the microspores.

A conventional separator must exhibit safety features including rapid termination of battery reaction upon abnormal heating (fuse characteristic), and shape maintenance even at high temperatures to prevent the danger of the positive electrode substance and negative electrode substance undergoing direct reaction (short circuit characteristic).

Patent Literature (PTL) 1 describes a technique for forming a separator comprising a porous layer that contains inorganic particles and a resin binder on a polyolefin microporous film, the purpose being to produce a battery with a high level of safety.

In addition to improved safety, a separator must exhibit high adhesion with the electrodes, from the viewpoint of obtaining uniform charge-discharge current and suppressing lithium dendrites.

Increasing the state of close bonding between the separator and the battery electrodes helps maintain a uniform charge-discharge current and makes lithium dendrites less likely to be deposited, and the charge-discharge cycle life can be lengthened as a result.

In consideration of the above, PTL 2 discloses a technique in which an aqueous dispersion of a particulate acrylic copolymer is supported on a substrate, in an attempt to impart adhesiveness to the separator. A technique has also been disclosed for supporting an acrylic binder on a polyolefin microporous film comprising a porous layer that includes inorganic particles and a resin binder, for the purpose of increasing safety.

It has also been proposed to either place an alkylene glycol-derived compound between the electrodes and the separator, or to incorporate it into the separator substrate, in order to impart various properties to the separator while ensuring electrical characteristics and safety for the lithium-ion secondary battery (PTLs 3 to 10).

Polyalkyleneglycol groups have been known in the prior art as functional groups that increase separator ion permeability, and such groups are commonly used in an organic solvent if they are to be incorporated into a copolymer for a non-aqueous electrolytic solution. Emulsion polymerization is the common method employed to obtain aqueous copolymers. Because polyalkyleneglycol groups are hydrophilic, when they are used in large amounts for emulsion polymerization they can cause problems, such as preventing formation of a particulate copolymer aqueous dispersion or interfering with removal of water in the drying step.

CITATION LIST

Patent Literature

[PTL 1] Japanese Patent Publication No. 5354735
[PTL 2] Japanese Unexamined Patent Publication No. 2015-128059
[PTL 3] Japanese Unexamined Patent Publication HEI No. H10(1998)-275633
[PTL 4] Japanese Unexamined Patent Publication No. 2001-283927
[PTL 5] Japanese Unexamined Patent Publication No. 2002-194133
[PTL 6] Japanese Unexamined Patent Publication No. 2002-241533
[PTL 7] Japanese Unexamined Patent Publication No. 2007-59271
[PTL 8] Japanese Unexamined Patent Publication No. 2003-96232
[PTL 9] Japanese Unexamined Patent Publication No. 2003-100349
[PTL 10] Japanese Patent Publication No. 5708872

DISCLOSURE OF THE INVENTION

Problems to be Solved by the Invention

Problems are encountered with the polyolefin microporous film supporting an acrylic binder described in PTL 2, such as low swelling of the acrylic binder and low ion permeability when used as a separator.

PTL 3 describes coating a separator substrate with an adhesive containing polyvinylidene fluoride or polyvinyl alcohol, an ionic conductive polymer having one or more ethylene oxide groups in the molecule, and an organic solvent such as N-methylpyrrolidone (NMP), stacking the separator with electrodes before the adhesive has dried to prepare a laminated body, and then evaporating off the organic solvent and injecting a non-aqueous electrolytic solution into the laminated body to fabricate a battery.

However, since the separator described in PTL 3 is laminated on the electrodes while the polymer and organic solvent still remain in the adhesive (that is, in a gel state), it is in need of improvement from the standpoint of handling properties and dry adhesiveness. Problems also remain from the viewpoint of the heat resistance of the separator. Moreover, the environmental load resulting from the production steps is considerable since an organic solvent is used.

PTL 4 describes housing a wound laminate formed of electrodes and a separator in an exterior body, injecting into the exterior body a pregel comprising an electrolyte salt-containing non-aqueous electrolytic solution and ethyleneglycol diacrylate as a polymer precursor, so that the pregel is situated between the separator and the electrodes, and then heating the pregel to induce crosslinking and polymerization to form a gel, thereby integrating the separator and the electrodes.

In PTL 4, however, thermal polymerization of the pregel is carried out after injection of the electrolytic solution, and therefore adhesion with the electrodes is poor with the separator alone, and there is still need of improvement in terms of battery productivity.

PTL 5 describes a porous film made of a resin composition comprising a polyolefin resin, and polyethyleneglycol dimethacrylate as a resin with affinity for electrolytic solutions, as well as a separator using the same.

However, the resin composition in PTL 5 is not coated onto a substrate but instead is used for formation of the separator substrate itself, and therefore this disclosure does not deal with the adhesiveness of the separator for the electrodes, or with reduction in ion permeability caused by situating a coated film on a separator substrate. Reduction in the ion permeability of the separator is a factor inhibiting increased output and longer life for an on-vehicle lithium-ion secondary battery.

PTLs 6, 8 and 9 propose forming a polymer gel electrolyte on a separator substrate in order to provide the separator itself with adhesiveness for electrodes, and specifically, (i) a method of supporting a polyether unit-containing polymer on a separator substrate and then contacting the polymer with a non-aqueous electrolytic solution containing an organic solvent and an electrolyte salt, to form a polymer gel electrolyte, or (ii) a method of supporting a polyether unit-containing polymer and an electrolyte salt on a substrate and then contacting the polymer and the electrolyte salt with an organic solvent as the non-aqueous electrolytic solution to form a polymer gel electrolyte.

However, because the polyether unit-containing polymers in PTLs 6, 8 and 9 are caused to swell in the organic solvent to form a polymer gel electrolyte, and since these publications contain no specific description of forms other than gels or units other than polyethers, the problems of handleability, degree of environmental load and heat resistance of the separator remain.

PTL 7 describes supporting a particulate copolymer on a separator substrate, the copolymer having a polyfunctional monomer such as ethyleneglycol diacrylate as a copolymerizing component.

PTL 7, however, nowhere mentions the use of polyethyleneglycol dimethacrylate as a comonomer, nor are the polyalkyleneglycol groups in the particulate copolymer examined in any way, and there is still room for improvement in the ion permeability and heat resistance of the separator that is obtained.

PTL 10 describes coating a negative electrode or a separator with a resin composition containing an inorganic filler and polymer particles formed from a first monomer with an acidic functional group, a second monomer with an amide group and a third monomer with a polyalkyleneglycol group, to form a protective layer on the negative electrode or separator (see Synthesis Example 6, Formulation Example 6, Example 8 and Example 16).

However, the polymer particles described in PTL 10 are only added in a trace amount with respect to the inorganic filler for spot bonding of the inorganic filler, and are used to form the protective layer for the negative electrode or separator. In other words, because the polymer is absent on the outermost surface of the separator, it does not lie between and actively bond the electrode and the separator, nor does the polymer itself function as a heat-resistant component.

In light of the current situation, it is an object of the present invention to provide a separator for an electricity storage device with excellent adhesion with electrodes and excellent ion permeability, as well as a separator with excellent heat resistance and ion permeability, and an electricity storage device and lithium-ion secondary battery comprising the separator, that exhibit excellent battery characteristics.

Means for Solving the Problems

The present inventors have completed this invention upon finding that the problems described above can be solved using a copolymer binder comprising an ethylenic unsaturated monomer having a polyalkyleneglycol group as the monomer unit, the binder being used as a resin binder on a separator substrate. Specifically, the present invention provides the following.

[1]

A separator for an electricity storage device comprising a porous substrate and a thermoplastic polymer layer disposed on at least one portion of an outermost surface of at least one side of the porous substrate, wherein a thermoplastic polymer in the thermoplastic polymer layer contains a copolymer with a monomer unit of an ethylenic unsaturated monomer having a polyalkyleneglycol group (P), and the thermoplastic polymer layer contains the thermoplastic polymer at more than 3 weight % and equal to or less than 100 weight %, based on 100 weight % of the thermoplastic polymer layer.

[2]

The separator for an electricity storage device according to [1], wherein the thermoplastic polymer layer is intended to be directly bonded to an electrode.

[3]

The separator for an electricity storage device according to [1] or [2], wherein the substrate comprises at least a polyolefin.

[4]

The separator for an electricity storage device according to any one of [1] to [3], wherein the substrate and the thermoplastic polymer layer are in direct contact.

[5]

The separator for an electricity storage device according to any one of [1] to [4], which comprises the ethylenic unsaturated monomer having a polyalkyleneglycol group (P) at 3 to 50 weight % in terms of the monomer unit in 100 weight % of the thermoplastic polymer composing the thermoplastic polymer layer.

[6]

The separator for an electricity storage device according to [5], wherein the copolymer has, as monomer units, 2 to 50 weight % of the ethylenic unsaturated monomer having a polyalkyleneglycol group (P) and a monomer without a polyalkyleneglycol group that is copolymerizable with the ethylenic unsaturated monomer having a polyalkyleneglycol group (P), with respect to 100 weight % of the copolymer.

[7]

The separator for an electricity storage device according to [6], wherein the monomer without a polyalkyleneglycol group comprises at least one monomer selected from the group consisting of an ethylenic unsaturated monomer with a carboxyl group (b1), an ethylenic unsaturated monomer with an amide group (b2) and an ethylenic unsaturated monomer with a hydroxyl group (b3), at 0.1 to 10 weight % with respect to 100 weight % of the copolymer.

[8]

The separator for an electricity storage device according to [6] or [7], wherein the monomer without a polyalkyleneglycol group comprises a crosslinkable monomer (b4).

[9]

The separator for an electricity storage device according to any one of [6] to [8], wherein the monomer without a polyalkyleneglycol group comprises an ethylenic unsaturated monomer with a cycloalkyl group (A) and a (meth)acrylic acid ester monomer (b5), the (meth)acrylic acid ester monomer (b5) being a (meth)acrylic acid ester monomer comprising an alkyl group of 4 or more carbon atoms and a (meth)acryloyloxy group, and the total content ratio of the ethylenic unsaturated monomer with a cycloalkyl group (A) and the (meth)acrylic acid ester monomer (b5) is 50 to 98 weight % based on 100 weight % of the copolymer.

[10]

The separator for an electricity storage device according to any one of [1] to [9], wherein the thermoplastic polymer is in particulate form.

[11]

The separator for an electricity storage device according to [10], wherein the dispersion ($\sigma^2$) is 0.01 or more and 0.7 or less, as defined by the following formula, using the areas ($S_i$) of Voronoi polygons obtained by Voronoi tessellation of the thermoplastic polymer layer:

$$\sigma^2 = \sum_i \frac{\left(\frac{S_i}{m} - 1\right)^2}{n} \quad \text{[Mathematical Formula 1]}$$

wherein $S_i$ is the measured area of a given Voronoi polygon, m is average of the measured areas of Voronoi polygons, and n is the total number of Voronoi polygons.

[12]

The separator for an electricity storage device according to any one of [1] to [11], wherein the coating area of the thermoplastic polymer layer is 95% or less.

[13]

The separator for an electricity storage device according to any one of [1] to [12], wherein the value of blocking measured of the thermoplastic polymer layer is 20 N/m or less.

[14]

An electrode body comprising a positive electrode, the separator for an electricity storage device according to any one of [1] to [13], and a negative electrode.

[15]

An electricity storage device comprising the electrode body according to [14] and an electrolytic solution.

Effect of the Invention

According to the invention there is provided a separator for an electricity storage device with excellent adhesion for electrodes, ion permeability, and heat resistance. By using a separator according to an embodiment of the invention to produce an electricity storage device and a secondary battery, it is possible to increase the productivity and battery characteristics of the electricity storage device and secondary battery.

MODE FOR CARRYING OUT THE INVENTION

<Separator for an Electricity Storage Device>

Figure 1:
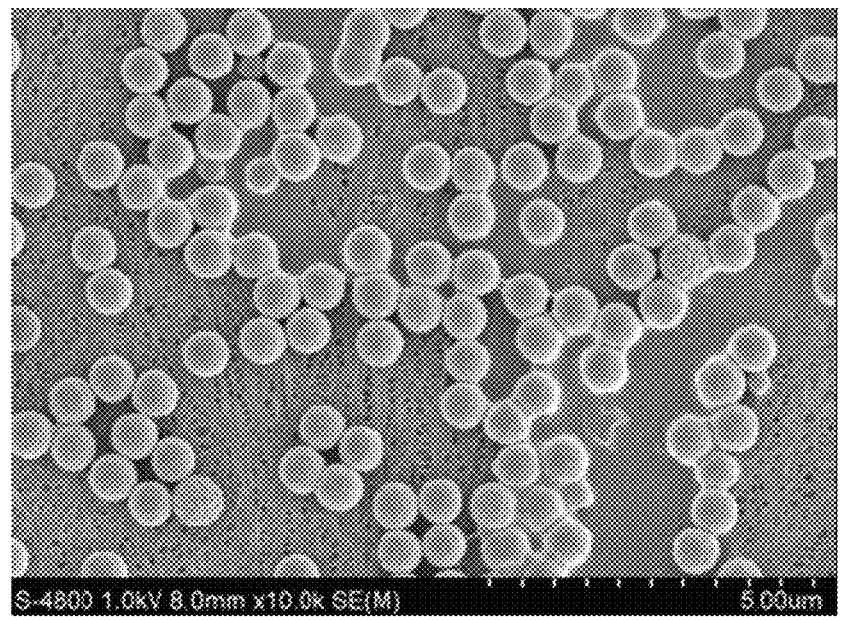
FIG. 1 is an example of a photograph in which a polymer layer surface was observed.

The separator for an electricity storage device of the invention comprises a porous substrate, and a thermoplastic polymer layer disposed on at least a portion of the outermost surface of at least one side of the porous substrate or of a filler porous layer. The separator for an electricity storage device may consist entirely of the porous substrate and the thermoplastic polymer layer, or it may further comprise a filler porous layer. When the separator for an electricity storage device of the invention has a filler porous layer, the filler porous layer is used as the porous substrate, or it is disposed on one or both sides of a polyolefin porous substrate, or it is disposed as an interlayer between laminated porous substrate layers. When the thermoplastic polymer layer is disposed on a side with a filler porous layer, they may be in any mutual positional relationship, and preferably, the filler porous layer and the thermoplastic polymer layer are laminated in that order on the porous substrate.

The members forming the separator for an electricity storage device of the invention, and preferred embodiments of the method for producing the separator for an electricity storage device, will now be explained in detail.

As used herein, the term "(meth)acryl" means "acryl" and the corresponding "methacryl", the term "(meth)acrylate" means "acrylate" and the corresponding "methacrylate", and the term "(meth)acryloyl" means "acryloyl" and the corresponding "methacryloyl".

[Porous Substrate]

The substrate to be used for the embodiment of the invention may be any one that has been used as a separator in the prior art. The substrate is preferably a porous film or porous filler layer that has fine pore diameters, and that is ion-conductive without electrical conductivity, and has high resistance to organic solvents. Examples of such porous films include microporous films composed mainly of polyolefin-based resins (for example, polyethylene, polypropylene, polybutene and polyvinyl chloride) or mixtures or copolymers thereof, microporous films composed mainly of resins such as polyethylene terephthalate, polycycloolefin, polyethersulfone, polyamide, polyimide, polyimideamide, polyaramid, polycycloolefin, nylon and polytetrafluoroethylene, and woven polyolefin-based fibers (woven fabrics), nonwoven fabrics of polyolefin-based fibers, and aggregates of insulating material particles. Preferred among these are polyolefin microporous films composed mainly of polyolefin-based resins, from the viewpoint of excellent coatability of the coating solution when the polymer layer is to be obtained by a coating process, allowing the separator thickness to be further reduced, and of increasing the proportion of active material in the electricity storage device such as a battery, to increase the capacity per volume. The phrase "composed mainly of" as used herein means that it contains the component in an amount exceeding 50 weight %, preferably 75 weight % or greater, more preferably 85 weight % or greater, even more preferably 90 weight % or greater, yet more preferably 95 weight % or greater and most preferably 98 weight % or greater, with 100 weight % also being acceptable.

In the embodiment, the polyolefin resin content of the polyolefin microporous film is not particularly restricted, but from the viewpoint of shutdown performance when used as a separator for an electricity storage device, the porous film preferably comprises a polyolefin resin composition in which the polyolefin resin constitutes between 50 weight % and 100 weight % of the total components composing the porous substrate. The proportion constituted by the polyolefin resin is more preferably between 60 weight % and 100 weight %, and even more preferably between 70 weight % and 100 weight %.

The polyolefin resin is not particularly restricted and may be a polyolefin resin commonly used in extrusion, ejection, inflation or blow molding, and homopolymers, copolymers and multistage polymers of ethylene, propylene, 1-butene, 4-methyl-1-pentene, 1-hexene and 1-octene may be used. Polyolefins selected from the group consisting of these homopolymers and copolymers or multistage polymers may be used alone, or they may be used in admixture.

Typical examples of polyolefin resins include, but are not restricted to, low-density polyethylene, linear low-density polyethylene, medium-density polyethylene, high-density polyethylene, ultrahigh molecular weight polyethylene, isotactic polypropylene, atactic polypropylene, ethylene-propylene random copolymer, polybutene, ethylene-propylene rubber and the like.

The material of the polyolefin porous substrate to be used as the separator for an electricity storage device is most preferably a resin composed mainly of high-density polyethylene, for its low melting point and high strength. Two or more different types of these polyethylenes may also be used in combination to impart flexibility. The polymerization catalyst used for production of the polyethylene is not particularly restricted, and examples include Ziegler-Natta catalysts, Phillips catalysts and metallocene-based catalysts.

For improved heat resistance of the polyolefin porous substrate, it is more preferred to use a porous film composed of a resin composition comprising polypropylene and a polyolefin resin other than polypropylene.

The spatial structure of polypropylene is not restricted, and it may be isotactic polypropylene, syndiotactic polypropylene or atactic polypropylene.

There is no particular restriction on the proportion of polypropylene with respect to the total polyolefins in the polyolefin resin composition, but from the viewpoint of both heat resistance and a satisfactory shutdown function, it is preferably 1 to 35 weight %, more preferably 3 to 20 weight % and even more preferably 4 to 10 weight %.

The polymerization catalyst is also not particularly restricted, and a Ziegler-Natta catalyst or metallocene-based catalyst, for example, may be used.

In such cases, the polyolefin resin other than polypropylene is not restricted and may be a homopolymer or copolymer of an olefin hydrocarbon such as ethylene, 1-butene, 4-methyl-1-pentene, 1-hexene or 1-octene olefin, for example. Specifically, the polyolefin resin other than polypropylene may be polyethylene, polybutene or ethylene-propylene random copolymer.

From the viewpoint of the shutdown property, which represents the degree to which the pores of the polyolefin porous substrate become occluded by heat-fusion, the polyolefin resin other than polypropylene is preferably polyethylene, such as low-density polyethylene, linear low-density polyethylene, medium-density polyethylene, high-density polyethylene or ultrahigh molecular weight polyethylene. Polyethylene with a density of 0.93 g/cm$^3$ or greater as measured according to JIS K 7112 is preferred among these from the viewpoint of strength.

The viscosity-average molecular weight of the polyolefin resin composing the polyolefin porous substrate is not particularly restricted, but is preferably 30,000 or greater and no greater than 12,000,000, more preferably 50,000 or greater and less than 2,000,000, and even more preferably 100,000 or greater and less than 1,000,000. If the viscosity-average molecular weight is 30,000 or greater, the melt tension during melt molding will be increased, resulting in satisfactory moldability, while the strength will also tend to be high due to entanglement between the polymers. If the viscosity-average molecular weight is 12,000,000 or lower, on the other hand, it will be easier to accomplish uniform melt kneading, and the sheet moldability, and especially its thickness stability, will tend to be superior. The viscosity-average molecular weight is also preferably lower than 1,000,000 because the pores will be easily occluded during temperature increase, and a satisfactory shutdown function will tend to be obtained.

For example, instead of using only a polyolefin with a viscosity-average molecular weight of lower than 1,000,000, a mixture of a polyolefin with a viscosity-average molecular weight of 2,000,000 and a polyolefin with a viscosity-average molecular weight of 270,000 may be used, such that the viscosity-average molecular weight of the mixture is lower than 1,000,000.

The polyolefin porous substrate of the embodiment may also contain optional additives. Such additives are not particularly restricted and examples include polymers other than polyolefins; inorganic particles; phenol-based, phosphorus-based and sulfur-based antioxidants; metal soaps such as calcium stearate and zinc stearate; ultraviolet absorbers; light stabilizers; antistatic agents; anti-fogging agents; and color pigments.

The total content of additives is no greater than 20 parts by weight, more preferably no greater than 10 parts by weight and even more preferably no greater than 5 parts by weight, with respect to 100 parts by weight of the polyolefin resin composition.

The viscosity-average molecular weight (Mv) is calculated based on ASTM-D4020 from the following formula, using decalin as the solvent, the limiting viscosity [η] being measured at 135° C.

Polyethylene:$[\eta]=6.77\times10^{-4}$ Mv$^{0.67}$ polypropylene:$[\eta]=1.10\times10^{-4}$ Mv$^{0.80}$ (Chiang formula)

The porosity of the polyolefin porous substrate of the embodiment is not particularly restricted but is preferably 20% or greater and more preferably 35% or greater, and preferably no greater than 90% and more preferably no greater than 80%. The porosity is preferably 20% or greater from the viewpoint of ensuring the permeability of the separator. The porosity is also preferably no greater than 90% from the viewpoint of ensuring puncture strength. The porosity can be calculated by the following formula:

Porosity=(volume−mass/film density)/volume×100, based on the volume (cm$^3$), mass (g) and film density (g/cm$^3$) of a measuring sample of the polyolefin porous substrate. When the polyolefin porous substrate is composed of polyethylene, for example, calculation may be performed assuming a film density of 0.95 (g/cm$^3$). The porosity can be adjusted by changing the draw ratio of the polyolefin porous substrate.

The gas permeability of the polyolefin porous substrate of the embodiment is not particularly restricted, but is preferably 10 seconds/100 cc or greater and more preferably 50 seconds/100 cc or greater, and preferably no greater than 1,000 seconds/100 cc and more preferably no greater than 500 seconds/100 cc. The gas permeability is preferably 10 seconds/100 cc or greater from the viewpoint of minimizing self-discharge of the electricity storage device. The gas permeability is also preferably no greater than 1,000 seconds/100 cc from the viewpoint of obtaining a satisfactory charge-discharge characteristic. The gas permeability referred to here is the air permeability resistance measured according to JIS P-8117. The gas permeability can be adjusted by changing the stretching temperature and/or draw ratio of the porous substrate.

The mean pore size of the polyolefin porous substrate of the embodiment is preferably no greater than 0.15 µm and more preferably no greater than 0.1 µm, with a preferred lower limit of 0.01 µm. A mean pore size of no greater than 0.15 µm is preferred from the viewpoint of minimizing self-discharge of the electricity storage device and helping to prevent reduction in capacity. The mean pore size can be adjusted by changing the draw ratio during production of the polyolefin porous substrate.

The puncture strength of the polyolefin porous substrate of the embodiment is not particularly restricted, but is preferably 200 g/20 µm or greater and more preferably 300 g/20 µm or greater, and preferably no greater than 2,000 g/20 µm and more preferably no greater than 1,000 g/20 µm. The puncture strength is preferably 200 g/20 µm or greater from the viewpoint of minimizing film rupture when the active material is shed during battery winding, and from the viewpoint of concerns of short circuiting by expansion and contraction of the electrodes that occurs with charge-discharge. On the other hand, the puncture strength is preferably no greater than 2,000 g/20 µm from the viewpoint of reducing width contraction caused by relaxation of the orientation during heating. The puncture strength is measured by the method described in the examples below.

The puncture strength can be adjusted by setting the draw ratio and/or stretching temperature of the polyolefin porous substrate.

The thickness of the polyolefin porous substrate of the embodiment is not particularly restricted, but is preferably 2 µm or greater and more preferably 5 µm or greater, and preferably no greater than 100 µm, more preferably no greater than 60 µm and even more preferably no greater than 50 µm. The thickness is preferably 2 µm or greater from the viewpoint of increasing the mechanical strength. The film thickness is also preferably no greater than 100 µm because this will reduce the volume of the battery occupied by the separator, which is advantageous for increasing the capacity of the battery.

[Filler Porous Layer]

The filler porous layer comprises an inorganic filler and a resin binder.

(Inorganic Filler)

The inorganic filler used in the filler porous layer is not particularly restricted, but preferably it has a melting point of 200° C. or higher and also high electrical insulating properties, and is also electrochemically stable in the range in which the lithium-ion secondary battery is to be used.

The inorganic filler is not particularly restricted, and examples include oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. They may be used alone, or more than one type may be used together.

Preferred among those mentioned above, from the viewpoint of improving the electrochemical stability and the heat-resistant properties of the separator, are:

aluminum oxide compounds such as alumina and aluminum hydroxide oxide; and aluminum silicate compounds without ion-exchange properties such as kaolinite, dickite, nacrite, halloysite and pyrophyllite.

Aluminum hydroxide oxide (AlO(OH)) is particularly preferred as an aluminum oxide compound. Kaolin composed mainly of kaolin mineral is more preferred as an aluminum silicate compound without ion-exchange properties, because it is inexpensive and readily available. Wet kaolin, and calcined kaolin obtained by its firing, are known types of kaolin. Calcined kaolin is particularly preferred for the invention. Calcined kaolin is especially preferred from the viewpoint of electrochemical stability, because the water of crystallization has already been released during firing, and the impurities have also been removed.

The mean particle size of the inorganic filler is preferably at least 0.01 µm and no greater than 4.0 µm, more preferably at least 0.2 µm and no greater than 3.5 µm, and even more preferably at least 0.4 µm and no greater than 3.0 µm. Adjusting the mean particle size of the inorganic filler to within this range is preferred from the viewpoint of minimizing heat shrinkage at high temperature even when the filler porous layer has a small thickness (for example, 7 µm or smaller). The method of adjusting the particle diameters of the inorganic filler and their distribution may be, for example, a method of pulverizing the inorganic filler using a suitable pulverizing apparatus such as a ball mill, bead mill or jet mill to reduce their particle diameters.

Examples for the form of the inorganic filler include scaly, needle-like, columnar, spherical, polyhedral and globular. Different types of inorganic fillers with such shapes may also be combined.

The proportion of the inorganic filler in the filler porous layer may be determined as appropriate from the standpoint of bindability of the inorganic filler, and permeability and heat resistance of the separator. The proportion of the inorganic filler in the filler porous layer is preferably 20 weight % or greater and less than 100 weight %, more preferably between 50 weight % and 99.99 weight % inclusive, even more preferably between 80 weight % and 99.9 weight % inclusive, and most preferably between 90 weight % and 99 weight %, inclusive.

(Resin Binder)

The type of resin binder in the filler porous layer is not particularly restricted, but it is preferred to use a resin binder that is insoluble in the electrolytic solution of the lithium-ion secondary battery and electrochemically stable in the operating range of the lithium-ion secondary battery.

Specific examples of such resin binders include resins with melting points and/or glass transition temperatures of 180° C. or higher, among which are polyolefins such as polyethylene and polypropylene; fluorinated resins such as polyvinylidene fluoride and polytetrafluoroethylene; fluorinated rubbers such as vinylidene fluoride-hexafluoropropylene-tetrafluoroethylene copolymer and ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, methacrylic acid ester-acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ether, polysulfone, polyethersulfone, polyphenylene sulfide, polyetherimide, polyamideimide, polyamide, polyester and the like.

In order to reduce the ion resistance of the filler porous layer, the polyalkyleneglycol group-containing thermoplastic polymer described below is preferably included in the filler porous layer as a resin binder.

The resin binder used is preferably a resin latex binder. When a resin latex binder is used as the resin binder, the separator provided with the filler porous layer comprising the binder and inorganic filler is less likely to have reduced ion permeability, compared to a separator wherein the resin binder is bonded to the porous film by a step of coating the resin binder solution onto the substrate, and this will tend to provide the electricity storage device with a higher output characteristic. Moreover, even with rapid temperature increase that occurs during abnormal heat release, the electricity storage device with this separator exhibits a smooth shutdown property, and a high degree of safety can be obtained more easily.

From the viewpoint of improving the electrochemical stability and bindability, the resin latex binder is preferably obtained by copolymerizing an aliphatic conjugated diene-based monomer and an unsaturated carboxylic acid monomer, with other copolymerizable monomers as well. The polymerization method in this case is not particularly restricted but is preferably emulsion polymerization. There are no particular restrictions on the method of emulsion polymerization, and any known method may be employed. The method of adding the monomers and other components is also not particularly restricted and may be a batch addition method, multistage addition method or continuous addition method, and the polymerization method used may be single-stage polymerization, or multistage polymerization such as two-stage polymerization, three-stage polymerization, or more.

The mean particle size of the resin binder is preferably 50 to 500 nm, more preferably 60 to 460 nm and even more preferably 80 to 250 nm. If the mean particle size of the resin binder is 50 nm or greater, the separator provided with the filler porous layer comprising the binder and inorganic filler will be less likely to have reduced ion permeability, and an electricity storage device with a high output characteristic will be more easily obtained. Moreover, an electricity storage device having a smooth shutdown property and a high degree of safety can be obtained more easily even with rapid temperature increase that occurs during abnormal heat release. A mean particle size of 500 nm or smaller for the resin binder will tend to result in satisfactory bindability, satisfactory heat shrinkage as a multilayer porous film, and excellent safety.

The mean particle size of the resin binder can be controlled by adjusting the polymerization time, the polymerization temperature, the compositional ratio of the components, the loading order of the components, and the pH.

From the viewpoint of improving the heat resistance and insulating properties, the thickness of the filler porous layer is preferably 0.5 µm or greater, while it is preferably no greater than 50 µm from the viewpoint of increasing the capacity and permeability of the battery.

The filler porous layer density is preferably 0.5 to 3.0 $g/cm^3$ and more preferably 0.7 to 20 $g/cm^3$. If the layer density of the filler porous layer is at least 0.5 $g/cm^3$ the heat shrinkage factor at high temperature will tend to be satisfactory, and if it is 3.0 $g/cm^3$ or lower the gas permeability will tend to be reduced.

The method of forming the filler porous layer may be coating at least one side of the substrate with a coating solution comprising an inorganic filler and a resin binder. The coating solution in such cases may include a solvent and a dispersing agent to increase the dispersion stability and coatability.

The method of coating the coating solution onto the substrate is not particularly restricted so long as the necessary layer thickness and coating area can be obtained. The filler starting material comprising the resin binder, and the polymer-substrate starting material may be laminated and extruded by a co-extrusion method, or the substrate and the filler porous film may be fabricated separately and then attached together.

[Thermoplastic Polymer Layer]

The thermoplastic polymer layer of the embodiment is disposed on at least a portion of the outermost surface of at least one side of the porous substrate or of a filler porous layer. The thermoplastic polymer layer may be disposed on the entire surface of the porous substrate or filler porous layer, or on only a portion of the substrate surface or filler porous layer. The thermoplastic polymer layer is more preferably disposed on only a portion of the surface of the polyolefin porous substrate or filler porous layer, so that the obtained battery can exhibit high ion permeability. The thermoplastic polymer layer is one composed mainly of a thermoplastic polymer, but it may further comprise inorganic filler particles, for example. From the viewpoint of high adhesion, the thermoplastic polymer layer and the porous substrate are preferably in direct contact.

From the viewpoint of efficiently exhibiting adhesion for electrodes, the weight ratio of the thermoplastic polymer in the thermoplastic polymer layer is preferably greater than 3 weight %, more preferably 10 weight % or greater, even more preferably 20 weight % or greater, yet more preferably 40 weight % or greater, even yet more preferably 60 weight % or greater, especially preferably 80 weight % or greater and most preferably 90 weight % or greater.

When the thermoplastic polymer layer includes filler particles, the weight ratio of the inorganic filler particles in the thermoplastic polymer layer is preferably no greater than 96 weight %, more preferably no greater than 90 weight %, even more preferably no greater than 80 weight %, yet more preferably no greater than 60 weight %, even yet more preferably no greater than 40 weight % and especially preferably no greater than 20 weight %, from the viewpoint of obtaining both adhesion and ion permeability. The lower limit for the weight ratio of the inorganic filler particles in the thermoplastic polymer layer may be either 0 weight %, or greater than 0 weight %, or it may be 0.1 weight % or greater. From the viewpoint of adhesion, the weight ratio of inorganic filler particles in the thermoplastic polymer layer is most preferably 0 weight %.

In the embodiment, it is preferable that the thermoplastic polymer layer is intended to be directly bonded to the electrodes, or is heat-resistant. Even when the separator for an electricity storage device comprises another layer such as a filler porous layer in addition to the polyolefin porous substrate and the thermoplastic polymer layer, at least the thermoplastic polymer layer is to be placed so as to be directly bonded with the electrode, for example, so that at least a portion of at least one side of the polyolefin porous substrate or filler porous layer is bonded with the electrode via the thermoplastic polymer layer, or alternatively so that another layer disposed on the polyolefin porous substrate and filler porous layer is bonded with the electrode via the thermoplastic polymer layer.

The coating coverage of thermoplastic polymer layer on the porous substrate according to the embodiment is preferably 0.05 g/m² or greater, and more preferably 0.1 g/m² or greater, in terms of solid content. It is also preferably no greater than 2.0 g/m² and more preferably no greater than 1.5 g/m². The coating coverage of the thermoplastic polymer on the porous substrate is preferably at least 0.05 g/m² from the viewpoint of improving the adhesive force between the thermoplastic polymer layer of the separator and the electrodes, obtaining uniform charge-discharge, and increasing the battery characteristic (cycle characteristic). This is also preferred for imparting heat resistance to the separator. The upper limit is preferably 2.0 g/m² from the viewpoint of minimizing reduction in ion permeability.

According to the embodiment, the area ratio of the thermoplastic polymer layer with respect to the total area of the surface of the porous substrate or filler porous layer on which the thermoplastic polymer layer is disposed, is preferably no greater than 100%, 95%, 80%, 75% or 70%, and the same area ratio is preferably at least 5%, 10% or 15%. Limiting the coating area of the thermoplastic polymer layer to no greater than 100% is preferred from the viewpoint of further minimizing occlusion of the pores of the substrate by the thermoplastic polymer and further increasing the permeability of the separator. The coating area is also preferably at least 5% from the viewpoint of further increasing adhesion with electrodes. This is also preferred for imparting heat resistance to the separator. The area ratio is measured by SEM observation of the thermoplastic polymer layer-formed surface of the separator.

When the thermoplastic polymer layer is a layer combined with an inorganic filler, the area in which the thermoplastic polymer is present is calculated using the total area of the thermoplastic polymer and the inorganic filler as 100%.

The coating coverage and coating area of the polymer layer for the embodiment can be adjusted by varying the thermoplastic polymer or copolymer concentration in the coating solution coated onto the substrate, the amount of coating solution applied, the coating method and the coating conditions, in the method for producing a separator as described below. However the method of adjusting the coating coverage and coating area is not limited to these methods. The coating area of the thermoplastic polymer layer for the embodiment (the surface coverage factor) is measured by the method described in the examples below.

When the thermoplastic polymer layer is disposed on only a portion of the surface of the polyolefin porous substrate or filler porous layer, the arrangement pattern of the thermoplastic polymer layer may be, for example, dotted, diagonal, striped, lattice-like, banded, hexagonal, random, or any combination thereof.

In the separator for an electricity storage device of the embodiment, the dispersion ($\sigma^2$) of the areas ($s_i$) of Voronoi polygons obtained by applying Voronoi tessellation to the thermoplastic polymer layer is preferably 0.01 and 0.7. The thermoplastic polymer in this case is preferably particulate.

Voronoi tessellation is performing regional division by determining, with respect to a plurality of points (generatrices) arranged at arbitrary positions on a certain metric space, to which generatrix another point on the same space is closest. The diagram including the resulting regions is called a Voronoi diagram. In a Voronoi diagram, usually the boundary line of the plurality of regions defines part of a bisector between respective generatrices and each region forms a polygon (Voronoi polygon).

When the separator surface in a specific visual region is observed, one thermoplastic polymer particle in the observation field is regarded as one circle with average diameter (1). Perpendicular bisectors are respectively drawn between a plurality of adjacent thermoplastic polymer particles, and the polygon surrounded by perpendicular bisectors for each particle is referred to as "Voronoi polygon".

The dispersion ($\sigma^2$) of areas ($s_i$) of Voronoi polygons is the value calculated from the following equation:

$$\sigma^2 = \sum_i \frac{\left(\frac{S_i}{m} - 1\right)^2}{n} \qquad \text{[Mathematical Formula 2]}$$

wherein $s_i$ is the measured area of a Voronoi polygon, m is the average value of the measured areas of Voronoi polygons, and n is the total number of Voronoi polygons.

Regions that are not closed when performing Voronoi tessellation in the observation field are excluded from calculation by the above equation. Non-closed regions include, for example, regions obtained by applying Voronoi tessellation to particles that are present at the boundaries of the observation field, and partially hidden.

Accordingly, in an image obtained by photographing at least a partial region of the separator surface, it is preferable to confirm whether or not particles located at the edge of the image are being observed in their entirety.

In the embodiment, the dispersion ($\sigma^2$) of areas ($s_i$) of Voronoi polygons is an indicator of the level of variation of placement of the particulate thermoplastic polymer on the substrate. This dispersion ($\sigma^2$) is thought to represent the distribution or aggregation state of the particulate thermoplastic polymer on the coating surface. When the dispersion ($\sigma^2$) of areas ($s_i$) of Voronoi polygons is 0.01 or more, the particulate thermoplastic polymer can be evaluated as being situated on the separator surface with an appropriate degree of aggregation. With this condition met, the adhesion between the electrodes and the separator will tend to be sufficient. If the dispersion ($\sigma^2$) is 0.7 or lower, the particulate thermoplastic polymer can be evaluated as not being excessively aggregated on the separator surface. When this condition is met, the ionic resistance on the separator surface becomes uniform, avoiding concentration of lithium ions in particular regions of the surface and thereby reducing generation of metallic lithium, so that as a result the electricity storage device tends to have excellent high-temperature storage characteristics. The value of the dispersion ($\sigma^2$) is preferably from 0.01 to 0.6, more preferably from 0.01 to 0.5, still more preferably from 0.1 to 0.4 and yet more preferably from 0.1 to 0.35.

The separator surface is observed to determine the area density of the particulate thermoplastic polymer (hereinafter also referred to as "thermoplastic polymer particles") and the dispersion ($\sigma^2$) of areas ($s_i$) of Voronoi polygons obtained by applying Voronoi tessellation to the thermoplastic polymer particles. The means of observation is appropriately selected according to the dimension or distribution state of the thermoplastic polymer particles coated onto the separator, and any desired method may be employed. For example, an electron microscope, an atomic force microscope, an optical microscope, and a differential interference microscope can be used. An electron microscope or an atomic force microscope is suitable for determining the distribution state of dispersed particles according to the embodiment.

An average observation field of the polymer layer applied onto the separator surface should be ensured within the observation field. The projected area in the observation field should be appropriately adjusted so that the average distribution state of dispersed particles can be ascertained. For example, the number of dispersed particles adopted as the calculation target is preferably from about 80 to 200 particles per visual field. This observation field can be obtained by observing the polymer layer with preset observation means and magnification. FIG. 1 is one example of a photograph taken by observing the surface of the polymer layer and employing a scanning electron microscope as the observation means, with 10,000× magnification. FIG. 1 clearly shows a state where thermoplastic polymer particles having a particle diameter of about 500 nm are present in a dispersed manner on the surface of the polymer layer. By visualizing the state of dispersion of the thermoplastic polymer particles on the surface of the polymer layer in this manner, the dispersion state of thermoplastic polymer particles can then be analyzed by Voronoi tessellation.

In observation using a scanning electron microscope, a magnification suitable for analysis by Voronoi tessellation is preset, depending on the particle diameters of the thermoplastic polymer particles. Specifically, the magnification is set so that the number of thermoplastic polymer particles observed in one visual field is preferably from 40 to 300, more preferably from 60 to 240 and even more preferably from 80 to 200. This will allow the analysis by Voronoi tessellation to be performed in an appropriate manner. For example, for analysis by Voronoi tessellation it is appropriate to set the magnification to 10,000× when the particle diameter is about 500 nm, and to about 30,000× when the particle diameter is about 200 nm.

Figure 2:
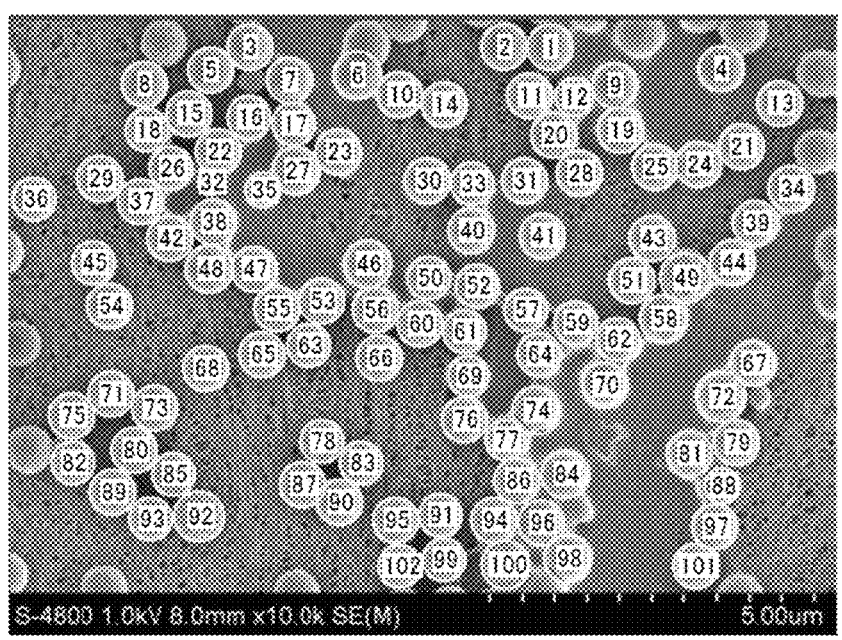
FIG. 2 illustrates one example of the result from automatically identifying the thermoplastic polymer in the observation field of FIG. 1 using image processing software.

The thermoplastic polymer particles within the observation field obtained by the aforementioned observation method are identified. For example, the thermoplastic polymer particles are identified from the observation field either with the naked eye or by means of image processing software. FIG. 2 is one example of the result from automatically identifying thermoplastic polymer particles included in the observation field of FIG. 1 using image processing software. After identifying the thermoplastic polymer particles in the observation field obtained according to the preset method and magnification, the total number of particles, the diameter of each particle, and the projected area of each particle are then calculated (see FIG. 3 referred to below). In this case, it is preferable to specify only particles that are completely within the observation field.

Voronoi tessellation as defined above can be performed for the thermoplastic polymer particles identified in the specified observation field of the separator surface. Specifically, after the thermoplastic polymer has been applied onto the separator surface, the coated film surface is photographed to obtain an image. By performing Voronoi tessellation in which the thermoplastic polymer particles identified in the image are regarded as circles with average diameter (1), Voronoi polygons can thereby be rendered. The Voronoi polygons may be rendered manually or by means of image processing software, for example. The area of the rendered Voronoi polygons is then calculated.

Figure 3:
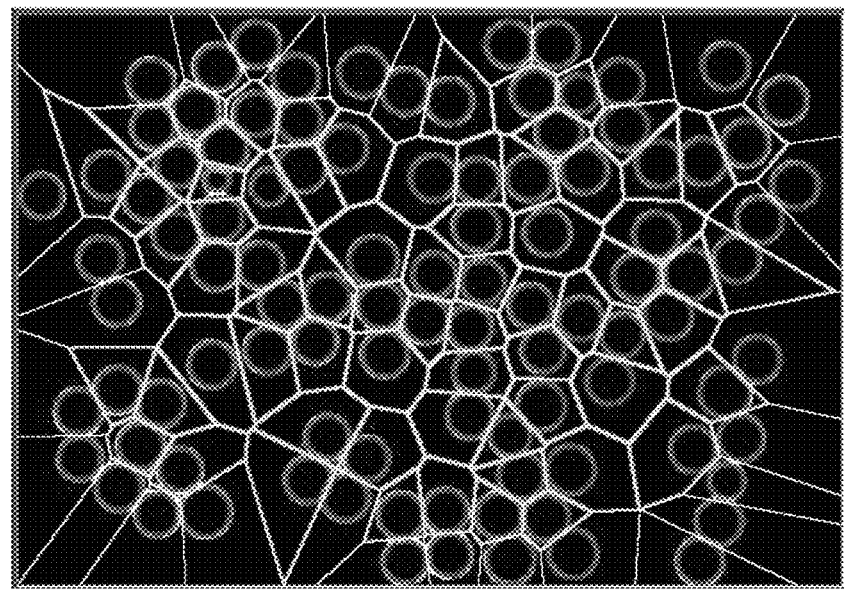
FIG. 3 illustrates one example of the result from obtaining Voronoi polygons by applying Voronoi tessellation to the plurality of particles identified in FIG. 2.
Figure 4:
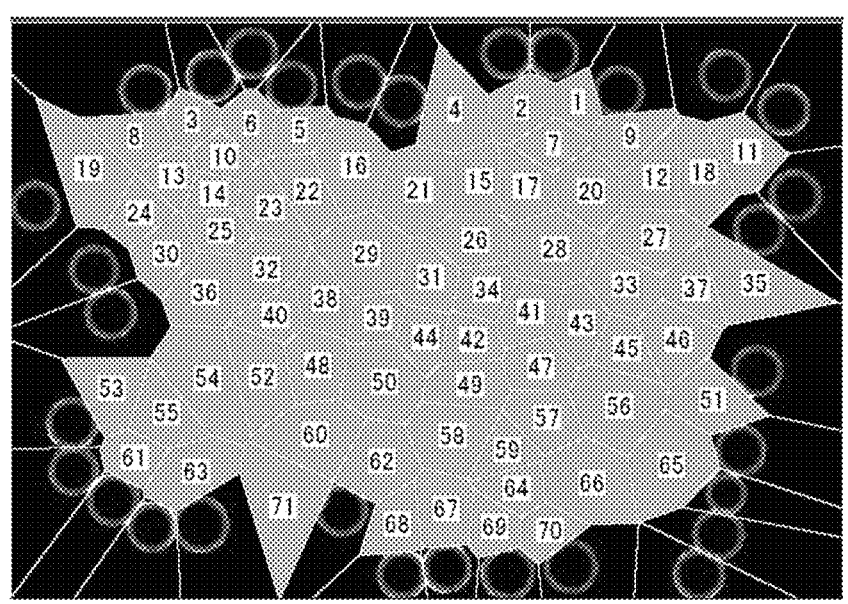
FIG. 4 illustrates one example of the result from automatically calculating the area of the Voronoi polygons obtained in FIG. 3 using image processing software.

FIG. 3 is one example of the result of obtaining Voronoi polygons by applying Voronoi tessellation to a plurality of thermoplastic polymer particles identified in FIG. 2. FIG. 4 shows the result of automatically calculating the number and areas of Voronoi polygons corresponding to closed regions out of the Voronoi polygons depicted in FIG. 3, using image processing software.

The projected area in the observation field is determined by the observation method and image processing method described above, and the total number of thermoplastic polymer particles in the visual field, the projected areas, and the areas of Voronoi polygons are obtained. The area density and the dispersion ($\sigma^2$) of areas ($s_i$) of Voronoi polygons for the thermoplastic polymer particles in the visual field can be calculated according to the above definitions.

However, the distribution of thermoplastic polymer particles may change depending on the observation visual field. For this reason, the area density and the dispersion ($\sigma^2$) are preferably the average values each calculated for a plurality of observation fields. The number of visual fields is preferably 3 or more.

It is particularly preferable to employ the average value among values calculated for 95 visual fields, as follows:
  i) each measurement visual field: an image captured by a scanning electron microscope,
  ii) method for setting the visual field:
  a) a initial visual field is set,
  b) 19 visual fields consisting of 9 visual fields composed of regions sequentially adjoining the initial visual field in the transverse direction, 9 visual fields composed of regions sequentially adjoining in the longitudinal direction, and the initial visual field are set,
  c) a region defined by the 19 visual fields is set as a initial section,
  d) 4 sections composed of regions sequentially adjoining the initial section in the uniaxial direction at intervals of 10 mm are set,
  e) in each of the 4 sections, 19 visual fields are set at positions similar to those of the 19 visual fields in the initial section, and
  f) a total of 95 visual fields in the 4 sections and the initial section (19 visual fields×5 sections) are set as the measurement visual field.

Each of the visual fields measured is preferably a captured image taken at a magnification set such that the number of thermoplastic polymer particles observed in one visual field is from 80 to 200.

Figure 5:
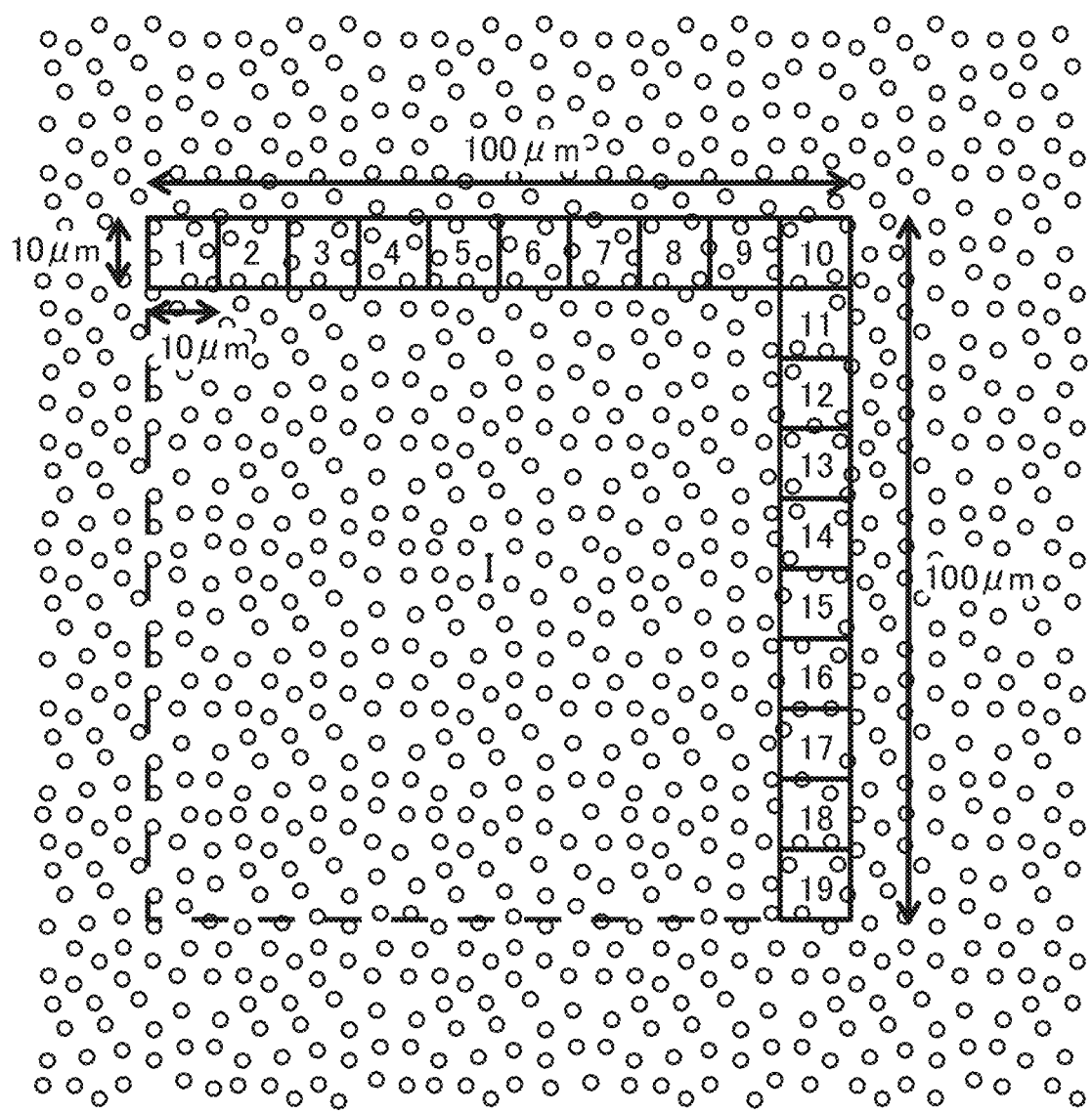
FIG. 5 illustrates one example of the method for setting one section consisting of 19 visual fields out of 95 visual fields in which thermoplastic polymer particles on a separator are observed.

A preferred method for setting 95 visual fields for the embodiment is described below with reference to the drawings.
  i) The captured image used is an image captured by a scanning electron microscope at 10,000× magnification, as mentioned above. The image is, for example, the image depicted in FIG. 5. FIG. 5 is a model view illustrating part of an image of thermoplastic polymer particles on a substrate, captured by a scanning electron microscope at a magnification of 10,000×.

In the image of FIG. 5, first the initial visual field (10) is set. Since one visual field is composed of an image captured by a scanning electron microscope at a magnification of 10,000×, the scale of one visual field is about 10 μm×10 μm, and a visual field suitable for Voronoi tessellation evaluation based on the thermoplastic polymer particles is created. Nine visual fields (1 to 9) sequentially adjoining the initial visual field (10) in the vertical direction (X-axis direction)

are then set. These visual fields (1 to 9) are each composed of a captured image at the same magnification as the initial visual field (10) and sequentially set in one direction, while each sharing one side with the adjacent region. Nine visual fields (11 to 19) sequentially adjoining the initial visual field (10) in the longitudinal direction are set. These visual fields (11 to 19) are each composed of the same region as that of the initial visual field (10) and sequentially set in one direction, while each sharing one side with the adjacent region.

A region defined by those 19 visual fields is set as the initial section (I). Since the initial section (I) is composed of a square region with two sides being defined respectively by the top sides of visual fields 1 to 10 in FIG. 5 and the right sides of visual fields 10 to 19, one section has a scale of about 100 μm×100 μm and corresponds to an image captured by a scanning electron microscope at a magnification of 1,000×, and the dispersion calculated from 19 visual fields constituting section (I) can be evaluated as the value more accurately representing the state of the separator surface.

In the embodiment, the evaluation is further carried out by providing 5 sections each equivalent to the aforementioned one section, in order to correctly evaluate the state of the separator surface. Specifically, referring to FIG. 6, which is an overall view of the image of thermoplastic polymer particles on the substrate depicted in FIG. 5, 4 sections (II to V) sequentially adjoining the initial section (I) in the uniaxial direction at intervals of 10 mm are set. Each of these 4 sections is composed of the same region as in the initial section (I).

In each of these 4 sections (II to V), 19 visual fields are set at positions similar to those of the 19 visual fields in the initial section (I). A total of 95 visual fields (19 visual fields×5 sections) in the 4 sections (II to V) and the initial section (I) are set as the measurement visual field of the thermoplastic polymer particles on the substrate.

The separator surface is preferably observed on a region of the separator surface that does not contribute to ion conduction. For example, the observation can be performed on the separator immediately after its production, when the separator has not yet been incorporated into an electricity storage element. If the electricity storage element is in use or has already been used, it is also a preferred mode of the embodiment to observe a so-called "ear" portion of the separator (a region in the vicinity of the outer edge part of the separator and not participating in ion conduction).

As will be understood from the evaluation method described above, if the observation target includes 95 visual fields, the measurement target used is a separator strip having a length of about 40 mm, allowing the dispersion state of the thermoplastic polymer on the separator surface to be correctly evaluated.

The fact that the aforementioned Voronoi tessellation can be performed on thermoplastic polymer particles indicates that the thermoplastic polymer particles in the polymer layer formed on the substrate are present as a single layer of particles substantially without overlapping. For example, when the thermoplastic polymer particles are overlapping with each other in multiple layers in the polymer layer, the concept of area occupied by a single particle cannot established, and as a result, Voronoi tessellation cannot be performed.

For the separator of the embodiment, the area density and the dispersion ($\sigma^2$) are preferably adjusted to the range above after the thermoplastic polymer particles in the polymer layer formed on the substrate have been arranged so as to substantially eliminate any mutual overlapping.

The methods for adjusting the area density and dispersion ($\sigma^2$) of the thermoplastic polymer to the ranges specified above are not particularly limited, but they can be adjusted, for example, by changing the thermoplastic polymer content in the coating solution applied onto the substrate, the amount of the coating solution applied, and the coating method and coating conditions. More specifically, the thermoplastic polymer solution may be adjusted to a high viscosity and applied onto the coating surface of a porous film while applying shear force, thus allowing the thermoplastic polymer to be disposed in a state of dispersion in the range specified above.

The form (pattern) of the polymer layer on the substrate is not particularly restricted, but the thermoplastic polymer particles are preferably present in a state of mutual dispersion over the entire surface of the substrate in such a manner that the dispersion specified above is satisfied. The thermoplastic polymer particles may optionally form clusters in partial regions, but as a whole, each of the particles must be dispersed to the extent of satisfying the range of dispersion specified above. In such partial regions, polymer particles may be stacked on top of other particles, but as a whole, each of the particles must be dispersed to an extent satisfying the range of dispersion specified above.

The thickness of the thermoplastic polymer layer disposed on the polyolefin porous substrate or filler porous layer is preferably 0.01 μm or greater and more preferably 0.1 μm or greater, on each side of the substrate. It is also preferably no greater than 5 μm, more preferably no greater than 3 μm and even more preferably no greater than 1 μm. A polymer layer thickness of 0.1 μm or greater is preferred from the viewpoint of obtaining uniform adhesive force between the electrodes and the porous substrate, thus resulting in improved battery characteristics. A polymer layer with a thickness of 0.1 μm or greater is also preferable from the viewpoint of imparting heat resistance. A polymer layer thickness of no greater than 5 μm, moreover, is preferred from the viewpoint of minimizing reduction in ion permeability.

The average thickness of the polymer layer for the embodiment can be adjusted by varying the thermoplastic polymer or copolymer concentration in the coating solution to be coated onto the substrate, the amount of coating solution applied, the coating method and the coating conditions. However, the method of adjusting the average thickness of the polymer layer is not limited to these.

(Thermoplastic Polymer)

According to the embodiment, the thermoplastic polymer layer includes a thermoplastic polymer. From the viewpoint of both the ion permeability of the separator and its adhesion to electrodes, and from the viewpoint of both ion permeability and heat resistance of the separator, at least one of the thermoplastic polymers used preferably includes a copolymer with an ethylenic unsaturated monomer having a polyalkyleneglycol group as a monomer unit. The term "ethylenic unsaturated monomer" means a monomer with one or more ethylenic unsaturated bonds in the molecule.

A copolymer with an ethylenic unsaturated monomer having a polyalkyleneglycol group (also referred to as "polyoxyalkylene group") as a monomer unit is a thermoplastic copolymer having a polyether unit (also referred to as "polyalkylene glycol chain", and abbreviated hereunder as "PEU") in the structure (such a copolymer will hereunder be referred to as "PEU-containing thermoplastic copolymer").

If the thermoplastic polymer layer of the embodiment comprises a PEU-containing thermoplastic copolymer, it will be possible to increase the ion permeability of the separator while imparting adhesion for electrodes and heat resistance to the separator.

The thermoplastic polymer layer comprising the PEU-containing thermoplastic copolymer may have a monolayer structure, a structure composed of a PEU-containing thermoplastic copolymer and a polymer surrounding at least a portion thereof, or a multilayer structure.

At least a portion of the thermoplastic polymer in the thermoplastic polymer layer on the outermost surface of the separator for an electricity storage device is preferably a PEU-containing thermoplastic copolymer. Such a structure will provide excellent adhesion between the separator and electrodes, as well as excellent heat resistance and ion permeability, and will have an effect of shortening the processing time for fabrication of the battery, improving the battery characteristics and increasing safety.

The oxygen atoms in the polyether sites of the PEU-containing thermoplastic copolymer coordinate with lithium (Li) ions and promote their diffusion, and therefore a PEU-containing thermoplastic copolymer can lower the ion resistance compared to an acrylic thermoplastic copolymer that does not include PEU. Therefore, applying a PEU-containing thermoplastic copolymer on at least one side of the substrate will tend to result in more excellent ion diffusibility of the electricity storage device comprising the separator.

Because the polyether sites of the PEU-containing thermoplastic copolymer have high hydrating power, coating the PEU-containing thermoplastic copolymer as an aqueous coating material on the substrate helps prevent rapid drying of the copolymer, ensures coatability for the coating material and increases the bonding strength between the substrate and the coating layer.

In order to improve the ion diffusibility while obtaining a satisfactory balance between coatability of the coating layer onto the porous substrate and adhesion of the separator with the electrodes, the PEU-containing thermoplastic copolymer is preferably designed so as to include both of an ethylenic unsaturated monomer having a polyalkyleneglycol group (P) and a monomer without a polyalkyleneglycol group, as copolymerizing components.

The ethylenic unsaturated monomer having a polyalkyleneglycol group (P) is copolymerizable with the monomer without a polyalkyleneglycol group. Polyalkyleneglycol groups are also known as polyoxyalkylene groups, and examples include polyoxymethylene, polyoxyethylene, polyoxypropylene and polyoxybutylene. The number of carbon atoms of the oxyalkylene group in a polyoxyalkylene group is preferably 1 to 6, more preferably 1 to 3 and even more preferably 2. The hydrocarbon group in a polyalkyleneglycol group may have a straight-chain, branched, or cyclic structure.

The average number of repeating units (n) for the alkyleneglycol units in the ethylenic unsaturated monomer having a polyalkyleneglycol group (P) is not particularly restricted, but is preferably 1 or greater and more preferably 3 or greater. It is also preferably no greater than 100, more preferably no greater than 30, even more preferably no greater than 15 and especially preferably no greater than 8.

If the average number of repeating units is at least 3, the ion permeability of the copolymer will tend to be higher. If the average number of repeating units is no greater than 15, the copolymerizability with the monomer without a polyalkyleneglycol group will be higher in emulsion polymerization.

From the viewpoint of both high adhesion and low resistance, the ethylenic unsaturated monomer having a polyalkyleneglycol group (P) is preferably included at 3 to 50 weight % in terms of the monomer unit in 100 weight % of the thermoplastic polymer composing the thermoplastic polymer layer.

The method of detecting the ethylenic unsaturated monomer having a polyalkyleneglycol group is not particularly restricted, and it can be confirmed by the following method using pyrolysis GC-MS, for example. Since measuring the separator, or the separator that has been removed after battery disassembly, by pyrolysis GC-MS and confirming m/z=59, 69, 103, 113, attributed to the ethylenic unsaturated monomer having a polyalkyleneglycol group, allows detection of the ethylenic unsaturated monomer having a polyalkyleneglycol group, it can be confirmed as the proportion of the ethylenic unsaturated monomer having a polyalkyleneglycol group among the monomers in the thermoplastic polymer layer, from the integral ratio of the GC chart.

Examples for the ethylenic unsaturated monomer having a polyalkyleneglycol group (P) include polyalkyleneglycol mono(meth)acrylate, polyalkyleneglycol di(meth)acrylate, and monomers having reactive substituents such as polyalkylene glycol units and allyl groups in the molecule.

Examples of polyalkyleneglycol mono(meth)acrylates include (meth)acrylic acid ester monomers with polyalkyleneglycol groups, such as polyethyleneglycol (meth)acrylate, polypropyleneglycol (meth)acrylate, polyethyleneglycol-polypropylene glycol (meth)acrylate, polyethyleneglycol-polybutylene glycol (meth)acrylate, polypropyleneglycol-polybutyleneglycol (meth)acrylate, 2-ethylhexylpolyethyleneglycol mono(meth)acrylate, phenoxydiethyleneglycol mono(meth)acrylate, phenoxypolyethyleneglycol mono(meth)acrylate, methoxypolyethylene glycol (meth)acrylate, methoxydiethyleneglycol mono (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate and octoxypolyethylene glycol-polypropylene glycol (meth)acrylate, these being preferred from the viewpoint of more effectively and reliably solving the problem of the invention. In addition to these, monomer (P) also includes compounds that are reactive surfactants with polyalkylene glycol chains, listed in the following paragraphs. Methoxydiethyleneglycol mono (meth)acrylate, methoxypolyethyleneglycol mono(meth) acrylate, butoxypolyethyleneglycol mono(meth)acrylate, 2-ethylhexylpolyethyleneglycol mono(meth)acrylate and methoxypolypropyleneglycol mono(meth)acrylate are preferred among the monomers (P) from the viewpoint of satisfactory polymerization stability during preparation of the copolymer.

Polyalkyleneglycol di(meth)acrylates include polyethyleneglycol di(meth)acrylate, polypropyleneglycol di(meth)acrylate and polyethylene glycol-polypropyleneglycol di(meth)acrylate.

Examples of monomers with a polyalkylene glycol unit and an allyl group in the molecule include polyalkyleneglycol monoallyl ethers, and specifically polyethyleneglycol monoallyl ether or polypropyleneglycol monoallyl ether may be used.

The content ratio of the ethylenic unsaturated monomer having a polyalkyleneglycol group (P) in the thermoplastic polymer is preferably 2 weight % or greater and more preferably 5 weight % or greater, with respect to 100 weight % of the copolymer. It is also preferably no greater than 50 weight %, more preferably no greater than 40 weight %, even more preferably no greater than 30 weight % and most preferably no greater than 20 weight %. The content ratio of the ethylenic unsaturated monomer having a polyalkyleneglycol group (P) is preferably within this range as this will increase the ion permeability of the separator. The content ratio of the ethylenic unsaturated monomer having a polyalkyleneglycol group (P) is also preferably no greater than 50 weight % as this will improve the copolymerizability in emulsion polymerization.

The copolymer of the embodiment preferably has, as one of its monomer units, an ethylenic unsaturated monomer with a cycloalkyl group (A) as a monomer without a polyalkyleneglycol group. The ethylenic unsaturated monomer with a cycloalkyl group (A) is a monomer that is different from the monomer (P).

The ethylenic unsaturated monomer with a cycloalkyl group (A) is not particularly restricted and may be one having a cycloalkyl group, and having one ethylenic unsaturated bond. For the purpose of the present specification, the cycloalkyl group is the group remaining in the polymer structure after copolymerization, and it therefore excludes the groups used for polymerization and crosslinking reaction, such as epoxy groups.

There are no particular restrictions on the cycloalkyl group-containing monomer unit (A) derived from ethylenic unsaturated monomer with a cycloalkyl group (A), and examples include cyclohexyl acrylate units, cyclohexyl methacrylate units, isobornyl acrylate units, isobornyl methacrylate units, adamantyl acrylate units and adamantyl methacrylate units, as (meth)acrylic acid ester monomer units with cycloalkyl groups. Among these, (meth)acrylic acid ester monomer units with cycloalkyl groups and (meth)acryloyloxy groups are preferred, and cyclohexyl acrylate units and cyclohexyl methacrylate units are yet more preferred. Using such a cycloalkyl group-containing monomer unit (A) will tend to effectively and reliably solve the problem that is to be solved by the present invention. It will also tend to further improve the polymerization stability during preparation of the copolymer binder. The cycloalkyl group-containing monomer unit (A) may be of a single type or two or more types.

Of the monomers (A) mentioned above, cyclohexyl acrylate and/or cyclohexyl methacrylate are preferred from the viewpoint of satisfactory copolymerizability with monomer (P) in emulsion polymerization. They may be used alone or as combinations of two or more types.

The copolymer may also have another monomer (B) which has no polyalkyleneglycol group and no cycloalkyl group, as a monomer unit for improving the quality features and physical properties. The other monomer (B) is a monomer that is different from monomers (A) and (P), and that is copolymerizable with monomer (P). The other monomer (B) is not particularly restricted, and examples include ethylenic unsaturated monomers with a carboxyl group (b1), ethylenic unsaturated monomers with an amide group (b2), ethylenic unsaturated monomers with a hydroxyl group (b3), crosslinkable monomers (b4), (meth)acrylic acid ester monomers (b5), ethylenic unsaturated monomers with a cyano group (b6), and other ethylenic unsaturated monomers. The other monomer (B) may be a single type or a combination of two or more types. The other monomer (B) may also simultaneously belong to two or more of the monomer categories (b1) to (b6). That is, the other monomer (B) may be an ethylenic unsaturated monomer having two or more groups selected from the group consisting of carboxyl, amide, hydroxyl and cyano groups, or it may be a crosslinkable monomer having two or more groups selected from the group consisting of carboxyl, amide, hydroxyl and cyano groups, together with an ethylenic unsaturated bond.

Of these, the other monomer (B) is preferably one comprising an ethylenic unsaturated monomer with a carboxyl group (b1), from the viewpoint of improving adhesion with the electrode (electrode active material). Examples of ethylenic unsaturated monomers with a carboxyl group (b1) include monocarboxylic acid monomers such as half esters of acrylic acid, methacrylic acid and itaconic acid, half esters of maleic acid and half esters of fumaric acid, and dicarboxylic acid monomers such as itaconic acid, fumaric acid and maleic acid. They may be used alone or as combinations of two or more types. From the same viewpoint as mentioned above, acrylic acid, methacrylic acid and itaconic acid are preferred, with acrylic acid and methacrylic acid being more preferred.

Likewise, from the viewpoint of improving adhesion with the electrodes (electrode active materials), the other monomer (B) is preferably one comprising an ethylenic unsaturated monomer with an amide group (b2). There are no particular restrictions on the ethylenic unsaturated monomers with an amide group (b2), and examples include acrylamide, methacrylamide, N,N-methylenebisacrylamide, diacetoneacrylamide, diacetonemethacrylamide, maleic acid amide and maleimide. They may be used alone or as combinations of two or more types. Acrylamide and methacrylamide are preferred among those mentioned above. Using acrylamide and/or methacrylamide will tend to further increase adhesion between the separator and the electrodes (electrode active materials).

Likewise, from the viewpoint of improved adhesion with the electrodes (electrode active materials) and polymerization stability of the copolymer, the other monomer (B) is preferably one comprising an ethylenic unsaturated monomer with a hydroxyl group (b3). Examples of ethylenic unsaturated monomers with hydroxyl groups (b3) include (meth)acrylates with hydroxyl groups, such as hydroxyethyl acrylate, hydroxyethyl methacrylate, hydroxypropyl acrylate and hydroxypropyl methacrylate. They may be used alone or as combinations of two or more types. Hydroxyethyl acrylate and hydroxyethyl methacrylate are preferred among those mentioned above. Using hydroxyethyl acrylate and/or hydroxyethyl methacrylate will tend to increase the polymerization stability of the copolymer.

In addition, from the viewpoint of increasing the heat resistance of the thermoplastic polymer to improve the battery safety, and from the viewpoint of limiting the insoluble portion of the copolymer in the electrolytic solution to a suitable level, the other monomer (B) preferably comprises a crosslinkable monomer (b4). There are no particular restrictions on the crosslinkable monomer (b4), and examples include monomers with two or more radical-polymerizing double bonds, and monomers with a functional group that provides a self-crosslinking structure either during or after polymerization. They may be used alone or as combinations of two or more types.

Examples of monomers with two or more radical-polymerizing double bonds include divinylbenzene and polyfunctional (meth)acrylates. Preferred among these are polyfunctional (meth)acrylates, from the viewpoint of allowing more satisfactory electrolytic solution resistance to be exhibited even in small amounts.

Polyfunctional (meth)acrylates include bifunctional (meth)acrylates, trifunctional (meth)acrylates and tetrafunctional (meth)acrylates, examples of which include neopentyl glycol diacrylate, neopentyl glycol dimethacrylate, butanediol diacrylate, butanediol dimethacrylate, trimethylolpropane triacrylate, trimethylolpropane trimethacrylate and pentaerythritol tetraacrylate and pentaerythritol tetramethacrylate. They may be used alone or as combinations of two or more types. Trimethylolpropane triacrylate and trimethylolpropane trimethacrylate are preferred from the same viewpoint mentioned above.

Examples of monomers with functional groups that provide self-crosslinking structures either during or after polymerization include ethylenic unsaturated monomers with epoxy groups, ethylenic monomers with methylol groups, ethylenic unsaturated monomers with alkoxymethyl groups and ethylenic unsaturated monomers with hydrolyzable silyl groups. They may be used alone or as combinations of two or more types.

Examples of ethylenic unsaturated monomers with epoxy groups include glycidyl acrylate, glycidyl methacrylate, allyl glycidyl ether, methylglycidyl acrylate and methylglycidyl methacrylate. They may be used alone or as combinations of two or more types. Glycidyl methacrylate is preferred among those mentioned above.

Examples of ethylenic unsaturated monomers with methylol groups include N-methylolacrylamide, N-methylolmethacrylamide, dimethylolacrylamide and dimethylolmethacrylamide. They may be used alone or as combinations of two or more types.

Examples of ethylenic unsaturated monomers with alkoxymethyl groups include N-methoxymethylacrylamide, N-methoxymethylmethacrylamide, N-butoxymethylacrylamide and N-butoxymethylmethacrylamide. They may be used alone or as combinations of two or more types.

Examples of ethylenic unsaturated monomers with hydrolyzable silyl groups include vinylsilane, γ-acryloxypropyltrimethoxysilane, γ-acryloxypropyltriethoxysilane, γ-methacryloxypropyltrimethoxysilane and γ-methacryloxypropyltriethoxysilane. They may also be used alone or as combinations of two or more types.

Polyfunctional (meth)acrylates are particularly preferred for the crosslinkable monomer (b4), because they have low variation in crosslinking degree.

From the viewpoint of satisfactory oxidation resistance of the thermoplastic polymer comprising the copolymer, and improved copolymerizable in emulsion polymerization, the other monomer (B) preferably comprises a (meth)acrylic acid ester monomer (b5). The (meth)acrylic acid ester monomer (b5) is a monomer different from the aforementioned monomers (b1) to (b4). Examples for the (meth)acrylic acid ester monomer (b5) include (meth)acrylic acid esters with one ethylenic unsaturated bond, and more specifically (meth)acrylates with alkyl groups, such as methyl acrylate, ethyl acrylate, propyl acrylate, isopropyl acrylate, butyl acrylate, isobutyl acrylate, t-butyl acrylate, n-hexyl acrylate, 2-ethylhexyl acrylate, lauryl acrylate, methyl methacrylate, ethyl methacrylate, propyl methacrylate, isopropyl acrylate, butyl methacrylate, isobutyl methacrylate, t-butyl methacrylate, n-hexyl methacrylate, 2-ethylhexyl methacrylate and lauryl methacrylate (more preferably (meth)acrylates comprising both an alkyl group and a (meth)acryloyloxy group). Preferred among these from the viewpoint of improved copolymerizability in emulsion polymerization are (meth)acrylic acid ester monomers comprising an alkyl group of 4 or more carbon atoms and a (meth)acryloyloxy group, and more preferred are (meth)acrylic acid ester monomers comprising an alkyl group of 6 or more carbon atoms and a (meth)acryloyloxy group. More specifically, methyl methacrylate, butyl acrylate, butyl methacrylate and 2-ethylhexyl acrylate are preferred, butyl acrylate, butyl methacrylate and 2-ethylhexyl acrylate are more preferred, and 2-ethylhexyl acrylate is even more preferred. These (meth)acrylic acid ester monomers (b5) may be used alone, or two or more may be used in combination.

Examples of ethylenic unsaturated monomers (b6) with a cyano group include acrylonitrile and methyacrylonitrile. Examples of ethylenic unsaturated monomers with an aromatic group include styrene, vinyltoluene and α-methylstyrene. Styrene is preferred among these.

From the viewpoint of obtaining both adhesion and ion permeability for the separator, the copolymerization ratio (total content ratio) of the (meth)acrylic acid ester monomer in the PEU-containing thermoplastic copolymer is preferably 50 to 99.9 weight %, more preferably 60 to 99.9 weight %, even more preferably 70 to 99.9 weight % and yet more preferably 80 to 99.9 weight %, based on the weight of the PEU-containing thermoplastic copolymer. Here, the (meth)acrylic acid ester monomers include ethylenic unsaturated monomers having a polyalkyleneglycol group (P) that correspond to (meth)acrylic acid esters, the (meth)acrylic acid ester monomers with a cycloalkyl group (A) that correspond to (meth)acrylic acid esters, and all of the (meth)acrylic acid ester monomers without a polyalkyleneglycol group and without a cycloalkyl group (b5). If the content ratio of the (meth)acrylic acid ester monomer is within the range specified above, the separator will have more satisfactory adhesion with electrodes and oxidation resistance of the thermoplastic polymer, when it is used in a non-aqueous electrolytic solution-employing secondary battery.

When the other monomer (B) comprises an ethylenic unsaturated monomer with a carboxyl group (b1), an ethylenic unsaturated monomer with an amide group (b2) or an ethylenic unsaturated monomer with a hydroxyl group (b3), the total content ratio of (b1), (b2) and (b3) in the copolymer is preferably 0.1 weight % or greater with respect to 100 weight % of the copolymer. The content is preferably no greater than 10 weight %, more preferably no greater than 7 weight % and even more preferably no greater than 5 weight %. If the total content ratio of these three monomers is 0.1 weight % or greater, adhesion between the separator and the electrodes will tend to be increased, and if it is no greater than 10 weight %, removal of water from the aqueous dispersion will tend to be easier.

Furthermore, when the other monomer (B) comprises an ethylenic unsaturated monomer with a carboxyl group (b1), the content ratio of the monomer (b1) in the copolymer is preferably no greater than 5 weight %. The dispersion stability of the aqueous dispersion will tend to be increased if the content ratio of the monomer (b1) is no greater than 5 weight %.

When the other monomer (B) comprises a crosslinkable monomer (b4), the content ratio of the crosslinkable monomer (b4) in the copolymer is preferably 0.01 weight % or greater and more preferably 0.1 weight % or greater, with respect to 100 weight % of the copolymer. The content ratio is also preferably no greater than 10 weight %, more preferably no greater than 5 weight % and even more preferably no greater than 3 weight %. If the content ratio of the crosslinkable monomer (b4) is 0.01 weight % or greater the electrolytic solution resistance be even further increased, and if it is 10 weight % or lower, reduction in adhesion between the separator and the electrodes can be minimized.

From the viewpoint of adhesion to electrodes and ion permeability of the separator, the PEU-containing thermoplastic copolymer of the embodiment preferably comprises an ethylenic unsaturated monomer with a cycloalkyl group (A) and a (meth)acrylic acid ester monomer (b5), as monomers without polyalkyleneglycol groups. The total content of the ethylenic unsaturated monomer with a cycloalkyl group (A) and the (meth)acrylic acid ester monomer (b5) is preferably 50 to 98 weight %, 51 to 97 weight % or 55 to 95 weight % with respect to 100 weight % of the PEU-containing thermoplastic copolymer.

The PEU-containing thermoplastic copolymer may also comprise, as an additional copolymer unit, a monomer other than the monomers mentioned above.

In the thermoplastic polymer layer, a thermoplastic polymer other than the PEU-containing thermoplastic copolymer may be blended together with the PEU-containing thermoplastic copolymer.

Examples of thermoplastic polymers other than PEU-containing thermoplastic copolymers include the following:

polyolefin resins such as polyethylene, polypropylene and α-polyolefin;

fluorine-based polymers such as polyvinylidene fluoride and polytetrafluoroethylene, and copolymers comprising them;

diene-based polymers comprising conjugated dienes such as butadiene and isoprene as monomer units, or copolymers comprising them, or their hydrogenated forms;

acrylic polymers comprising (meth)acrylates as monomer units and having no PEU, or copolymers comprising them, or their hydrogenated forms;

rubber compounds such as ethylene-propylene rubber, polyvinyl alcohol and polyvinyl acetate;

cellulose derivatives such as ethyl cellulose, methyl cellulose, hydroxyethyl cellulose and carboxymethyl cellulose;

polyalkylene glycols without polymerizable functional groups, such as polyethylene glycol and polypropylene glycol;

resins such as polyphenylene ether, polysulfone, polyethersulfone, polyphenylene sulfide, polyetherimide, polyamideimide, polyamide and polyester;

and also combinations of the above.

Preferred among these are diene-based polymers, acrylic polymers and fluorine-based polymers, and especially acrylic polymers, from the viewpoint of adhesion with electrode active materials, strength of the thermoplastic polymer layer, softness and coatability.

The content of the PEU-containing thermoplastic copolymer in the thermoplastic polymer layer may be 2 weight % or greater, 5 weight % or greater, 10 weight % or greater, 15 weight % or greater or 20 weight % or greater, and up to 100 weight %, up to 99 weight % or up to 98 weight %, based on the weight of the thermoplastic polymer layer.

The glass transition temperature (Tg) of the thermoplastic polymer used for the embodiment is preferably −50° C. or higher, more preferably −30° C. or higher and even more preferably in the range of −30° C. to 150° C., from the viewpoint of adhesion with electrodes and ion permeability.

The glass transition temperature for the embodiment is determined from a DSC curve obtained by differential scanning calorimetry (DSC). Specifically, the value used for the glass transition temperature may be the temperature at the intersection between a straight line extending the low-temperature end baseline in the DSC curve toward the high-temperature end, and the tangent line at the inflection point in the stepwise change region of glass transition. More specifically, it may be determined with reference to the method described in the Examples.

Moreover, the "glass transition" refers to the value when a change in heat quantity accompanying the change of state of a polymer test piece in DSC occurs at the endothermic end. The change in heat quantity is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change".

The "inflection point" is the point at which the slope of the DSC curve is maximum in the stepwise change region. If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature region where no transition or reaction takes place in the test piece.

The glass transition temperature Tg of the thermoplastic polymer of the embodiment can be appropriately adjusted by changing the monomer components used for production of the thermoplastic polymer, and the loading proportion of each monomer, for example. Specifically, the glass transition temperature for each monomer used for production of the thermoplastic polymer can be estimated from the commonly used Tg for its homopolymer (as listed in "Polymer Handbook (a Wiley-Interscience Publication), for example), and the mixing proportion of the monomer. For example, the Tg of a copolymer copolymerized with a high proportion of a monomer such as methyl methacrylate, acrylonitrile or methacrylic acid, that have homopolymer Tg values of ~100° C., will be higher, and the Tg of a copolymer copolymerized with a high proportion of a monomer such as n-butyl acrylate or 2-ethylhexyl acrylate, that have homopolymer Tg values of ~−50° C., will be lower.

The Tg of a copolymer can be approximated by the Fox formula, represented by the following mathematical formula (1):

$$1/Tg = W_1/Tg_1 + W_2/Tg_2 + \ldots + W_i/Tg_i + \ldots W_n/Tg_n \quad (1)$$

wherein Tg (K) is the Tg of the copolymer, $Tg_i$ (K) is the Tg of a homopolymer of monomer i, and $W_i$ is the mass fraction of the monomer.

However, the glass transition temperature Tg of the thermoplastic polymer used for the embodiment is the value measured by a method using DSC as described above.

From the viewpoint of wettability on the polyolefin microporous film, bindability between the polyolefin microporous film and the thermoplastic polymer layer and adhesion with electrodes, the thermoplastic polymer layer is more preferably blended with a polymer having a glass transition temperature below 20° C., and from the viewpoint of blocking resistance and ion permeability, it is more preferably also blended with a polymer having a glass transition temperature of 20° C. or higher. That is, the thermoplastic polymer layer preferably has at least two glass transition points. A thermoplastic polymer with a glass transition temperature of lower than 20° C. may be one with a glass transition temperature of preferably no higher than 15° C. and more preferably no higher than 0° C., while the glass transition temperature is also preferably −30° C. or higher. The thermoplastic polymer with a glass transition temperature of 20° C. or higher, on the other hand, may be one with a glass transition temperature of more preferably 30° C. or higher, even more preferably 40° C. or higher and yet more preferably 50° C. or higher, while the glass transition temperature is preferably no higher than 120° C.

This will produce an effect of more excellent adhesion between the separator and the electrodes, and an even more excellent handling property.

A thermoplastic polymer with at least two glass transition temperatures can be obtained by a method of blending of two or more thermoplastic polymers or a method using a thermoplastic polymer with a core-shell structure, without any limitation to these methods.

A core-shell structure means that the polymer has a double structure form, made of a composition in which the polymer belonging to the core portion and the polymer belonging to the shell portion are different.

For a polymer blend or core-shell structure, the glass transition temperature of the thermoplastic polymer as a whole can be controlled by combination of a polymer with a high glass transition temperature and a polymer with a low glass transition temperature. Multiple functions can also be imparted to the thermoplastic polymer as a whole.

In the embodiment, the PEU-containing thermoplastic copolymer more preferably includes one that has a glass transition temperature of 20° C. or higher and that is particulate, from the viewpoint of blocking resistance, ion permeability and adhesion of the separator. The binder with a glass transition temperature of below 20° C. may also be a PEU-containing thermoplastic copolymer.

The term "particulate" as used herein means that in measurement with a scanning electron microscope (SEM) the individual thermoplastic polymers are observed as having borders, and the observed particles may have any shapes such as thin elongated, spherical or polygonal.

By including a particulate thermoplastic copolymer in the thermoplastic polymer layer it is possible to ensure porosity for the thermoplastic polymer layer on the substrate, and blocking resistance for the separator.

The mean particle size of the PEU-containing thermoplastic copolymer is preferably 10 nm or greater, more preferably 50 nm or greater and even more preferably 100 nm or greater. It is also preferably no greater than 1,000 nm, more preferably no greater than 800 nm and even more preferably no greater than 700 nm. A mean particle size of 10 nm or greater is in order to ensure dimensions for the particulate thermoplastic polymer so that it will not infiltrate into the pores of the substrate that includes at least the porous film, when the particulate thermoplastic polymer has been coated onto the substrate, and additionally in order to allow the ion permeability of the coating layer itself to be maintained. Accordingly, this range is preferred from the standpoint of enhancing the adhesion between an electrode and the separator and the cycle characteristic and rate property of an electricity storage device. The mean particle size is preferably limited to no greater than 1,000 nm from the viewpoint of ensuring dispersion stability for the aqueous dispersion, and also from the viewpoint of allowing the coating layer thickness to be controlled in a flexible manner. The mean particle size of the particulate thermoplastic polymer can be measured by the method described in the Examples.

In order to obtain a satisfactory balance between adhesion and blocking resistance for the separator, it is preferred for the thermoplastic polymer layer to contain two or more thermoplastic polymer particles with different mean particle sizes. It is more preferred to use a combination of thermoplastic polymer particles having a mean particle size of 10 nm to 300 nm (hereunder referred to as "small-diameter particles") and thermoplastic polymer particles having a mean particle size of greater than 100 nm and no greater than 2,000 nm (hereunder referred to as "large-diameter particles").

The PEU-containing thermoplastic copolymer may be used for either or both the small-diameter particles and large-diameter particles.

The particulate thermoplastic polymer described above can be produced according to a known polymerization method, except for the use of the corresponding monomers or comonomers. The polymerization method used may be any appropriate method such as solution polymerization, emulsion polymerization or bulk polymerization.

An emulsion polymerization method is most preferred for obtaining a particulate dispersion. There are no particular restrictions on the method of emulsion polymerization, and any publicly known method of the prior art may be employed. For example, a copolymer can be obtained by polymerizing a monomer composition containing each of the monomers in a dispersed system containing the monomers, a surfactant, a radical polymerization initiator and other additive components as necessary, as the basic components, in an aqueous medium. Various methods may be utilized as necessary for the polymerization, such as a method in which the makeup of the supplied monomer composition is kept constant during the entire polymerization process, or a method in which it is successively or continuously varied during the polymerization process to create morphological variation in the particles of the resin dispersion that is produced. When the copolymer is obtained by emulsion polymerization, it may be in the form of an aqueous dispersion (latex) comprising water and a particulate copolymer dispersed in the water, for example.

A surfactant is a compound having at least one hydrophilic group and at least one lipophilic group in the molecule. Examples of surfactants include anionic surfactants such as non-reactive alkylsulfuric acid esters, polyoxyethylenealkyl ether sulfuric acid ester salts, alkylbenzenesulfonic acid salts, alkylnaphthalenesulfonic acid salts, alkylsulfosuccinic acid salts, alkyldiphenylether disulfonic acid salts, formalin naphthalenesulfonate condensate, polyoxyethylene polycyclic phenylether sulfuric acid ester salts, polyoxyethylene distyrenated phenyl ethersulfuric acid ester salts, fatty acid salts, alkylphosphoric acid salts and polyoxyethylenealkylphenyl ether sulfuric acid ester salts, and nonionic surfactants such as non-reactive polyoxyethylenealkyl ethers, polyoxyalkylenealkyl ethers, polyoxyethylenepolycyclic phenyl ethers, polyoxyethylene distyrenated phenyl ethers, sorbitan fatty acid esters, polyoxyethylenesorbitan fatty acid esters, polyoxyethylene sorbitol fatty acid esters, glycerin fatty acid esters, polyoxyethylene fatty acid esters, polyoxyethylenealkylamines, alkylalkanolamides and polyoxyethylenealkylphenyl ethers. In addition to these, there may be used reactive surfactants comprising an ethylenic double bond introduced into the chemical structural formula of a surfactant having a hydrophilic group and a lipophilic group.

Examples of anionic surfactants among reactive surfactants include ethylenic unsaturated monomers having sulfonic acid, sulfonates or sulfuric acid esters or their salts, among which compounds with groups that are ammonium salts or alkali metal salts of sulfonic acid (ammonium sulfonate or alkali metal sulfonate groups) are preferred. Specific examples include alkylallylsulfosuccinic acid salts (for example, ELEMINOL™ JS-20 by Sanyo Chemical Industries, Ltd. and LATEMUL (trademark, same hereunder) S-120, S-180A and S-180 by Kao Corp., polyoxyethylenealkylpropenylphenyl ethersulfuric acid ester salts (for example, AQUALON (trademark, same hereunder) HS-10 by Dai-ichi Kogyo Seiyaku Co., Ltd.), α-[1-[(allyloxy)methyl]-2-(nonylphenoxy)ethyl]-ω-polyoxyethylenesulfuric acid ester salts (for example, ADEKA REASOAP (trademark, same hereunder) SE-10N by Adeka Corp., ammonium=α-sulfonato-ω-1-(allyloxymethyl)alkyloxypolyoxyethylene (for example, AQUALON KH-10 by Dai-ichi Kogyo Seiyaku Co., Ltd.), styrenesulfonic acid salts (for example, SPINOMAR™ NaSS by Tosoh Finechem Corp.), α-[2-[(allyloxy)-1-(alkyloxymethyl)ethyl]-ω-polyoxyethylenesulfuric acid ester salts (for example, ADEKA REASOAP SR-10 by Adeka Corp.), and polyoxyethylenepolyoxybutylene (3-methyl-3-butenyl)ether sulfuric acid ester salts (for example, LATEMUL PD-104 by Kao Corp.).

Examples of nonionic surfactants among reactive surfactants also include α-[1-[(allyloxy)methyl]-2-(nonylphenoxy)ethyl]-ω-hydroxypolyoxyethylene (for example, ADEKA REASOAP NE-20, NE-30 and NE-40 by Adeka Corp.), polyoxyethylenealkylpropenylphenyl ethers (for example, AQUALON RN-10, RN-20, RN-30 and RN-50 by Dai-ichi Kogyo Seiyaku Co., Ltd.), α-[2-[(allyloxy)-1-(alkyloxymethyl)ethyl]-ω-hydroxypolyoxyethylene (for example, ADEKA REASOAP ER-10 by Adeka Corp.), and polyoxyethylenepolyoxybutylene (3-methyl-3-butenyl) ether (for example, LATEMUL PD-420 by Kao Corp.).

Among these various types of surfactants, reactive surfactants are preferred, anionic reactive surfactants are more preferred, and reactive surfactants with sulfonic acid groups are even more preferred. These surfactants are preferably used at 0.1 to 5 parts by weight with respect to 100 parts by weight of the monomer composition. One type of surfactant may be used alone, or two or more may be used in combination.

As radical polymerization initiators there may be used any inorganic initiators or organic initiators that undergo radical decomposition by heat or reducing substances to initiate addition polymerization of monomers. Either water-soluble or oil-soluble polymerization initiators may be used as radical polymerization initiators. Examples of water-soluble polymerization initiators include peroxodisulfuric acid salts, peroxides, water-soluble azobis compounds, and peroxide-reducing agent redox-type initiators. Examples of peroxodisulfuric acid salts include potassium peroxodisulfate (KPS), sodium peroxodisulfate (NPS) and ammonium peroxodisulfate (APS), examples of peroxides include hydrogen peroxide, t-butyl hydroperoxide, t-butylperoxymaleic acid and succinic acid peroxide and benzoyl peroxide, examples of water-soluble azobis compounds include 2,2-azobis(N-hydroxyethylisobutylamide), 2,2-azobis(2-amidinopropane) 2HCl and 4,4-azobis(4-cyanopentanoic acid), and examples of peroxide-reducing agent redox-type initiators include combinations of the aforementioned peroxides with one or more reducing agents such as sodium sulfooxylate formaldehyde, sodium hydrogen sulfite, sodium thiosulfate, sodium hydroxymethanesulfinate or L-ascorbic acid, or their salts, cuprous salts or ferrous salts.

The radical polymerization initiator may be used at, preferably, 0.05 to 2 parts by weight with respect to 100 parts by weight of the monomer composition. A single type of radical polymerization initiator may be used, or two or more may be used in combination.

When the monomer composition comprising the ethylenic unsaturated monomer having a polyalkyleneglycol group (P), the ethylenic unsaturated monomer with a cycloalkyl group (A) and the other monomer (B) is to be used for emulsion polymerization and a dispersion is to be formed by dispersing the polymer particles in a solvent (water), the solid content of the dispersion is preferably 30 weight % to 70 weight %.

The dispersion is also preferably adjusted to a pH in the range of 5 to 12 in order to maintain long-term dispersion stability. The pH is preferably adjusted using ammonia, sodium hydroxide, potassium hydroxide or an amine compound such as dimethylaminoethanol, and more preferably the pH is adjusted with ammonia (water) or sodium hydroxide.

The aqueous dispersion of the embodiment comprises particles of a copolymer, obtained by copolymerization of a monomer composition including the specific monomers mentioned above (copolymer particles), dispersed in water. In addition to water and the copolymer, the aqueous dispersion may also include a solvent such as methanol, ethanol or isopropyl alcohol, and a dispersing agent, lubricant, thickener, microbicide or the like.

Since the thermoplastic polymer layer can be easily formed by coating according to the embodiment, preferably the particulate thermoplastic polymer is formed by emulsion polymerization and the thermoplastic polymer emulsion obtained by the polymerization is used as an aqueous latex.

(Optional Components)

The thermoplastic polymer layer of the embodiment may comprise the thermoplastic polymer alone, or it may also comprise other optional components in addition to the thermoplastic polymer. Examples of optional components include the inorganic filler described above for formation of the filler porous layer.

<Method for Producing Separator for Electricity Storage Device>

[Method for Producing Polyolefin Porous Substrate]

The method for producing the polyolefin porous substrate of the embodiment is not particularly restricted, and any publicly known method may be employed. Examples include a method of melt kneading a polyolefin resin composition and a plasticizer and molding the mixture into a sheet, optionally with stretching, and then extracting the plasticizer to form pores; a method of melt kneading a polyolefin resin composition, extruding it at a high draw ratio, and then stretching it with heat treatment to detach the polyolefin crystal interface and form pores; a method of melt kneading a polyolefin resin composition and an inorganic filler and casting the mixture into a sheet, and then detaching the interface between the polyolefin and the inorganic filler by stretching to form pores; and a method of first dissolving the polyolefin resin composition, and then dipping it in a poor solvent for the polyolefin to solidify the polyolefin while simultaneously removing the solvent, to form pores.

The method of fabricating a nonwoven fabric or paper sheet as the substrate may also be a publicly known method. The fabrication method may be, for example, a chemical bond method in which a web is immersed in a binder and dried to produce bonding between the fibers; a thermal bond method in which heat-fusible fibers are mixed into a web and the fibers are partially melted to produce bonding between the fibers; a needle punching method in which a web is repeatedly pierced with a puncturing needle to mechanically tangle the fibers; or a hydroentangling method in which a high-pressure water stream is sprayed from a nozzle onto a web through a net (screen), producing tangling between the fibers.

An example of a method of producing the polyolefin porous substrate will now be described, as a method of melt kneading a polyolefin resin composition and a plasticizer, casting the mixture into a sheet, and then extracting the plasticizer.

First, the polyolefin resin composition and the plasticizer are melt kneaded. In the melt kneading method, a polyolefin resin and other additives as necessary may be loaded into a resin kneader such as an extruder, kneader, Laboplastomil, kneading roll or Banbury mixer, and the plasticizer introduced at a desired proportion and kneaded in while hot melting the resin components. Before loading the polyolefin resin, the other additives and the plasticizer into the resin kneader, they are preferably pre-kneaded in a prescribed proportion using a Henschel mixer or the like. More preferably, only a portion of the plasticizer is used during the pre-kneading, and the remainder of the plasticizer is kneaded in a resin kneader while side-feeding it to the resin kneader.

The plasticizer used may be a non-volatile solvent that can form a homogeneous solution at or above the melting point of the polyolefin. Specific examples of such non-volatile solvents include hydrocarbons such as liquid paraffin and paraffin wax; esters such as dioctyl phthalate and dibutyl phthalate; and higher alcohols such as oleyl alcohol and stearyl alcohol, with liquid paraffin being preferable among these.

The proportion of the polyolefin resin composition and the plasticizer is not particularly restricted so long as it is in a range in which they can undergo uniform melt kneading to then be cast into a sheet form. For example, the weight fraction of the plasticizer in the composition comprising the polyolefin resin composition and the plasticizer is preferably 30 to 80 weight % and more preferably 40 to 70 weight %. The weight fraction of the plasticizer is preferably within this range from the viewpoint of both melt tension during melt molding, and formation of a homogeneous and fine pore structure.

The melt kneaded mixture is then cast into a sheet. The method of producing the cast sheet may be, for example, a method of extruding the melt kneaded mixture through a T-die or the like into a sheet, and contacting it with a heat conductor to cool it to a sufficiently lower temperature than the crystallization temperature of the resin component, thereby solidifying it. The heat conductor used for the cooling solidification may be metal, water, air or the plasticizer itself, but a metal roll is preferred because it has high heat conduction efficiency. When the melt kneaded mixture is to be contacted with metal rolls, it is more preferably sandwiched between the rolls because this will further increase the heat conduction efficiency while causing the sheet to become oriented and increasing the film strength, while the surface smoothness of the sheet will also be improved. The die lip gap when extruding into a sheet from a T-die is preferably from 400 μm to 3,000 μm and more preferably from 500 μm to 2,500 μm.

The cast sheet obtained in this manner is then preferably stretched. Both uniaxial stretching and biaxial stretching are suitable for the stretching treatment. Biaxial stretching is preferred from the viewpoint of the strength of the obtained porous substrate. When a cast sheet is subjected to high-ratio stretching in the biaxial directions, the molecules become oriented in the in-plane direction, such that the porous substrate that is obtained as the final result is less likely to tear, and has high puncture strength. Examples of stretching methods include simultaneous biaxial stretching, sequential biaxial stretching, multistage stretching and repeated stretching. Simultaneous biaxial stretching is preferred from the viewpoint of increasing the puncture strength and obtaining greater uniformity during stretching and superior shutdown properties.

The draw ratio is an area increase by a factor of preferably in the range of 20 to 100, and more preferably in the range of 25 to 50. The draw ratio in each axial direction is preferably in the range of between 4 and 10, inclusive, in the MD direction and between 4 and 10, inclusive, in the TD direction, and more preferably in the range of between 5 and 8, inclusive, in the MD direction and between 5 and 8, inclusive, in the TD direction. The increase in total area is preferably within this range, because it will be possible to impart sufficient strength while preventing film breakage in the stretching step and obtaining high productivity.

The cast sheet obtained as described above may also be subjected to rolling. Rolling may be carried out, for example, by a press method using a double belt press machine or the like. Rolling can increase the orientation of the surface layer sections, in particular. The area increase by rolling is preferably by a factor of greater than 1 and no greater than 3, and more preferably a factor of greater than 1 and no greater than 2. The area increase by rolling is preferably within this range from the viewpoint of increasing the film strength of the porous substrate that is obtained at the final stage, and allowing formation of a porous structure that is uniform in the thickness direction of the film.

The plasticizer is then removed from the cast sheet to obtain a porous substrate. The method of removing the plasticizer may be, for example, a method of immersing the cast sheet in an extraction solvent to extract the plasticizer, and then thoroughly drying it. The method of extracting the plasticizer may be either a batch process or a continuous process. In order to minimize contraction of the porous substrate, it is preferred to constrain the edges of the cast sheet during the series of steps of immersion and drying. The plasticizer residue in the porous substrate is preferably less than 1 weight %.

The extraction solvent used is preferably one that is a poor solvent for the polyolefin resin and a good solvent for the plasticizer, and that has a boiling point that is lower than the melting point of the polyolefin resin. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

In order to minimize contraction of the porous substrate, heat treatment such as heat setting or thermal relaxation may be carried out, either after the stretching step or after formation of the porous substrate. The porous substrate may also be subjected to post-treatment such as hydrophilicizing treatment with a surfactant, or crosslinking treatment with ionizing radiation.

[Method of Placing Thermoplastic Polymer Layer]

The thermoplastic polymer layer is disposed on at least one side of the polyolefin porous substrate produced as described above. The method for disposing the thermoplastic polymer on the polyolefin porous substrate is not particularly restricted, and an example is a method of coating the polyolefin porous substrate with a coating solution comprising the thermoplastic polymer. This also applies for the method of disposing the thermoplastic polymer layer on a filler porous layer provided on the polyolefin porous substrate.

The coating solution used is preferably a dispersion of the thermoplastic polymer dispersed in a solvent that does not dissolve the polymer. Most preferably, the thermoplastic polymer is synthesized by emulsion polymerization, and the emulsion obtained by the emulsion polymerization is directly used as the coating solution.

The method of coating the coating solution containing the thermoplastic polymer onto the polyolefin porous substrate is not particularly restricted so long as it can result in the desired coating pattern, coated film thickness and coating area. Examples include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods, spray coating methods and ink-jet coating methods. Preferred among these are gravure coater methods or spray coating methods, from the viewpoint of a high degree of freedom for the coating shape of the thermoplastic polymer, and in order to easily obtain the preferred area ratio.

The medium of the coating solution is preferably water or a mixed solvent comprising water and a water-soluble organic medium. The water-soluble organic medium is not particularly restricted, and it may be ethanol or methanol, for example. Water is more preferred among those mentioned above. If the coating solution infiltrates to the interior of the substrate when it is coated onto the substrate, the thermoplastic polymer including the copolymer will tend to obstruct the surfaces and interiors of the pores of the substrate, thus lowering the permeability. Using water as the solvent or dispersing medium for the coating solution will make the coating solution less likely to infiltrate to the interiors of the substrate and will make the thermoplastic polymer including the copolymer less likely to be present on the outer surface of the substrate, and therefore water is preferred to effectively minimize reduction in permeability. Examples of solvents or dispersing media that may be used in combination with water include ethanol and methanol.

Surface treatment is preferably carried out on the surface of the polyolefin porous substrate prior to coating, as this will facilitate coating of the coating solution while improving adhesion between the polyolefin porous substrate and the thermoplastic polymer. The method of surface treatment may be, for example, corona discharge treatment, plasma treatment, mechanical roughening, solvent treatment, acid treatment or ultraviolet oxidation.

The method of removing the solvent from the coated film after coating is not particularly restricted so long as it is a method that does not adversely affect the porous substrate or the polymer layer. For example, it may be a method of drying the polyolefin porous substrate at a temperature below its melting point while anchoring it, a method of reduced pressure drying at low temperature, or a method of immersing it in a poor solvent for the thermoplastic polymer to solidify the thermoplastic polymer as particles, while simultaneously extracting out the solvent.

<Separator for an Electricity Storage Device>

There are no particular restrictions on electricity storage devices that may comprise the separator for an electricity storage device of the embodiment, and examples include batteries such as non-aqueous electrolytic solution secondary batteries, as well as condensers and capacitors. Batteries are preferred among these from the viewpoint of more effectively obtaining advantages by the function and effect of the invention, with non-aqueous electrolytic solution secondary batteries being more preferred and lithium-ion secondary batteries being even more preferred. The separator for an electricity storage device of the embodiment comprises a thermoplastic polymer layer including a copolymer with an ethylenic unsaturated monomer having a polyalkyleneglycol group as a monomer unit, formed on a porous substrate, and it exhibits excellent permeability and adhesion with electrode active materials.

The separator for an electricity storage device of the embodiment, when overlaid with electrodes and wetted with an electrolytic solution, preferably has a peel strength of 2 N/m or greater when pressed under conditions with a press temperature of 100° C., a pressing pressure of 1.0 MPa and a press time of 2 minutes. The electrolytic solution used is a mixed solvent of ethylene carbonate (EC) and diethyl carbonate (DEC) (EC:DEC (mass ratio)=2:3), containing 1 mol/L $LiPF_6$. This aforementioned property signifies that the separator of the embodiment exhibits adhesion with electrodes. By setting the peel strength within this range, it is possible to adequately ensure adhesion between the separator and the electrodes, to minimize detachment between the separator and electrodes that may occur when the electrodes undergo expansion and contraction by charge-discharge, and to avoid increasing the battery thickness. This permits uniform influx/outflux of lithium ions, reduces generation of lithium dendrites, and provides a satisfactory cycle characteristic.

The electrode used for measurement of the peel strength may be either a positive electrode or a negative electrode, but a positive electrode is preferably used for proper ascertainment of the effect of the separator for an electricity storage device of the embodiment. The measurement may be carried out most suitably if a positive electrode for a lithium-ion secondary battery, having a positive electrode active material layer comprising a positive electrode active material formed on a positive electrode collector, is overlaid in such a manner that the positive electrode active material layer is facing the thermoplastic polymer layer-formed side of the separator, and then hot pressed as described above.

The positive electrode for the lithium-ion secondary battery is described below.

When the outermost surface of the separator with the thermoplastic polymer layer is pressed with an aluminum foil for 3 minutes under conditions with a temperature of 25° C. and a pressure of 5 MPa, the peel strength between the separator and the aluminum foil (hereunder also referred to as "ordinary temperature peel strength" or "value of blocking measured") is preferably no greater than 20 N/m, more preferably no greater than 8 N/m, even more preferably no greater than 7 N/m and especially preferably no greater than 6 N/m.

Since an aluminum foil is used as an electrode collector, measurement of the ordinary temperature peel strength allows convenient confirmation of the adhesion of the separator with electrodes and its blocking resistance (the separator handling properties) at ordinary temperature. If the ordinary temperature peel strength is greater than 20 N/m, a value of blocking measured of the separator will be observed and the slittability or windability of the separator will be hampered. The ordinary temperature peel strength is therefore preferably no greater than 20 N/m.

When the outermost surface of the separator with the thermoplastic polymer layer is pressed with an aluminum foil for 3 minutes under conditions with a temperature of 80°

C. and a pressure of 10 MPa, the peel strength between the separator and the aluminum foil (hereunder also referred to as "hot peel strength") is preferably 9.8 N/m or greater, more preferably 14.7 N/m or greater and even more preferably 19.6 N/m or greater.

Since an aluminum foil is used as an electrode collector, measurement of the hot peel strength allows convenient confirmation of the adhesion of the separator with electrodes when heated. If the hot peel strength is less than 9.8 N/m, detachment may be observed between the electrodes and separator during assembly or use of the electricity storage device, which can result in lower performance of the electricity storage device.

The ordinary temperature peel strength and hot peel strength are measured by the methods described in the Examples.

The gas permeability of the separator for an electricity storage device of the embodiment is preferably 10 to 10,000 seconds/100 cc, more preferably 10 to 1,000 seconds/100 cc and even more preferably 50 to 500 seconds/100 cc. This will result in high ion permeability being exhibited when the separator has been applied in a lithium-ion secondary battery.

The gas permeability is the air permeability resistance measured according to JIS P-8117, similar to the gas permeability of the polyolefin porous substrate.

<Electricity Storage Device>

The electricity storage device of the embodiment comprises a separator for an electricity storage device, but its construction is otherwise similar to those known in the prior art. The electricity storage device may include an electrode body composed of a positive electrode, a separator of the embodiment and a negative electrode, and an electrolytic solution. There are no particular restrictions on the electricity storage device, and examples include batteries such as non-aqueous electrolytic solution secondary batteries, as well as condensers and capacitors. Batteries are preferred among these from the viewpoint of more effectively obtaining the advantages by the function and effect of the invention, with non-aqueous electrolytic solution secondary batteries being more preferred and lithium-ion secondary batteries being even more preferred. A preferred mode in which the electricity storage device is a non-aqueous electrolytic solution secondary battery will now be described.

For manufacture of a lithium-ion secondary battery using the separator of the embodiment, there are no restrictions for the positive electrode, negative electrode and non-aqueous electrolytic solution, and any publicly known ones may be used.

The positive electrode used may be a positive electrode having a positive electrode active material layer comprising a positive electrode active material formed on a positive electrode collector. The positive electrode collector may be an aluminum foil, for example, and the positive electrode active material may be a lithium-containing complex oxide such as $LiCoO_2$, LiNiO2, spinel LiMnO4 or olivine-type LiFePO4, for example. The positive electrode active material layer may include a binder and a conductive material in addition to the positive electrode active material.

The negative electrode used may be a negative electrode having a negative electrode active material layer comprising a negative electrode active material formed on a negative electrode collector. The negative electrode collector may be a copper foil, for example, and the negative electrode active material may be a carbon material such as graphite, a non-graphitizable carbon material, an easily graphitizable carbon material or complex carbon; or silicon, tin, metal lithium or any of various alloy materials, for example.

There are no particular restrictions on the non-aqueous electrolytic solution, and an electrolytic solution comprising an electrolyte dissolved in an organic solvent may be used. Examples of organic solvents include propylene carbonate, ethylene carbonate, dimethyl carbonate, diethyl carbonate and ethylmethyl carbonate. Examples of electrolytes include lithium salts such as $LiClO_4$, $LiBF_4$ and $LiPF_6$.

There are no particular restrictions on the method of producing an electricity storage device using the separator for an electricity storage device of the embodiment. The following methods may be mentioned as examples.

The separator of the embodiment can be produced by first fabricating longitudinally shaped separators each with a width of 10 to 500 mm (preferably 80 to 500 mm) and a length of 200 to 4,000 m (preferably 1,000 to 4,000 m), laminating the separators in the order: positive electrode-separator-negative electrode-separator, or negative electrode-separator-positive electrode-separator, winding the laminate into a circular or flat spiral form to obtain a wound body, and inserting the wound body into a battery can and further injecting an electrolytic solution into it. Alternatively, it can be produced by a method in which a laminated body composed of separator sheets and electrodes (for example, a flat laminate in the order: positive electrode-separator-negative electrode-separator-positive electrode, or negative electrode-separator-positive electrode-separator-negative electrode), or a wound body obtained by folding the electrodes and separator, is placed in a battery container (for example, an aluminum film), which is then filled with an electrolytic solution.

The laminated body or wound body may be pressed during the procedure. A specific example is a method in which the separator for an electricity storage device of the embodiment is overlaid and pressed with an electrode having a collector and an active material layer formed on at least one side of the collector, so that the thermoplastic polymer layer and the active material layer are facing each other.

The pressing temperature is preferably 20° C. or higher, as an example of a temperature allowing the adhesion to be effectively exhibited. From the viewpoint of minimizing blocking or heat shrinkage of the separator pores by hot pressing, the pressing temperature is preferably lower than the melting point of the polyolefin porous substrate, and even more preferably no higher than 120° C. The pressing pressure is preferably no higher than 20 MPa from the viewpoint of minimizing blocking of the separator pores. The pressing time may be up to 1 second when a roll press is used, or several hours for surface pressing. Using the separator for an electricity storage device of the embodiment in the production process described above can reduce press back during press molding of a wound body comprising electrodes and the separator. It can also prevent detachment and positional shifting after press molding of a laminated body comprising electrode sheets and the separator sheet. It can therefore minimize yield reduction in the battery assembly steps and shorten the production process time.

The laminated body or wound body may also be hot pressed after injection of the electrolytic solution. When hot pressing is carried out, the pressing temperature is preferably 20° C. or higher, as an example of a temperature allowing the adhesion to be effectively exhibited. The temperature is preferably no higher than 120° C. from the viewpoint of minimizing blocking or heat shrinkage of the separator pores by hot pressing. The pressing pressure is preferably no higher than 20 MPa from the viewpoint of minimizing blocking of the separator pores. The pressing time is preferably no longer than 2 hours, from the viewpoint of productivity.

A lithium-ion secondary battery produced in this manner is provided with a separator having high adhesion and reduced ion resistance, and therefore exhibits excellent battery characteristics (rate property) and long-term, continuous operating resistance (cycle characteristic).

EXAMPLES

Evaluation of the physical properties in the experimental examples was carried out by the following methods.

(1) Solid Content

Approximately 1 g of an aqueous dispersion of the obtained copolymer was precisely weighed out onto an aluminum pan, and the measured mass of the aqueous dispersion was recorded as (a) g. It was then dried for 1 hour with a hot air drier at 130° C., and the dry mass of the copolymer was recorded as (b) g. The solid content was calculated by the following formula.

Solid content=$(b)/(a) \times 100$ [%]

(2) Particle Size Measurement

The mean particle size of the thermoplastic polymer particles was measured using a particle size measuring apparatus (Microtrac UPA150 by Nikkiso Co., Ltd.). The particle size was recorded as the value for the 50% particle size in data obtained under measuring conditions with a loading index of 0.15 to 0.3 and a measuring time of 300 seconds.

(3) Glass Transition Temperature Measurement

An appropriate amount of the copolymer-containing aqueous dispersion (solid content=38 to 42 mass %, pH=9.0) for measurement was placed in an aluminum pan and dried for 30 minutes with a hot air drier at 130° C. Approximately 17 mg of the dried film was packed into an aluminum measuring container, and DSC and DDSC curves were obtained using a DSC measuring apparatus (DSC6220 by Shimadzu Corp.) under a nitrogen atmosphere. The measuring conditions were as follows.

Stage 1 heating program: Start=70° C., temperature increase at 15° C./min. Temperature maintained for 5 minutes after reaching 110° C.

Stage 2 cooling program: Temperature decrease from 110° C. at 40° C./min. Temperature maintained for 5 minutes after reaching −50° C.

Stage 3 heating program: Temperature increase from −50° C. to 130° C. at 15° C./min. Recording of DSC and DDSC data during stage 3 heating.

The intersection between the baseline (an extended straight line toward the high-temperature end from the baseline of the obtained DSC curve) and the tangent line at the inflection point (the point where the upwardly convex curve changed to a downwardly convex curve) was recorded as the glass transition temperature (Tg).

(4) Viscosity-Average Molecular Weight Mv

The limiting viscosity [η] at 135° C. in a decalin solvent was determined according to ASRM-D4020. The [η] value was used to calculate the viscosity-average molecular weight Mv, from the following mathematical formulas.

For polyethylene: $[\eta]=0.00068 \times Mv^{0.67}$

For polypropylene: $[\eta]=1.10 \times Mv^{0.80}$ (5) Film Thickness (μm)

A 10 cm×10 cm-square sample was cut out from the polyolefin microporous film, 9 locations (3 points×3 points) were selected in a lattice form, and a microthickness meter (Type KBM by Toyo Seiki Seisakusho, Ltd.) was used for measurement of the film thickness at room temperature (23±2° C.). The average for the values measured at the 9 locations was calculated as the thickness of the polyolefin microporous film.

(6) Porosity

A 10 cm×10 cm-square sample was cut out from the polyolefin porous substrate, and the volume ($cm^3$) and mass (g) were determined. The values were used to calculate the porosity by the following formula:

Porosity (%)=(1−mass/volume/0.95)×100, using 0.95 (g/$cm^3$) as the density of the porous substrate.

(7) Gas Permeability (Sec/100 cc)

The gas permeability was determined as the air permeability resistance measured with a Gurley air permeability tester (G-B2™ by Toyo Seiki Kogyo Co., Ltd.), according to JIS P-8117.

(8) Puncture Strength (g)

Using a Handy Compression Tester KES-G5 ™ by Kato Tech Corp., the polyolefin porous substrate was anchored by a specimen holder having an opening diameter of 11.3 mm. Next, the center section of the anchored porous substrate was subjected to a puncture test with a needle having a tip curvature radius of 0.5 mm, at a puncture speed of 2 mm/sec and a 25° C. atmosphere, the puncture strength (g) being obtained as the maximum puncture load.

(9) Polymer Layer Observation Method (Voronoi Tessellation)

i) Evaluation Using 3 Visual Fields

Using an S-4800 scanning electron microscope (Hitachi High-Technologies Corp.), the surface of the polymer layer on the separator was imaged in three visual fields at a magnification of 10,000× or 30,000×, depending on the particle sizes of the polymer particles. The area density and the dispersion ($\sigma^2$) of the Voronoi polygon areas ($s_i$) for the particulate thermoplastic polymer in the three visual fields were obtained as averages for the three visual fields. The area density and the dispersion ($\sigma^2$) of the Voronoi polygon areas ($s_i$) were automatically calculated using "A-Zou Kun" image processing software (registered trademark of Asahi Kasei Engineering Corporation). Also, any region that was not closed when performing Voronoi tessellation in the observation field was excluded as a target for calculation of the Voronoi polygon area.

ii) Evaluation Using 95 Visual Fields

Figure 6:
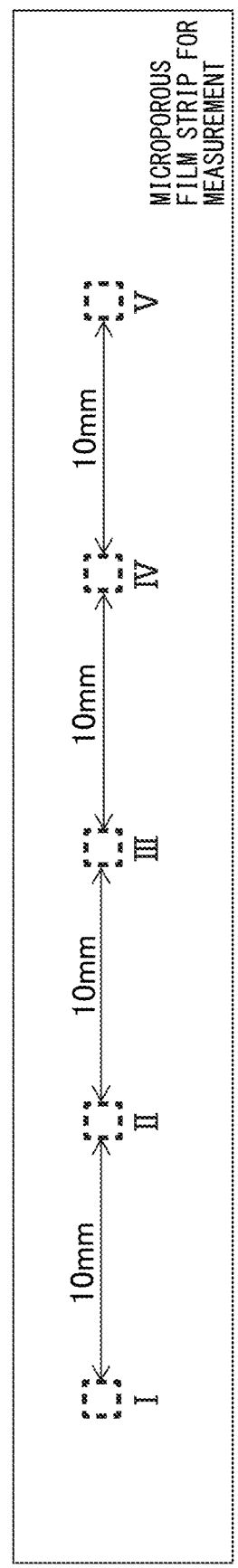
FIG. 6 illustrates one example of the method for setting 5 sections including 95 visual fields in which thermoplastic polymer particles on a separator are observed.

Using an S-4800 scanning electron microscope (Hitachi High-Technologies Corp.), the surface of the polymer layer on the separator was imaged at a magnification of 10,000× or 30,000×, depending on the particle sizes of the polymer particles. The obtained images were used to define 5 sections and 95 visual fields, as shown in FIGS. 5 and 6. The area density, Voronoi polygon area density and dispersion ($\sigma^2$) of Voronoi polygon areas ($s_i$) for the particulate thermoplastic polymer in the 95 visual fields were obtained as the averages for the 95 visual fields, in the same manner as i) above.

(10) Alternating Current Electrical Resistance

Six measuring samples cut out to 22 mmϕ were thoroughly soaked with an electrolytic solution (1 M lithium perchlorate propylene carbonate/dimethyl carbonate=1/1), and one of the samples was placed in a covered stainless steel metal container. The container and cover were insulated without direct contact using TEFLON™ packing and a 15.95 mmϕ TEFLON™ guide, being in contact only with an SUS electrode holder. The cover was closed using a torque wrench (clamping torque: 0.8 Nm). A "3522-50 LCR HighTester" by Hioki E.E. Corp. was used for measurement under conditions with a frequency of 100 Hz and an open voltage of 0.01 V, with the measuring cell placed in a −30° C. thermostatic bath. The resistance value obtained by the measurement was recorded as $R_1$. Next, the measuring container was disassembled and the remaining 5 impregnated samples were stacked into the container, and after reassembly, the resistance of the 6 samples was measured under the same conditions. The film resistance obtained by the measurement was recorded as $R_6$. The film resistance R ($\Omega \cdot cm^2$) per sample was calculated by the following formula (2) from the obtained values $R_1$ and $R_6$.

$$R=(R_6-R_1)/5 \qquad (2)$$

The alternating current electrical resistance ($\Omega/cm^2$) of the separator obtained by formula (2) was calculated as the resistance value in terms of a 20 μm film thickness, and the resistance increase rate from the alternating current electrical resistance $R_a$ of the substrate before coating to the alternating current electrical resistance $R_b$ after coating, was determined by the following formula (3).

$$\text{Resistance increase rate (\%)}=\{(R_b-R_a)/R_a\}\times 100 \qquad (3)$$

The resistance increase rate was ranked on the following scale.
S (Very good): Resistance increase rate of <50%
A (Good): Resistance increase rate of ≥50% and <100%
B (Acceptable): Resistance increase rate of ≥100% and <200%
C (Poor): Resistance increase rate of ≥200%
(11) TD Heat Shrinkage Factor (%)
A 100 mm square piece was cut out from the separator, with the respective sides parallel to the MD and TD, respectively, and the TD heat shrinkage factor after standing for 1 hour in an oven heated to 130° C. was measured.
(12) Adhesion with Electrodes
The separators for an electricity storage device obtained for each of the examples and comparative examples, and positive electrodes (product of Enertech, positive electrode material: LiCoO$_2$, conductive aid: acetylene black, binder: PVDF, LiCoO$_2$/acetylene black/PVDF (weight ratio)=95/2/3, L/W: 36 mg/cm$^2$ for both sides, density: 3.9 g/cc, Al collector thickness: 15 μm, pressed positive electrode thickness: 107 μm) as adherends, were each cut out to rectangular shapes with widths of 15 mm and lengths of 60 mm, and were respectively stacked with thermoplastic polymer layer of the separator facing the positive electrode active material to obtain laminated bodies, which were then pressed under the following conditions.
Press pressure: 1 MPa
Temperature: 100° C.
Pressing time: 2 minutes
For each of the pressed laminated bodies, ZPSN and MX2-500N force gauges by Imada Co., Ltd. were used for a 90° peel test at a peel rate of 50 mm/min, with a pulling system in which the electrodes were anchored and the separator held and pulled to determine the peel strength. The average for the peel strength in the peel test for a 40 mm length, carried out under the conditions described above, was used as the peel strength for evaluation of the adhesion with electrodes, on the following scale.
S (Very good): Peel strength of ≥10 N/m.
A (Good): Peel strength of ≥2 N/m and <10 N/m.
C (Poor): Peel strength of <2 N/m.

(13) Hot Peel Strength
The substrate or separator and the positive electrode collector as an adherend (aluminum foil by Fuji Impex Corp., i.e. AlN30 aluminum foil by UACJ Corp., thickness: 20 μm) were each cut out to 30 mm×150 mm and stacked to obtain a laminated body, which was sandwiched between TEFLON™ sheets (NAFLON™ PTFE Sheet TOMBO-No. 9000, by Nichias Corp.) to obtain a sample. Each of the obtained samples was pressed for 3 minutes in the direction of lamination, under conditions with a temperature of 80° C. and a pressure of 10 MPa, to obtain pressed bodies for testing.
The peel strength between the substrate or separator and the positive electrode collector in each of the obtained pressed bodies for testing was measured using a Model AG-IS™ Autograph by Shimadzu Corp. at a pull rate of 200 mm/min, according to JIS K6854-2. Evaluation of the adhesion with electrodes was made on the following scale based on the peel strength values.
<Evaluation Scale>
A (Good): ≥9.8 N/m
B (Acceptable): ≥5 N/m and <9.8 N/m
C (Poor): <5 N/m
(14) Handling Properties of Separator (Blocking Resistance and Ordinary Temperature Peel Strength)
Pressed bodies for testing were obtained in the same manner as (12) above, except that pressing was for 3 minutes under conditions with a temperature of 25° C. and a pressure of 5 MPa. The peel strength between the substrate or separator and the positive electrode collector in each of the pressed bodies for testing was measured using a Model AG-IS™ Autograph by Shimadzu Corp. at a pull rate of 200 mm/min, according to JIS K6854-2. The handling property was evaluated on the following scale based on the peel strength values.
<Evaluation Scale>
A (Good): ≤8 N/m
B (Acceptable): >8 N/m
C (Unacceptable)>20 N/m
(15) Rate Property
a. Fabrication of Positive Electrode
After mixing 90.4 weight % of a nickel, manganese and cobalt complex oxide (NMC) (Ni:Mn:Co=1:1:1 (element ratio), density: 4.70 g/cm$^3$), as the positive electrode material, 1.6 weight % of graphite powder (KS6) (density: 2.26 g/cm$^3$, number-mean particle size: 6.5 μm) and 3.8 weight % of acetylene black powder (AB) (density: 1.95 g/cm$^3$, number-mean particle size: 48 nm), as conductive aids, and 4.2 weight % of polyvinylidene fluoride (PVDF) (density: 1.75 g/cm$^3$) as a binder, the mixture was dispersed in N-methylpyrrolidone (NMP) to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m$^2$.
b. Fabrication of Negative Electrode
In purified water there were dispersed 87.6 weight % of graphite powder A (density: 2.23 g/cm$^3$, number-mean particle size: 12.7 μm) and 9.7 weight % of graphite powder B (density: 2.27 g/cm$^3$, number-mean particle size: 6.5 μm) as negative electrode active materials, and 1.4 (solid) weight % of carboxymethyl cellulose ammonium salt (1.83 weight % as the solid concentration in aqueous solution) and 1.7 (solid) weight % of diene rubber latex (40 weight % as the solid concentration in aqueous solution) as binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 5.2 g/m$^2$.

c. Preparation of Non-Aqueous Electrolytic Solution

A non-aqueous electrolytic solution was prepared by dissolving LiPF$_6$ so as to have a concentration of 1.0 mol/L, as a solute, in a mixed solvent of ethylene carbonate and ethylmethyl carbonate, with the volume ratio of ethylene carbonate:ethylmethyl carbonate=1:2.

d. Battery Assembly

The separators for an electricity storage device obtained in the examples and comparative examples were each cut out to a 24 mmϕ circular shape, and positive electrode and negative electrodes were cut out to 16 mmϕ circular shapes. The negative electrode, separator and positive electrode were stacked in that order with the active material sides of the positive electrode and negative electrode facing each other, and were then pressed or heat pressed and inserted into a covered stainless steel metal container. The container and cover were insulated, with the container in contact with the negative electrode copper foil and the cover in contact with the positive electrode aluminum foil. The non-aqueous electrolytic solution was injected into the container at 0.4 ml and sealed to assemble a battery.

e. Evaluation of Rate Property

Each simple battery assembled in d. above was subjected to initial charging following battery fabrication, for a total of approximately 6 hours, by a method of charging to a cell voltage of 4.2 V at a current value of 3 mA (approximately 0.5 C) at 25° C., and then beginning to draw out a current of 3 mA while maintaining 4.2 V. The battery was then discharged to a cell voltage of 3.0 V at a current value of 3 mA.

This was followed by charging for a total of approximately 3 hours, by a method of charging the battery to a cell voltage of 4.2 V at a current value of 6 mA (approximately 1.0 C) at 25° C., and then beginning to draw out a current of 6 mA while maintaining 4.2 V. The discharge capacity when discharging the battery to a cell voltage of 3.0 V at a current value of 6 mA was then recorded as the 1C discharge capacity (mAh).

This was followed by charging for a total of approximately 3 hours, by a method of charging to a cell voltage of 4.2 V at a current value of 6 mA (approximately 1.0 C) at 25° C., and then beginning to draw out a current of 6 mA while maintaining 4.2 V. The discharge capacity when discharge the battery to a cell voltage of 3.0 V at a current value of 12 mA (approximately 2.0 C) was then recorded as the 2C discharge capacity (mAh).

The ratio of the 2C discharge capacity with respect to the 1C discharge capacity was calculated and the value recorded as the rate property.

Rate property (%)=(2C discharge capacity/1C discharge capacity)×100

The evaluation scale for the rate property (%) was as follows.

S (Very good): Rate property of ≥95%.
A (Good): Rate property of ≥85% and <95%.
B (Acceptable): Rate property of ≥80% and <85%.
C (Poor): Rate property of <80%.

(16) Cycle Characteristic

The cycle characteristic was evaluated using a simple battery assembled in the manner of (15) a. to d. above, except for using the separators obtained in each of the examples and comparative examples.

Each battery was subjected to constant-current charge to a voltage of 4.2 V at a current value of ⅓ C, and then constant-voltage charge at 4.2 V for 8 hours, followed by discharge at a current of ⅓ C to a final voltage of 3.0 V. After then carrying out constant-current charge to a voltage of 4.2 V at a current value of 1 C, constant-voltage charge was carried out at 4.2 V for 3 hours, and then discharge at a current of 1 C to a final voltage of 3.0 V. Finally, after carrying out constant-current charge to a voltage of 4.2 V at a current value of 1 C, constant-voltage charge was carried out at 4.2 V for 3 hours, as pretreatment. The value of 1 C represents the current value at which the reference capacity of the battery is discharged for 1 hour.

The pretreated battery was discharged at a discharge current of 1A to a final discharge voltage of 3 V at a temperature of 25° C., and then charged at a charging current of 1A to a final charge voltage of 4.2 V. Charge-discharge was repeated with this procedure as 1 cycle. The capacity retention after 200 cycles with respect to the initial capacity (the capacity at the first cycle) was used to evaluate the cycle characteristic on the following scale.

<Evaluation Scale for Cycle Characteristic>
S (Very good): Capacity retention of ≥90% and ≤100%
A (Good): Capacity retention of ≥5% and <90%
B (Acceptable): Capacity retention of ≥80% and <85%
C (Poor): Capacity retention of <80%

(17) Nail-Penetration Test

The pretreated battery was penetrated with a nail having a diameter of 2.5 mm from the side surface, at a speed of 5 mm/sec, and the temperature of the battery surface during that time was measured.

The nail-penetration test was evaluated on the following scale.

Maximum ultimate temperature of <100° C.: A
Maximum ultimate temperature of ≥100° C.: C <Synthesis of Thermoplastic Polymer Particles>

Synthesis Example 1

(Aqueous Dispersion a1)

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution, listed as "KH1025" in the tables, same hereunder) as an emulsifier, and 0.5 part by weight of "ADEKA REASOAP SR1025" (registered trademark of Adeka Corp., 25% aqueous solution, listed as "SR1025" in the tables, same hereunder). The internal temperature of the reactor was then raised to 80° C., and 7.5 parts by weight of a 2% aqueous solution of ammonium persulfate (listed as "APS (aq)" in the tables, same hereunder) was added to the reactor while keeping the temperature at 80° C. Five minutes after addition of the ammonium persulfate aqueous solution was completed, the emulsified liquid was added dropwise from the drip tank into the reactor over a period of 150 minutes.

The emulsified liquid was prepared by forming a mixture of 25 parts by weight of cyclohexyl methacrylate (listed as "CHMA" in the tables, same hereunder) as a monomer to compose the cycloalkyl group-containing monomer unit (A), 1 part by weight of methacrylic acid (listed as "MAA" in the tables, same hereunder) and 1 part by weight of acrylic acid (listed as "AA" in the tables, same hereunder) as monomers to compose the carboxyl group-containing monomer unit (b1), 0.1 part by weight of acrylamide (listed as "AM" in the tables, same hereunder) as a monomer to compose the amide group-containing monomer unit (b2), 5 parts by weight of 2-hydroxyethyl methacrylate (listed as "2HEMA" in the tables, same hereunder) as a monomer to compose the hydroxyl group-containing monomer unit (b3), 0.5 part by weight of trimethylolpropane triacrylate (A-TMPT, product of Shin-Nakamura Chemical Co., Ltd., listed as "A-TMPT" in the tables, same hereunder) as a monomer to compose the crosslinkable monomer unit (b4), 4.9 parts by weight of methyl methacrylate (listed as "MMA" in the tables, same hereunder), 1.5 parts by weight of butyl methacrylate (listed as "BMA" in the tables, same hereunder), 1.0 part by weight of butyl acrylate (listed as "BA" in the tables, same hereunder) and 60 parts by weight of 2-ethylhexyl acrylate (listed as "2EHA" in the tables, same hereunder) as monomers to compose a (meth)acrylic acid ester monomer unit (b5) other than those mentioned above, 3 parts by weight of "AQUALON KH1025" (registered trademark of Dai-ichi Kogyo Seiyaku Co., Ltd., 25% aqueous solution), 3 parts by weight of "ADEKA REASOAP SR1025" (registered trademark of Adeka Corp., 25% aqueous solution) and 0.05 part by weight of sodium p-styrenesulfonate (listed as "NaSS" in the tables, same hereunder), as emulsifiers, 3.75 parts by weight of a 2% aqueous solution of ammonium persulfate, and 52 parts by weight of ion-exchanged water, and then mixing the mixture with a homomixer for 5 minutes.

Upon completion of the dropwise addition of the emulsified liquid, the internal temperature of the reactor was kept at 80° C. for a period of 90 minutes, after which it was cooled to room temperature. The obtained emulsion was adjusted to a pH of 8.0 with an ammonium hydroxide aqueous solution (25% aqueous solution), and then a small amount of water was added to the emulsion to obtain an aqueous dispersion with a solid content of 40% (aqueous dispersion a1). The copolymer in the obtained aqueous dispersion a1 was measured for mean particle size and glass transition point by the methods described above. The results are shown in Table 7.

Synthesis Examples 2 to 46

(Aqueous Dispersions A1 to A40 and a2 to a6)

Aqueous dispersions A1 to A40 and a2 to a6 were obtained in the same manner as Synthesis Example 1, except that the types of starting materials and their mixing ratios were changed as shown in Tables 1 to 7.

The copolymers in the obtained aqueous dispersions A1 to A40 and a2 to a6 were then measured for particle size and glass transition point by the methods described above. The obtained results are shown in Tables 1 to 7. The compositions of the starting materials in the tables are based on weight.

The abbreviations for the materials used as shown in the tables have the following meanings.
Crosslinkable Monomers
GMA: Glycidyl methacrylate
MAPTMS: Methacryloxypropyltrimethoxysilane Table 8 shows the abbreviations for the polyalkyleneglycol group-containing monomers (P).

TABLE 1

| | Type | Starting material | A1 | A2 | A3 | A4 | A5 | A6 | A7 | A8 | A9 |
|---|---|---|---|---|---|---|---|---|---|---|---|
| Initial | Emulsifier | KH1025 | 0.5 | 0.5 | 0.5 | 0.5 | 0.5 | 0.5 | 0.5 | 0.5 | 0.5 |
| | | SR1025 | 0.5 | 0.5 | 0.5 | 0.5 | 0.5 | 0.5 | 0.5 | 0.5 | 0.5 |
| | Seed (40% solid content) | a2 | | | | | | | | | |
| | | a3 | | | | | | | | | |
| | Ion-exchanged water | — | 70.4 | 70.4 | 70.4 | 70.4 | 70.4 | 70.4 | 70.4 | 70.4 | 70.4 |
| | Initiator | APS (aq) | 7.5 | 7.5 | 7.5 | 7.5 | 7.5 | 7.5 | 7.5 | 7.5 | 7.5 |
| Emulsified liquid | Polyalkyleneglycol group-containing monomer (P) | M-20G | 2.5 | 0 | 5 | 0 | 0 | 0 | 0 | 0 | 0 |
| | | M-40G | 0 | 2.5 | 0 | 5 | 0 | 0 | 5 | 5 | 5 |
| | | M-90G | 0 | 0 | 0 | 0 | 5 | 0 | 0 | 0 | 0 |
| | | M-230G | 0 | 0 | 0 | 0 | 0 | 5 | 0 | 0 | 0 |
| | Cycloalkyl group-containing monomer (A) | CHMA | 30 | 30 | 30 | 30 | 30 | 30 | 30 | 30 | 30 |
| | Other monomers (B) Carboxyl group-containing monomer (b1) | MAA | 1 | 1 | 1 | 1 | 1 | 1 | 1 | 1 | 1 |
| | | AA | 1 | 1 | 1 | 1 | 1 | 1 | 1 | 1 | 1 |
| | Amide group-containing monomer (b2) | AM | 0.1 | 0.1 | 0.1 | 0.1 | 0.1 | 0.1 | 0.1 | 0.1 | 0.1 |
| | Hydroxyl group-containing monomer (b3) | HEMA | 5 | 5 | 5 | 5 | 5 | 5 | 5 | 5 | 5 |
| | Crosslinkable monomer (b4) | GMA | 0 | 0 | 0 | 0 | 0 | 0 | 0 | 0.4 | 0 |
| | | A-TMPT | 0.5 | 0.5 | 0.5 | 0.5 | 0.5 | 0.5 | 0.1 | 1 | 0 |
| | | MAPTMS | 0 | 0 | 0 | 0 | 0 | 0 | 0 | 0 | 1 |
| | | (b4) Total | 0.5 | 0.5 | 0.5 | 0.5 | 0.5 | 0.5 | 0.1 | 1.4 | 1 |
| | (Meth)acrylic acid ester monomer (b5) | MMA | 1 | 1 | 1 | 1 | 1 | 1 | 1 | 1 | 1 |
| | | BMA | 0.4 | 0.4 | 0.4 | 0.4 | 0.4 | 0.4 | 0.8 | 0.4 | 0.8 |
| | | BA | 1 | 1 | 1 | 1 | 1 | 1 | 1 | 0.1 | 0.1 |
| | | 2EHA | 57.5 | 57.5 | 55 | 55 | 55 | 55 | 55 | 55 | 55 |
| | (Meth)acrylic acid ester monomer total | | 92.4 | 92.4 | 92.4 | 92.4 | 92.4 | 92.4 | 92.8 | 91.5 | 91.9 |
| | (P) + (A) + (B) | | 100.0 | 100.0 | 100.0 | 100.0 | 100.0 | 100.0 | 100.0 | 100.0 | 100.0 |
| | Emulsifier | KH1025 | 3 | 3 | 3 | 3 | 3 | 3 | 3 | 3 | 3 |

TABLE 1-continued

|  |  | Starting material | Aqueous dispersion | | | | | | | | |
|---|---|---|---|---|---|---|---|---|---|---|---|
|  | Type |  | A1 | A2 | A3 | A4 | A5 | A6 | A7 | A8 | A9 |
|  |  | SR1025 | 3 | 3 | 3 | 3 | 3 | 3 | 3 | 3 | 3 |
|  |  | NaSS | 0.05 | 0.05 | 0.05 | 0.05 | 0.05 | 0.05 | 0.05 | 0.05 | 0.05 |
|  | Initiator | APS (aq) | 7.5 | 7.5 | 7.5 | 7.5 | 7.5 | 7.5 | 7.5 | 7.5 | 7.5 |
|  | Ion-exchanged water | — | 52 | 52 | 52 | 52 | 52 | 52 | 52 | 52 | 52 |
| Neutralizer |  |  | AW | AW | AW | AW | AW | AW | AW | AW | AW |
| Particle size (D50) (nm) |  |  | 160 | 160 | 160 | 160 | 160 | 160 | 160 | 160 | 160 |
| Glass transition temperature Tg (° C.) |  |  | −20 | −20 | −20 | −20 | −20 | −20 | −20 | −20 | −20 |

TABLE 2

|  |  |  | Starting material | Aqueous dispersion | | | | | | | | |
|---|---|---|---|---|---|---|---|---|---|---|---|---|
|  | Type |  |  | A10 | A11 | A12 | A13 | A14 | A15 | A16 | A17 | A18 |
| Initial |  | Emulsifier | KH1025 | 0.5 | 0.5 | 0.5 | 0.5 | 0.5 | 0.5 | 0.5 | 0.5 | 0.05 |
|  |  |  | SR1025 | 0.5 | 0.5 | 0.5 | 0.5 | 0.5 | 0.5 | 0.5 | 0.5 | 0.05 |
|  |  | Seed (40% solid content) | a2 |  |  |  |  |  |  |  |  | 25 |
|  |  |  | a3 |  |  |  |  |  |  |  |  |  |
|  |  | Ion-exchanged water | — | 70.4 | 70.4 | 70.4 | 70.4 | 70.4 | 70.4 | 70.4 | 70.4 | 70.4 |
|  |  | Initiator | APS (aq) | 7.5 | 7.5 | 7.5 | 7.5 | 7.5 | 7.5 | 7.5 | 7.5 | 7.5 |
| Emulsified liquid | Polyalkyleneglycol group-containing monomer (P) |  | M-20G | 10 | 0 | 0 | 30 | 0 | 50 | 0 | 0 | 0 |
|  |  |  | M-40G | 0 | 10 | 0 | 0 | 30 | 0 | 50 | 5 | 5 |
|  |  |  | M-90G | 0 | 0 | 10 | 0 | 0 | 0 | 0 | 0 | 0 |
|  |  |  | M-230G | 0 | 0 | 0 | 0 | 0 | 0 | 0 | 0 | 0 |
|  | Cycloalkyl group-containing monomer (A) |  | CHMA | 30 | 30 | 30 | 30 | 30 | 30 | 30 | 20 | 30 |
|  | Other monomers (B) | Carboxyl group-containing monomer (b1) | MAA | 1 | 1 | 1 | 1 | 1 | 1 | 1 | 1 | 1 |
|  |  |  | AA | 1 | 1 | 1 | 1 | 1 | 1 | 1 | 1 | 1 |
|  |  | Amide group-containing monomer (b2) | AM | 0.1 | 0.1 | 0.1 | 0.1 | 0.1 | 0.1 | 0.1 | 0.1 | 0.1 |
|  |  | Hydroxyl group-containing monomer (b3) | HEMA | 5 | 5 | 5 | 5 | 5 | 5 | 5 | 5 | 5 |
|  |  | Crosslinkable monomer (b4) | GMA | 0 | 0 | 0 | 0 | 0 | 0 | 0 | 0 | 0 |
|  |  |  | A-TMPT | 0.5 | 0.5 | 0.5 | 0.5 | 0.5 | 0.5 | 0.5 | 0.5 | 0.5 |
|  |  |  | MAPTMS | 0 | 0 | 0 | 0 | 0 | 0 | 0 | 0 | 0 |
|  |  |  | (b4) Total | 0.5 | 0.5 | 0.5 | 0.5 | 0.5 | 0.5 | 0.5 | 0.5 | 0.5 |
|  |  | (Meth)acrylic acid ester monomer (b5) | MMA | 1 | 1 | 1 | 1 | 1 | 1 | 1 | 1 | 1 |
|  |  |  | BMA | 0.4 | 0.4 | 0.4 | 0.4 | 0.4 | 0.4 | 0.4 | 0.4 | 0.4 |
|  |  |  | BA | 1 | 1 | 1 | 1 | 1 | 1 | 1 | 1 | 1 |
|  |  |  | 2EHA | 50 | 50 | 50 | 30 | 30 | 10 | 10 | 65 | 55 |
|  | (Meth)acrylic acid ester monomer total |  |  | 92.4 | 92.4 | 92.4 | 92.4 | 92.4 | 92.4 | 92.4 | 92.4 | 92.4 |
|  | (P) + (A) + (B) |  |  | 100.0 | 100.0 | 100.0 | 100.0 | 100.0 | 100.0 | 100.0 | 100.0 | 100.0 |
|  | Emulsifier |  | KH1025 | 3 | 3 | 3 | 3 | 3 | 3 | 3 | 3 | 3 |
|  |  |  | SR1025 | 3 | 3 | 3 | 3 | 3 | 3 | 3 | 3 | 3 |
|  |  |  | NaSS | 0.05 | 0.05 | 0.05 | 0.05 | 0.05 | 0.05 | 0.05 | 0.05 | 0.05 |
|  | Initiator |  | APS (aq) | 7.5 | 7.5 | 7.5 | 7.5 | 7.5 | 7.5 | 7.5 | 7.5 | 7.5 |
|  | Ion-exchanged water |  | — | 52 | 52 | 52 | 52 | 52 | 52 | 52 | 52 | 52 |
| Neutralizer |  |  |  | AW | AW | AW | AW | None | None | AW | AW | AW |
| Particle size (D50) (nm) |  |  |  | 160 | 160 | 160 | 160 | 160 | 160 | 160 | 160 | 550 |
| Glass transition temperature Tg (° C.) |  |  |  | −20 | −20 | −20 | −20 | −20 | −20 | −20 | −30 | −15 |

TABLE 3

| | Type | Starting material | Aqueous dispersion | | | | | | |
|---|---|---|---|---|---|---|---|---|---|
| | | | A19 | A20 | A21 | A22 | A23 | A24 | A25 |
| Initial | Emulsifier | KH1025 | 0.05 | 0.05 | 0.05 | 0.05 | 0.05 | 0.05 | 0.05 |
| | | SR1025 | 0.05 | 0.05 | 0.05 | 0.05 | 0.05 | 0.05 | 0.05 |
| | Seed (40% solid content) | a2 | 25 | 25 | 25 | 25 | 25 | 25 | 25 |
| | | a3 | | | | | | | |
| | Ion-exchanged water | — | 70.4 | 70.4 | 70.4 | 70.4 | 70.4 | 70.4 | 70.4 |
| | Initiator | APS (aq) | 7.5 | 7.5 | 7.5 | 7.5 | 7.5 | 7.5 | 7.5 |
| Emulsified liquid | Polyalkyleneglycol group-containing monomer (P) | M-20G | 0 | 0 | 0 | 0 | 5 | 0 | 0 |
| | | M-40G | 5 | 2.5 | 5 | 5 | 0 | 0 | 0 |
| | | M-90G | 0 | 0 | 0 | 0 | 0 | 5 | 0 |
| | | M-230G | 0 | 0 | 0 | 0 | 0 | 0 | 5 |
| | Cycloalkyl group-containing monomer (A) | CHMA | 45 | 70 | 70 | 70 | 70 | 70 | 70 |
| | Other monomers (B) Carboxyl group-containing monomer (b1) | MAA | 1 | 1 | 1 | 1 | 1 | 1 | 1 |
| | | AA | 1 | 1 | 1 | 1 | 1 | 1 | 1 |
| | Amide group-containing monomer (b2) | AM | 0.1 | 0.1 | 0.1 | 2 | 0.1 | 0.1 | 0.1 |
| | Hydroxyl group-containing monomer (b3) | HEMA | 1 | 1 | 1 | 1 | 1 | 1 | 1 |
| | Crosslinkable monomer (b4) | GMA | 0 | 0 | 0 | 0 | 0 | 0 | 0 |
| | | A-TMPT | 0.1 | 0.5 | 0.5 | 0.5 | 0.5 | 0.5 | 0.5 |
| | | MAPTMS | 0 | 0 | 0 | 0 | 0 | 0 | 0 |
| | | (b4) Total | 0.1 | 0.5 | 0.5 | 0.5 | 0.5 | 0.5 | 0.5 |
| | (Meth)acrylic acid ester monomer (b5) | MMA | 5 | 5 | 5 | 3.1 | 5 | 5 | 5 |
| | | BMA | 15 | 10 | 10 | 10 | 10 | 10 | 10 |
| | | BA | 1 | 1 | 1 | 1 | 1 | 1 | 1 |
| | | 2EHA | 25.8 | 7.9 | 5.4 | 5.4 | 5.4 | 5.4 | 5.4 |
| | (Meth)acrylic acid ester monomer total | | 96.8 | 96.4 | 96.4 | 94.5 | 96.4 | 96.4 | 96.4 |
| | (P) + (A) + (B) | | 100.0 | 100.0 | 100.0 | 100.0 | 100.0 | 100.0 | 100.0 |
| | Emulsifier | KH1025 | 3 | 3 | 3 | 3 | 3 | 3 | 3 |
| | | SR1025 | 3 | 3 | 3 | 3 | 3 | 3 | 3 |
| | | NaSS | 0.05 | 0.05 | 0.05 | 0.05 | 0.05 | 0.05 | 0.05 |
| | Initiator | APS (aq) | 7.5 | 7.5 | 7.5 | 7.5 | 7.5 | 7.5 | 7.5 |
| | Ion-exchanged water | — | 52 | 52 | 52 | 52 | 52 | 52 | 52 |
| Neutralizer | | | AW | AW | AW | AW | AW | AW | AW |
| Particle size (D50) (nm) | | | 540 | 540 | 540 | 540 | 540 | 540 | 540 |
| Glass transition temperature Tg (° C.) | | | 25 | 60 | 60 | 60 | 60 | 60 | 60 |

TABLE 4

| | Type | Starting material | Aqueous dispersion | | | | | | | | | |
|---|---|---|---|---|---|---|---|---|---|---|---|---|
| | | | A26 | A27 | A28 | A29 | A30 | A31 | A32 | A33 | A34 | A35 |
| Initial | Emulsifier | KH1025 | 0.05 | 0.05 | 0.05 | 0.05 | 0.05 | 0.05 | 0.05 | 0.05 | 0.05 | 0.05 |
| | | SR1025 | 0.05 | 0.05 | 0.05 | 0.05 | 0.05 | 0.05 | 0.05 | 0.05 | 0.05 | 0.05 |
| | Seed (40% solid content) | a2 | 25 | 25 | 25 | 25 | 25 | | 25 | | | 25 |
| | | a3 | | | | | | 25 | | 25 | | |
| | Ion-exchanged water | — | 70.4 | 70.4 | 70.4 | 70.4 | 70.4 | 70.4 | 70.4 | 70.4 | 70.4 | 320.4 |
| | Initiator | APS (aq) | 7.5 | 7.5 | 7.5 | 7.5 | 7.5 | 7.5 | 7.5 | 7.5 | 7.5 | 15 |
| Emulsified liquid | Polyalkyleneglycol group-containing monomer (P) | M-20G | 5 | 10 | 0 | 15 | 0 | 0 | 0 | 0 | 0 | 0 |
| | | M-40G | 5 | 0 | 10 | 0 | 15 | 5 | 5 | 5 | 5 | 10 |
| | | M-90G | 0 | 0 | 0 | 0 | 0 | 0 | 0 | 0 | 0 | 0 |
| | | M-230G | 0 | 0 | 0 | 0 | 0 | 0 | 0 | 0 | 0 | 0 |
| | Cycloalkyl group-containing monomer (A) | CHMA | 70 | 70 | 70 | 70 | 70 | 40 | 30 | 30 | 70 | 50 |
| | Other monomers (B) Carboxyl group-containing monomer (b1) | MAA | 1 | 1 | 1 | 1 | 1 | 1 | 1 | 1 | 1 | 1 |
| | | AA | 1 | 1 | 1 | 1 | 1 | 1 | 1 | 1 | 1 | 1 |
| | Amide group-containing monomer (b2) | AM | 0.1 | 0.1 | 0.1 | 0.1 | 0.1 | 0.1 | 0.1 | 0.1 | 0.1 | 0.1 |

TABLE 4-continued

| | | Starting | Aqueous dispersion | | | | | | | | | |
|---|---|---|---|---|---|---|---|---|---|---|---|---|
| | Type | material | A26 | A27 | A28 | A29 | A30 | A31 | A32 | A33 | A34 | A35 |
| | Hydroxyl group-containing monomer (b3) | HEMA | 1 | 1 | 1 | 1 | 1 | 1 | 1 | 1 | 1 | 1 |
| | Crosslinkable monomer (b4) | GMA | 0 | 0 | 0 | 0 | 0 | 0 | 0 | 0 | 0 | 0 |
| | | A-TMPT | 0.5 | 0.5 | 0.5 | 0.5 | 0.5 | 0.5 | 0.5 | 0.5 | 0.1 | 20 |
| | | MAPTMS | 0 | 0 | 0 | 0 | 0 | 0 | 0 | 0 | 0 | 0 |
| | | (b4) Total | 0.5 | 0.5 | 0.5 | 0.5 | 0.5 | 0.5 | 0.5 | 0.5 | 0.1 | 20 |
| | (Meth)acrylic acid ester monomer (b5) | MMA | 5 | 5 | 5 | 0 | 0 | 35 | 45 | 45 | 5 | 5.5 |
| | | BMA | 10 | 10 | 10 | 10 | 10 | 10 | 10 | 10 | 10 | 10 |
| | | BA | 1 | 1 | 1 | 1 | 1 | 1 | 1 | 1 | 1 | 1 |
| | | 2EHA | 0.4 | 0.4 | 0.4 | 0.4 | 0.4 | 5.4 | 5.4 | 5.4 | 5.8 | 0.4 |
| (Meth)acrylic acid ester monomer total | | | 96.4 | 96.4 | 96.4 | 96.4 | 96.4 | 96.4 | 96.4 | 96.4 | 96.8 | 76.9 |
| (P) + (A) + (B) | | | 100.0 | 100.0 | 100.0 | 100.0 | 100.0 | 100.0 | 100.0 | 100.0 | 100.0 | 100.0 |
| Emulsifier | | KH1025 | 3 | 3 | 3 | 3 | 3 | 3 | 3 | 3 | 3 | 3 |
| | | SR1025 | 3 | 3 | 3 | 3 | 3 | 3 | 3 | 3 | 3 | 3 |
| | | NaSS | 0.05 | 0.05 | 0.05 | 0.05 | 0.05 | 0.05 | 0.05 | 0.05 | 0.05 | 0.05 |
| Initiator | | APS (aq) | 7.5 | 7.5 | 7.5 | 7.5 | 7.5 | 7.5 | 7.5 | 7.5 | 7.5 | 15 |
| Ion-exchanged water | | — | 52 | 52 | 52 | 52 | 52 | 52 | 52 | 52 | 52 | 52 |
| Neutralizer | | | AW | AW | AW | AW | AW | AW | AW | AW | AW | AW |
| Particle size (D50) (nm) | | | 540 | 540 | 540 | 540 | 540 | 540 | 540 | 540 | 260 | 540 |
| Glass transition temperature Tg (° C.) | | | 60 | 60 | 60 | 60 | 60 | 60 | 60 | 60 | 60 | 60 |

TABLE 5

| | | | Starting | Aqueous dispersion | | | |
|---|---|---|---|---|---|---|---|
| | | Type | material | A36 | A37 | A38 | A39 |
| Initial | Emulsifier | | KH1025 | 0.05 | 0.05 | 0.05 | 0.05 |
| | | | SR1025 | 0.05 | 0.05 | 0.05 | 0.05 |
| | Seed (40% solid content) | | a2 | 25 | 25 | 25 | 25 |
| | | | a3 | | | | |
| | Ion-exchanged water | | — | 70.4 | 70.4 | 70.4 | 70.4 |
| | Initiator | | APS (aq) | 7.5 | 7.5 | 7.5 | 7.5 |
| Emulsified liquid | Polyalkyleneglycol group-containing monomer (P) | | AM-30G | 5 | 0 | 0 | 0 |
| | | | M-30PG | 0 | 5 | 0 | 0 |
| | | | 4G | 0 | 0 | 5 | 0 |
| | | | 9G | 0 | 0 | 0 | 5 |
| | Cycloalkyl group-containing monomer (A) | | CHMA | 70 | 70 | 70 | 70 |
| | Other monomers (B) | Carboxyl group-containing monomer (b1) | MAA | 1 | 1 | 1 | 1 |
| | | | AA | 1 | 1 | 1 | 1 |
| | | Amide group-containing monomer (b2) | AM | 0.1 | 0.1 | 0.1 | 0.1 |
| | | Hydroxyl group-containing monomer (b3) | HEMA | 1 | 1 | 1 | 1 |
| | | Crosslinkable monomer (b4) | GMA | 0 | 0 | 0 | 0 |
| | | | A-TMPT | 0.5 | 0.5 | 0.5 | 0.5 |
| | | | MAPTMS | 0 | 0 | 0 | 0 |
| | | | (b4) Total | 0.5 | 0.5 | 0.5 | 0.5 |
| | | (Meth)acrylic acid ester monomer (b5) | MMA | 5 | 5 | 5 | 5 |
| | | | BMA | 10 | 10 | 10 | 10 |
| | | | BA | 1 | 1 | 1 | 1 |
| | | | 2EHA | 5.4 | 5.4 | 5.4 | 5.4 |
| | (Meth)acrylic acid ester monomer total | | | 96.4 | 96.4 | 96.4 | 96.4 |
| | (P) + (A) + (B) | | | 100.0 | 100.0 | 100.0 | 100.0 |
| | Emulsifier | | KH1025 | 3 | 3 | 3 | 3 |
| | | | SR1025 | 3 | 3 | 3 | 3 |
| | | | NaSS | 0.05 | 0.05 | 0.05 | 0.05 |

TABLE 5-continued

|  |  | Starting material | Aqueous dispersion | | | |
|---|---|---|---|---|---|---|
|  | Type |  | A36 | A37 | A38 | A39 |
|  | Initiator | APS (aq) | 7.5 | 7.5 | 7.5 | 7.5 |
|  | Ion-exchanged water | — | 52 | 52 | 52 | 52 |
| Neutralizer |  |  | AW | AW | AW | AW |
| Particle size (D50) (nm) |  |  | 540 | 540 | 540 | 540 |
| Glass transition temperature Tg (° C.) |  |  | 60 | 60 | 65 | 60 |

TABLE 6

|  | Type |  | Starting material | Aqueous dispersion A40 |
|---|---|---|---|---|
| Initial | Emulsifier |  | KH1025 | 0 |
|  |  |  | SR1025 | 0 |
|  | Seed (40% solid content) |  | a2 | 25 |
|  |  |  | a3 |  |
|  | Ion-exchanged water |  | — | 70.4 |
|  | Initiator |  | APS (aq) | 7.5 |
| Emulsified liquid | Polyalkyleneglycol group-containing monomer (P) |  | M-20G | 0 |
|  |  |  | M-40G | 50 |
|  |  |  | M-90G | 0 |
|  |  |  | M-230G | 0 |
|  | Cycloalkyl group-containing monomer (A) |  | CHMA | 25 |
|  | Other monomers (B) | Carboxyl group-containing monomer (b1) | MAA | 1 |
|  |  |  | AA | 1 |
|  |  | Amide group-containing monomer (b2) | AM | 0.1 |
|  |  | Hydroxyl group-containing monomer (b3) | HEMA | 1 |
|  |  | Crosslinkable monomer (b4) | GMA | 0 |
|  |  |  | A-TMPT | 0.5 |
|  |  |  | MAPTMS | 0 |
|  |  |  | (b4) Total | 0.5 |
|  |  | (Meth)acrylic acid ester monomer (b5) | MMA | 5 |
|  |  |  | BMA | 10 |
|  |  |  | BA | 1 |
|  |  |  | 2EHA | 5.4 |
|  | (Meth)acrylic acid ester monomer total |  |  | 96.4 |
|  | (P) + (A) + (B) |  |  | 100.0 |
|  | Emulsifier |  | KH1025 | 3 |
|  |  |  | SR1025 | 3 |
|  |  |  | NaSS | 0.05 |
|  | Initiator |  | APS (aq) | 7.5 |
|  | Ion-exchanged water |  | — | 52 |
| Neutralizer |  |  |  | None |
| Particle size (D50) (nm) |  |  |  | 570 |
| Glass transition temperature Tg (° C.) |  |  |  | −10 |

TABLE 7

|  | Type |  | Starting material | Aqueous dispersion | | | | | |
|---|---|---|---|---|---|---|---|---|---|
|  |  |  |  | a1 | a2 | a3 | a4 | a5 | a6 |
| Initial | Emulsifier |  | KH1025 | 0.5 | 0.05 | 0.05 | 0.05 | 0.05 | 0.05 |
|  |  |  | SR1025 | 0.5 | 0.05 | 0.05 | 0.05 | 0.05 | 0.05 |
|  | Seed (40% solid content) |  | a2 |  |  |  | 25 | 25 | 25 |
|  |  |  | a3 |  |  |  |  |  |  |
|  | Ion-exchanged water |  | — | 70.4 | 70.4 | 70.4 | 70.4 | 70.4 | 320.4 |
|  | Initiator |  | APS (aq) | 7.5 | 7.5 | 7.5 | 7.5 | 7.5 | 15 |
| Emulsified liquid | Polyalkyleneglycol group-containing monomer (P) |  | M-20G | 0 | 0 | 0 | 0 | 0 | 0 |
|  |  |  | M-40G | 0 | 0 | 0 | 0 | 0 | 0 |
|  |  |  | M-90G | 0 | 0 | 0 | 0 | 0 | 0 |
|  |  |  | M-230G | 0 | 0 | 0 | 0 | 0 | 0 |
|  | Cycloalkyl group-containing monomer (A) |  | CHMA | 25 | 70 | 70 | 45 | 70 | 50 |
|  | Other monomers (B) | Carboxyl group-containing monomer (b1) | MAA | 1 | 1 | 1 | 1 | 1 | 1 |
|  |  |  | AA | 1 | 1 | 1 | 1 | 1 | 1 |
|  |  | Amide group-containing monomer (b2) | AM | 0.1 | 0.1 | 0.1 | 0.1 | 0.1 | 0.1 |
|  |  | Hydroxyl group-containing monomer (b3) | HEMA | 5 | 1 | 1 | 1 | 1 | 1 |

TABLE 7-continued

|  | | Starting | Aqueous dispersion | | | | | |
|---|---|---|---|---|---|---|---|---|
| | Type | material | a1 | a2 | a3 | a4 | a5 | a6 |
| | Crosslinkable | GMA | 0 | 0 | 0 | 0 | 0 | 0 |
| | monomer (b4) | A-TMPT | 0.5 | 0.1 | 1 | 0.1 | 0.5 | 20 |
| | | MAPTMS | 0 | 0 | 0 | 0 | 0 | 0 |
| | | (b4) Total | 0.5 | 0.1 | 1 | 0.1 | 0.5 | 20 |
| | (Meth)acrylic | MMA | 4.9 | 5 | 4.1 | 5 | 5 | 5.5 |
| | acid ester | BMA | 1.5 | 10 | 10 | 15 | 10 | 10 |
| | monomer (b5) | BA | 1 | 1 | 1 | 1 | 1 | 1 |
| | | 2EHA | 60 | 10.8 | 10.8 | 30.8 | 10.4 | 10.4 |
| | (Meth)acrylic acid ester monomer total | | 92.4 | 96.8 | 95.9 | 96.8 | 96.4 | 76.9 |
| | (P) + (A) + (B) | | 100.0 | 100.0 | 100.0 | 100.0 | 100.0 | 100.0 |
| | Emulsifier | KH1025 | 3 | 3 | 3 | 3 | 3 | 3 |
| | | SR1025 | 3 | 3 | 3 | 3 | 3 | 3 |
| | | NaSS | 0.05 | 0.05 | 0.05 | 0.05 | 0.05 | 0.05 |
| | Initiator | APS (aq) | 7.5 | 7.5 | 7.5 | 7.5 | 7.5 | 15 |
| | Ion-exchanged water | — | 52 | 52 | 52 | 52 | 52 | 45 |
| Neutralizer | | | AW | AW | AW | AW | AW | AW |
| Particle size (D50) (nm) | | | 160 | 260 | 260 | 540 | 540 | 540 |
| Glass transition temperature Tg (° C.) | | | −20 | 60 | 60 | 25 | 60 | 60 |

TABLE 8

| Name | Average number of repeating units (n) | Substance |
|---|---|---|
| M-20G | 2 | Methoxydiethyleneglycol methacrylate |
| M-40G | 4 | Methoxypolyethyleneglycol methacrylate |
| M-90G | 9 | Methoxypolyethyleneglycol methacrylate |
| M-230G | 23 | Methoxypolyethyleneglycol methacrylate |
| AM-30G | 3 | Methoxytriethyleneglycol acrylate |
| M-30PG | 3 | Methoxypolypropyleneglycol methacrylate |
| 4G | 4 | Polyethyleneglycol dimethacrylate |
| 9G | 9 | Polyethyleneglycol dimethacrylate |

<Production of Polyolefin Porous Substrate>
Polyolefin Porous Substrate B1

High-density polyethylene homopolymer with a Mv of 700,000, at 45 parts by weight,
high-density polyethylene homopolymer with a Mv of 300,000, at 45 parts by weight, and
polypropylene homopolymer with a Mv of 400,000, at 5 parts by weight, were dry-blended using a tumbler blender.

To 99 parts by weight of the obtained polyolefin mixture there was added 1 part by weight of tetrakis-[methylene-(3′,5′-di-t-butyl-4′-hydroxyphenyl)propionate]methane as an antioxidant, and a tumbler blender was again used for dry blending to obtain a mixture.

The obtained mixture was supplied to a twin-screw extruder through a feeder, under a nitrogen atmosphere.

Liquid paraffin (kinematic viscosity at 37.78° C.: 7.59×$10^{-5}$ m$^2$/s) was also injected into the extruder cylinder by a plunger pump.

The operating conditions for the feeder and pump were adjusted for a liquid paraffin content of 65 parts by weight and a polymer concentration of 35 parts by weight in the total mixture to be extruded.

The contents were then melt-kneaded in the twin-screw extruder while heating them to 230° C., the obtained melt kneaded mixture was extruded through a T-die onto a cooling roll controlled to a surface temperature of 80° C., and the extruded mixture was contacted with the cooling roll for casting and cooled for solidification to obtain a cast sheet.

The sheet was stretched to a factor of 7×6.4 with a simultaneous biaxial stretcher at a temperature of 112° C. The stretched sheet was then immersed in methylene chloride for extraction removal of the liquid paraffin and dried, and a tenter stretcher was further used to stretch the sheet in order for the stretch ratio to be 2 in the transverse direction at a temperature of 130° C.

The stretched sheet was then relaxed to approximately 10% in the transverse direction and subjected to heat treatment to obtain a polyolefin porous substrate B1.

Polyolefin Porous Substrate B2

The following materials:
SiO$_2$ "DM10C" (trademark of Tokuyama Corp.), at 6.4 parts by weight,
high-density polyethylene with a viscosity-average molecular weight of 700,000, at 12.2 parts by weight,
high-density polyethylene with a viscosity-average molecular weight of 250,000, at 12.2 parts by weight,
homopolypropylene with a viscosity-average molecular weight of 400,000, at 1.3 parts by weight,
liquid paraffin as a plasticizer, at 37.1 parts by weight, and
pentaerythrityl-tetrakis-[3-(3,5-di-t-butyl-4-hydroxyphenyl)propionate] as an antioxidant, at 0.3 part by weight,
were pre-mixed with a super mixer, to prepare a starting material for a first polyolefin microporous layer.

The following starting materials:
high-density polyethylene with a viscosity-average molecular weight of 700,000, at 10.8 parts by weight,
high-density polyethylene with a viscosity-average molecular weight of 250,000, at 10.8 parts by weight,
homopolypropylene with a viscosity-average molecular weight of 400,000, at 1.1 parts by weight,
liquid paraffin as a plasticizer, at 46.3 parts by weight, and
pentaerythrityl-tetrakis-[3-(3,5-di-t-butyl-4-hydroxyphenyl)propionate] as an antioxidant, at 0.3 part by weight,
were pre-mixed with a super mixer, to prepare a starting material for a second polyolefin microporous layer.

The starting materials were supplied through feeders to the feed ports of two twin-screw codirectional extruders. Liquid paraffin was also side-fed to the twin-screw extruder cylinders together with each starting material, in order for a plasticizer ratio of 60 weight % in the total mixture to be melt-kneaded and extruded.

The melt-kneading conditions in the extruder were as follows.

First Micropore Layer Starting Material
Preset temperature: 200° C.
Screw rotational speed: 100 rpm
Throughput: 5 kg/h
Second Micropore Layer Starting Material
Preset temperature: 200° C.
Screw rotational speed: 120 rpm
Throughput: 16 kg/h Next, each melt-kneaded mixture was extruded between a pair of rolls controlled to a surface temperature of 30° C., through a gear pump set to a temperature of 220° C., a conduit and a T-die capable of 2-component/3-layer co-extrusion, to obtain a sheet-like composition with the first layer composed of the first micropore layer starting material as the surface layer. Polyolefin porous substrate B2 was then obtained by the same procedure as the production example for polyolefin porous substrate B1, except for adjusting the subsequent stretching temperature and relaxation factor.

Polyolefin Porous Substrate B3

CELGARD "CG2500", a polypropylene monolayer film, was prepared as polyolefin porous substrate B3.

Polyolefin Porous Substrate B4

Polyolefin porous substrate B1 was produced in the same manner as the production example for polyolefin porous substrate B1.

Next, 97.0 parts by weight of aluminum hydroxide oxide (mean particle size: 1.0 μm), 3.0 parts by weight of acrylic latex (solid concentration: 40%, mean particle size: 145 nm, minimum film-forming temperature: ≤0° C.) and 1.0 part by weight of an aqueous ammonium polycarboxylate solution (SN dispersant 5468, product of San Nopco, Ltd.) were uniformly dispersed in 100 parts by weight of water to prepare a coating solution. The coating solution was then coated onto the surface of polyolefin porous substrate B1 using a gravure coater. It was then dried at 60° C. to remove the water. This formed an aluminum hydroxide oxide layer (inorganic-filler porous layer) on the polyolefin porous substrate B1 to a thickness of 2 μm, to obtain polyolefin porous substrate B4.

Polyolefin Porous Substrate B5

An aluminum hydroxide oxide layer was formed to a thickness of 2 μm on both sides of the polyolefin porous substrate B1 by the same method as for B4, to obtain substrate B5 having a thickness of 16 μm.

Polyolefin Porous Substrate B6

Polyolefin porous substrate B1 was produced in the same manner as the production example for polyolefin porous substrate B1.

Next, 97.0 parts by weight of aluminum hydroxide oxide (mean particle size: 1.0 μm), 1.0 part by weight of acrylic latex (solid concentration: 40%, mean particle size: 145 nm, minimum film-forming temperature: ≤0° C.) and 1.0 part by weight of an aqueous ammonium polycarboxylate solution (SN dispersant 5468, product of San Nopco, Ltd.) were uniformly dispersed in 100 parts by weight of water to prepare a coating solution. The coating solution was then coated onto the surface of polyolefin porous substrate B1 using a gravure coater. It was then dried at 60° C. to remove the water. This formed an aluminum hydroxide oxide layer (inorganic filler porous layer) on the polyolefin porous substrate B1 to a thickness of 2 μm, to obtain polyolefin porous substrate B6.

The physical properties of substrates B1 to B6 are shown in Table 9 below.

TABLE 9

| Substrate | B1 | B2 | B3 | B4 | B5 | B6 |
|---|---|---|---|---|---|---|
| Basis weight (g/m$^2$) | 7.0 | 7.2 | CELGARD "CG2500" | Inorganic coated film | Inorganic coated film | Inorganic coated film |
| Film thickness (μm) | 12 | 12 | | | | |
| Porosity (%) | 40 | 43 | | | (double-sided coating) | (low binder content) |
| Gas permeability (sec/100 cc) | 150 | 230 | | | | |
| Puncture strength (g) | 320 | 530 | | | | |

Examples and Comparative Examples

[Separators Comprising Polyolefin Porous Substrates (Except for Example 2b)]

Using a gravure coater, the coating solutions listed in Tables 10 to 18 below were coated onto both sides of the corresponding polyolefin porous substrates with the corresponding coating basis weights and coated area percentages, and then heated at 50° C. for 1 minute for drying to form thermoplastic polymer particle layers on each of the polyolefin porous substrates to obtain a separator for an electricity storage device.

The thermoplastic polymer particle layers in Tables 10 to 17 were formed using a reverse gravure coater, and those in Table 18 were formed using a direct gravure coater.

In the Examples, the coating solution was coated onto both sides of substrate B4, substrate B5 and substrate B6 that comprised an inorganic filler porous layer on one or both sides of the polyolefin porous substrate.

For the Examples and Comparative Examples, the coating solutions comprising aluminum hydroxide oxide as the inorganic filler and a thermoplastic polymer-containing aqueous dispersion were coated onto both sides of the polyolefin porous substrate B1, to a thickness of 2 μm on each side.

[Separator Layer without Polyolefin Porous Substrate (Example 2b)]

Example 2b

The surface of the positive electrode active material layer obtained in the item "a. Fabrication of positive electrode" of the "(15) Rate property" above was coated with the coating solution listed as [Example 2b] in Table 15 below using a bar coater, with the corresponding coating basis weight and coated area percentage, and then dried at 50° C. for 1 minute for drying to fabricate a thermoplastic polymer particle layer on the positive electrode active material layer surface.

Next, a coating solution prepared by uniformly dispersing 97.0 parts by weight of aluminum hydroxide oxide (mean particle size: 1.0 μm), 3.0 parts by weight of acrylic latex (solid concentration: 40%, mean particle size: 145 nm, minimum film-forming temperature: ≤0° C.) and 1.0 part by weight of an aqueous ammonium polycarboxylate solution (SN dispersant 5468, product of San Nopco, Ltd.) in 10 parts by weight of water was coated onto the thermoplastic polymer layer using a bar coater. This was then dried at 60° C. to remove the water, forming an inorganic layer with a thickness of 14 μm. This was additionally coated with the coating solution listed as [Example 2b] in Table 15 below using a bar coater, with the corresponding coating basis weight and coated area percentage, and then dried at 50° C. for 1 minute for drying to fabricate a thermoplastic polymer particle layer on the inorganic layer surface.

A separator layer without a polyolefin microporous film on a positive electrode was thus fabricated, and a negative electrode was placed over it and the stack was cut out to a 16 mmϕ circular shape to obtain an electrode body.

[Evaluation Results]

Lithium-ion secondary batteries were assembled in the manner described above using the obtained separators or electrode bodies, and were used for the evaluations. The evaluation results are shown in Tables 10 to 18.

TABLE 10

| | | | Example | | | | | | | | | |
|---|---|---|---|---|---|---|---|---|---|---|---|---|
| Example No. | | | 1 | 2 | 3 | 4 | 5 | 6 | 7 | 8 | 9 | 10 |
| Separator No. | | | S1 | S2 | S3 | S4 | S5 | S6 | S7 | S8 | S9 | S10 |
| Substrate No. | | | B1 | B1 | B1 | B1 | B1 | B1 | B1 | B1 | B1 | B1 |
| Coating solution | Composition | Aqueous dispersion No. | A19 | A20 | A21 | A22 | A23 | A24 | A25 | A26 | A27 | A28 |
| | | Mixing ratio % | 90 | 90 | 90 | 90 | 90 | 90 | 90 | 90 | 90 | 90 |
| | | Aqueous dispersion No. | a1 | a1 | a1 | a1 | a1 | a1 | a1 | a1 | a1 | a1 |
| | | Mixing ratio % | 10 | 10 | 10 | 10 | 10 | 10 | 10 | 10 | 10 | 10 |
| | Solid content in coating solution % | | 10 | 10 | 10 | 10 | 10 | 10 | 10 | 10 | 10 | 10 |
| Thermoplastic polymer form | | | Particulate | Particulate | Particulate | Particulate | Particulate | Particulate | Particulate | Particulate | Particulate | Particulate |
| Thermoplastic polymer coated basis weight | | g/m² | 0.5 | 0.5 | 0.5 | 0.5 | 0.5 | 0.5 | 0.5 | 0.5 | 0.5 | 0.5 |
| Thermoplastic polymer coating area | | % | 60 | 60 | 60 | 60 | 60 | 60 | 60 | 60 | 60 | 60 |
| Voronoi tessellation | 3 visual field evaluation | Area density (%) | 60 | 60 | 60 | 60 | 60 | 60 | 60 | 60 | 60 | 60 |
| | | $\sigma^2$ (dispersion) mean value | 0.5 | 0.5 | 0.5 | 0.5 | 0.5 | 0.5 | 0.5 | 0.5 | 0.5 | 0.5 |
| | 95 visual field evaluation | Area density (%) | 59 | 59 | 59 | 59 | 59 | 59 | 59 | 59 | 59 | 59 |
| | | $\sigma^2$ (dispersion) mean value | 0.5 | 0.5 | 0.5 | 0.5 | 0.5 | 0.5 | 0.5 | 0.5 | 0.5 | 0.5 |
| Electric resistance | | | S | A | S | S | A | S | A | S | S | S |
| Electrode adhesive | | | A | A | A | A | A | A | A | A | A | A |
| Hot peel strength | | | A | A | A | A | A | A | A | A | A | A |
| Ordinary temperature peel strength | | | B | A | A | A | A | A | A | A | A | A |
| Rate property | | | S | A | S | S | A | S | A | S | S | S |
| Cycle characteristic | | | A | A | A | A | A | A | A | A | A | A |

TABLE 11

| | | | Example | | | | | | | | | |
|---|---|---|---|---|---|---|---|---|---|---|---|---|
| Example No. | | | 11 | 12 | 13 | 14 | 15 | 16 | 17 | 18 | 19 | 20 |
| Separator No. | | | S11 | S12 | S13 | S14 | S15 | S16 | S17 | S18 | S19 | S20 |
| Substrate No. | | | B1 | B1 | B1 | B1 | B1 | B1 | B1 | B1 | B1 | B1 |
| Coating solution | Composition | Aqueous dispersion No. | A29 | A30 | A31 | A32 | A33 | A34 | A36 | A37 | A38 | A39 |
| | | Mixing ratio % | 90 | 90 | 90 | 90 | 90 | 90 | 90 | 90 | 90 | 90 |
| | | Aqueous dispersion No. | a1 | a1 | a1 | a1 | a1 | a1 | a1 | a1 | a1 | a1 |
| | | Mixing ratio % | 10 | 10 | 10 | 10 | 10 | 10 | 10 | 10 | 10 | 10 |
| | Solid content in coating solution % | | 10 | 10 | 10 | 10 | 10 | 10 | 10 | 10 | 10 | 10 |
| Thermoplastic polymer form | | | Particulate | Particulate | Particulate | Particulate | Particulate | Particulate | Particulate | Particulate | Particulate | Particulate |
| Thermoplastic polymer coated basis weight | | g/m² | 0.5 | 0.5 | 0.5 | 0.5 | 0.5 | 0.4 | 0.5 | 0.5 | 0.5 | 0.5 |
| Thermoplastic polymer coating area | | % | 60 | 60 | 60 | 60 | 60 | 80 | 60 | 60 | 60 | 60 |
| Voronoi tessellation | 3 visual field evaluation | Area density (%) | 60 | 60 | 60 | 60 | 60 | 80 | 60 | 60 | 60 | 60 |
| | | $\sigma^2$ (dispersion) mean value | 0.5 | 0.5 | 0.5 | 0.5 | 0.5 | 0.4 | 0.5 | 0.5 | 0.5 | 0.5 |
| | 95 visual field evaluation | Area density (%) | 59 | 59 | 59 | 59 | 59 | 78 | 59 | 59 | 59 | 59 |

TABLE 11-continued

| | | | Example | | | | | | | | | |
|---|---|---|---|---|---|---|---|---|---|---|---|---|
| Example No. | | | 11 | 12 | 13 | 14 | 15 | 16 | 17 | 18 | 19 | 20 |
| evaluation | | $\sigma^2$ (dispersion) mean value | 0.5 | 0.5 | 0.5 | 0.5 | 0.5 | 0.4 | 0.5 | 0.5 | 0.5 | 0.5 |
| Electric resistance | | | S | S | S | S | S | S | S | S | S | S |
| Electrode adhesive | | | A | A | A | A | A | A | A | A | A | A |
| Hot peel strength | | | A | A | A | A | A | A | A | A | B | A |
| Ordinary temperature peel strength | | | A | A | A | A | A | A | A | A | A | A |
| Rate property | | | S | S | S | S | S | S | S | S | S | S |
| Cycle characteristic | | | A | A | A | A | A | A | A | A | A | A |

TABLE 12

| | | | Example | | | | | | | | |
|---|---|---|---|---|---|---|---|---|---|---|---|
| Example No. | | | 21 | 22 | 23 | 24 | 25 | 26 | 27 | 28 | 29 |
| | Separator No. | | S21 | S22 | S23 | S24 | S25 | S26 | S27 | S28 | S29 |
| | Substrate No. | | B1 | B1 | B1 | B1 | B1 | B1 | B1 | B1 | B2 |
| Coating solution | Composition | Aqueous dispersion No. | A21 | A21 | A18 | A21 | A24 | A24 | A28 | A28 | A21 |
| | | Mixing ratio % | 90 | 90 | 100 | 70 | 90 | 90 | 90 | 90 | 90 |
| | | Aqueous dispersion No. | a1 | A4 | — | A4 | A4 | A4 | A4 | A4 | A4 |
| | | Mixing ratio % | 10 | 10 | — | 30 | 10 | 10 | 10 | 10 | 10 |
| | Solid content in coating solution % | | 20 | 30 | — | 10 | 10 | 10 | 10 | 10 | 10 |
| Thermoplastic polymer form | | | Particulate | Particulate | Non-particulate | Particulate | Particulate | Particulate | Particulate | Particulate | Particulate |
| Thermoplastic polymer coated basis weight | | g/m² | 1.0 | 1.5 | 0.4 | 0.5 | 0.7 | 0.3 | 0.7 | 0.3 | 0.5 |
| Thermoplastic polymer coating area | | % | 100 | 100 | 80 | 60 | 70 | 20 | 70 | 20 | 60 |
| Voronoi tessellation | 3 visual field evaluation | Area density (%) | 100 | 100 | 80 | 60 | 70 | 20 | 70 | 20 | 60 |
| | | $\sigma^2$ (dispersion) mean value | 0.3 | — | — | 0.5 | 0.4 | 0.7 | 0.4 | 0.7 | 0.5 |
| | 95 visual field evaluation | Area density (%) | 100 | 100 | 78 | 59 | 68 | 19 | 68 | 19 | 59 |
| | | $\sigma^2$ (dispersion) mean value | 0.3 | — | — | 0.5 | 0.4 | 0.7 | 0.4 | 0.7 | 0.5 |
| Electric resistance | | | A | A | A | S | S | S | S | S | S |
| Electrode adhesive | | | S | S | A | A | S | A | S | A | A |
| Hot peel strength | | | A | A | A | A | A | B | A | B | A |
| Ordinary temperature peel strength | | | A | A | A | A | A | A | A | A | A |
| Rate property | | | A | A | A | S | S | S | S | S | S |
| Cycle characteristic | | | S | A | A | A | S | S | S | S | A |

| | | | Example | | | | | | |
|---|---|---|---|---|---|---|---|---|---|
| Example No. | | | 30 | 6b | 7b | 31 | 32 | 33 | 34 |
| | Separator No. | | S30 | S6b | S7b | S31 | S32 | S33 | S34 |
| | Substrate No. | | B3 | B3 | B3 | B4 | B4 | B4 | B5 |
| Coating solution | Composition | Aqueous dispersion No. | A21 | A21 | A40 | A21 | A24 | A28 | A21 |
| | | Mixing ratio % | 90 | 90 | 90 | 90 | 90 | 90 | 90 |
| | | Aqueous dispersion No. | A4 | A4 | A16 | A4 | A4 | A4 | A4 |
| | | Mixing ratio % | 10 | 10 | 10 | 10 | 10 | 10 | 10 |
| | Solid content in coating solution % | | 10 | 30 | 10 | 10 | 10 | 10 | 10 |
| Thermoplastic polymer form | | | Particulate | Particulate | Particulate | Particulate | Particulate | Particulate | Particulate |
| Thermoplastic polymer coated basis weight | | g/m² | 0.5 | 1.5 | 0.5 | 0.5 | 0.5 | 0.5 | 0.5 |
| Thermoplastic polymer coating area | | % | 60 | 100 | 60 | 60 | 60 | 60 | 60 |
| Voronoi tessellation | 3 visual field evaluation | Area density (%) | 60 | 100 | 60 | 60 | 60 | 60 | 60 |
| | | $\sigma^2$ (dispersion) mean value | 0.5 | — | 0.5 | 0.5 | 0.5 | 0.5 | 0.5 |
| | 95 visual field evaluation | Area density (%) | 59 | 100 | 59 | 59 | 59 | 59 | 59 |
| | | $\sigma^2$ (dispersion) mean value | 0.5 | — | 0.5 | 0.5 | 0.5 | 0.5 | 0.5 |

TABLE 12-continued

| | | | | | | | |
|---|---|---|---|---|---|---|---|
| Electric resistance | S | A | S | S | S | S | S |
| Electrode adhesive | A | S | A | A | A | A | A |
| Hot peel strength | A | A | A | A | A | A | A |
| Ordinary temperature peel strength | A | A | C | A | A | A | A |
| Rate property | S | A | S | S | S | S | S |
| Cycle characteristic | A | A | S | A | A | A | A |

TABLE 13

| | | | | Example | | | | | | | | |
|---|---|---|---|---|---|---|---|---|---|---|---|---|
| Example No. | | | | 35 | 36 | 37 | 38 | 39 | 40 | 41 | 42 | 43 | 44 |
| Separator No. | | | | S35 | S36 | S37 | S38 | S39 | S40 | S41 | S42 | S43 | S44 |
| Substrate No. | | | | B1 | B1 | B1 | B1 | B1 | B1 | B1 | B1 | B1 | B1 |
| Coating solution | Composition | Aqueous dispersion No. | | A21 | A21 | A21 | A21 | A21 | A21 | A21 | A21 | A21 | A21 |
| | | Mixing ratio | % | 90 | 90 | 90 | 90 | 90 | 90 | 90 | 90 | 90 | 90 |
| | | Aqueous dispersion No. | | A1 | A2 | A3 | A4 | A5 | A6 | A7 | A8 | A9 | A10 |
| | | Mixing ratio | % | 10 | 10 | 10 | 10 | 10 | 10 | 10 | 10 | 10 | 10 |
| | Solid content in coating solution | | % | 10 | 10 | 10 | 10 | 10 | 10 | 10 | 10 | 10 | 10 |
| Thermoplastic polymer form | | | | Particulate | Particulate | Particulate | Particulate | Particulate | Particulate | Particulate | Particulate | Particulate | Particulate |
| Thermoplastic polymer coated basis weight | | | g/m² | 0.5 | 0.5 | 0.5 | 0.5 | 0.5 | 0.5 | 0.5 | 0.5 | 0.5 | 0.5 |
| Thermoplastic polymer coating area | | | % | 60 | 60 | 60 | 60 | 60 | 60 | 60 | 60 | 60 | 60 |
| Voronoi tessellation | 3 visual field evaluation | Area density (%) | | 60 | 60 | 60 | 60 | 60 | 60 | 60 | 60 | 60 | 60 |
| | | $\sigma^2$ (dispersion) mean value | | 0.5 | 0.5 | 0.5 | 0.5 | 0.5 | 0.5 | 0.5 | 0.5 | 0.5 | 0.5 |
| | 95 visual field evaluation | Area density (%) | | 59 | 59 | 59 | 59 | 59 | 59 | 59 | 59 | 59 | 59 |
| | | $\sigma^2$ (dispersion) mean value | | 0.5 | 0.5 | 0.5 | 0.5 | 0.5 | 0.5 | 0.5 | 0.5 | 0.5 | 0.5 |
| Electric resistance | | | | S | S | S | S | S | S | S | S | S | S |
| Electrode adhesive | | | | A | A | A | A | A | A | A | A | A | A |
| Hot peel strength | | | | A | A | A | A | A | A | A | A | A | A |
| Ordinary temperature peel strength | | | | A | A | A | A | A | A | A | A | A | A |
| Rate property | | | | S | S | S | S | S | S | S | S | S | S |
| Cycle characteristic | | | | A | A | A | A | A | A | A | A | A | A |

TABLE 14

| | | | | Example | | | | | | |
|---|---|---|---|---|---|---|---|---|---|---|
| Example No. | | | | 45 | 46 | 47 | 48 | 49 | 50 | 51 |
| Separator No. | | | | S45 | S46 | S47 | S48 | S49 | S50 | S51 |
| Substrate No. | | | | B1 | B1 | B1 | B1 | B1 | B1 | B1 |
| Coating solution | Composition | Aqueous dispersion No. | | A21 | A21 | A21 | A21 | A21 | A21 | A21 |
| | | Mixing ratio | % | 90 | 90 | 90 | 90 | 90 | 90 | 90 |
| | | Aqueous dispersion No. | | A11 | A12 | A13 | A14 | A15 | A16 | A17 |
| | | Mixing ratio | % | 10 | 10 | 10 | 10 | 10 | 10 | 10 |
| | Solid content in coating solution | | % | 10 | 10 | 10 | 10 | 10 | 10 | 10 |
| Thermoplastic polymer form | | | | Particulate | Particulate | Particulate | Particulate | Particulate | Particulate | Particulate |
| Thermoplastic polymer coated basis weight | | | g/m² | 0.5 | 0.5 | 0.5 | 0.5 | 0.5 | 0.5 | 0.5 |
| Thermoplastic polymer coating area | | | % | 60 | 60 | 60 | 60 | 60 | 60 | 60 |
| Voronoi tessellation | 3 visual field evaluation | Area density (%) | | 60 | 60 | 60 | 60 | 60 | 60 | 60 |
| | | $\sigma^2$ (dispersion) mean value | | 0.5 | 0.5 | 0.5 | 0.5 | 0.5 | 0.5 | 0.5 |
| | 95 visual field evaluation | Area density (%) | | 59 | 59 | 59 | 59 | 59 | 59 | 59 |
| | | $\sigma^2$ (dispersion) mean value | | 0.5 | 0.5 | 0.5 | 0.5 | 0.5 | 0.5 | 0.5 |

TABLE 14-continued

| | Example | | | | | | |
|---|---|---|---|---|---|---|---|
| Example No. | 45 | 46 | 47 | 48 | 49 | 50 | 51 |
| Electric resistance | S | S | S | S | S | S | S |
| Electrode adhesive | A | A | A | A | A | A | A |
| Hot peel strength | A | A | A | A | A | A | A |
| Ordinary temperature peel strength | A | A | A | A | A | A | A |
| Rate property | S | S | S | S | S | S | S |
| Cycle characteristic | A | A | A | A | A | A | A |

TABLE 15

| Example, Comp. Example No. | | | Comp. Example | | | | | | | Example | | | | |
|---|---|---|---|---|---|---|---|---|---|---|---|---|---|---|
| | | | 1 | 2 | 3 | 4 | 5 | 6 | 1b | 1b | 2b | 3b | 4b | 5b |
| Separator No. | | | T1 | T2 | T3 | T4 | T5 | T6 | T1b | S1b | S2b | S3b | S4b | S5b |
| Substrate No. | | | B1 | B1 | B1 | B1 | B4 | B1 | B1 | B1 | Electrode coating | B6 | B1 | B1 |
| Coating solution | Composition | Aqueous dispersion No. | a4 | a5 | a5 | a5 | — | — | a5 | A21 | A24 | A24 | A40 | A21 |
| | | Mixing ratio % | 90 | 90 | 90 | 85 | — | — | 60 | 60 | 90 | 90 | 90 | 90 |
| | | Aqueous dispersion No. | a1 | a1 | a1 | a1 | — | — | a1 | a1 | A4 | A4 | A16 | A4 |
| | | Mixing ratio % | 10 | 10 | 10 | 10 | — | — | 40 | 40 | 10 | 10 | 10 | 10 |
| | | Other starting material | — | — | — | M-40G | M-90G | — | — | — | — | — | — | — |
| | | Mixing ratio % | — | — | — | 5 | 100 | — | — | — | — | — | — | — |
| | Solid content in coating solution % | | 10 | 10 | 20 | 10 | 100 | — | 10 | 10 | 10 | 10 | 10 | 20 |
| Thermoplastic polymer form | | | Particulate | Particulate | Particulate | Particulate | Non-particulate | — | Particulate | Particulate | Particulate | Particulate | Particulate | Particulate |
| Thermoplastic polymer coated basis weight g/m² | | | 0.5 | 0.5 | 1.0 | 0.5 | 0.5 | — | 0.5 | 0.5 | 0.7 | 0.5 | 0.5 | 0.9 |
| Thermoplastic polymer coating area % | | | 60 | 60 | 100 | 60 | 100 | — | 60 | 60 | 70 | 60 | 60 | 95 |
| Voronoi tessellation | 3 visual field evaluation | Area density (%) | 60 | 60 | 100 | 60 | 60 | — | 60 | 60 | — | 60 | 60 | 100 |
| | | σ² (dispersion) mean value | 0.5 | 0.5 | 0.3 | 0.5 | 0.5 | — | 0.5 | 0.5 | — | 0.5 | 0.5 | — |
| | 95 visual field evaluation | Area density (%) | 59 | 59 | 100 | 59 | 59 | — | 59 | 59 | — | 59 | 59 | 100 |
| | | σ² (dispersion) mean value | 0.5 | 0.5 | 0.3 | 0.5 | 0.5 | — | 0.5 | 0.5 | — | 0.5 | 0.5 | — |
| Electric resistance | | | B | B | C | B | S | S | B | A | S | S | S | S |
| Electrode adhesive | | | A | A | S | A | C | C | A | A | — | B | S | S |
| Hot peel strength | | | A | A | A | A | A | C | A | A | — | B | A | A |
| Ordinary temperature peel strength | | | B | A | A | A | A | A | C | C | — | A | C | A |
| Rate property | | | B | B | C | B | A | A | B | A | S | S | S | S |
| Cycle characteristic | | | A | A | C | A | C | B | A | A | B | A | S | A |

TABLE 16

| Example, Comp. Example No. | | | Example | | | | | Comp. Example |
|---|---|---|---|---|---|---|---|---|
| | | | 52 | 53 | 54 | 55 | 56 | 7 |
| Separator No. | | | S52 | S53 | S54 | S55 | S56 | T7 |
| Substrate No. | | | B1 | B1 | B1 | B1 | B1 | B1 |
| Coating solution | Composition | Filler | + | + | + | + | + | + |
| | | Mixing ratio % | 80 | 40 | 80 | 60 | 60 | 80 |
| | | Aqueous dispersion No. | A18 | A18 | A24 | A24 | A28 | a4 |

TABLE 16-continued

|  |  | Example |  |  |  |  | Comp. Example |
|---|---|---|---|---|---|---|---|
| Example, Comp. Example No. |  | 52 | 53 | 54 | 55 | 56 | 7 |
| Mixing ratio | % | 20 | 60 | 20 | 40 | 40 | 20 |
| Solid content in coating solution | % | 40 | 40 | 40 | 40 | 40 | 40 |
| Coating layer thickness | μm | 4 | 4 | 4 | 4 | 4 | 4 |
| Thermoplastic polymer form |  | Particulate | Particulate | Particulate | Particulate | Particulate | Particulate |
| Electric resistance |  | B | B | A | B | A | C |
| Electrode adhesive |  | A | A | A | A | A | A |
| Hot peel strength |  | B | A | B | B | B | B |
| Ordinary temperature peel strength |  | A | A | A | A | A | A |
| Rate property |  | A | B | A | A | A | C |
| Cycle characteristic |  | A | A | A | A | A | C |

TABLE 17

|  |  |  | Example | Comp. Example |
|---|---|---|---|---|
| Example, Comp. Example No. |  |  | 57 | 8 |
| Separator No. |  |  | S57 | T8 |
| Substrate No. |  |  | B1 | B1 |
| Coating solution | Composition | Aqueous dispersion No. | A35 | a6 |
|  |  | Mixing ratio % (polymer solid content) | 90 | 90 |
|  |  | Aqueous dispersion No. | A4 | a1 |
|  |  | Mixing ratio % (polymer solid content) | 10 | 10 |
| Solid content of coating solution | % |  | 10 | 10 |
| Thermoplastic polymer form |  |  | Particulate | Particulate |
| Coated basis weight of thermoplastic polymer | g/m² |  | 1.5 | 1.5 |
| Electric resistance |  |  | A | C |
| Electrode adhesion |  |  | C | C |
| Hot peel strength |  |  | B | B |
| Ordinary temperature peel strength |  |  | A | A |
| 130° C._TD heat shrinkage factor | % |  | 10 | 10 |
| Rate property |  |  | A | C |
| Cycle characteristic |  |  | B | C |
| Nail-penetration test |  |  | A | A |

TABLE 18

| Example No. |  |  | Example 8b | Example 9b | Example 10b | Example 11b | Example 12b | Example 13b | Example 14b | Example 15b |
|---|---|---|---|---|---|---|---|---|---|---|
| Separator No. |  |  | S8b | S9b | S10b | S11b | S12b | S13b | S14b | S15b |
| Substrate No. |  |  | B1 | B1 | B1 | B1 | B3 | B3 | B3 | B3 |
| Coating solution | Composition | Aqueous dispersion No. | A21 | A21 | A21 | A21 | A21 | A21 | A21 | A21 |
|  |  | Mixing ratio % | 90 | 90 | 90 | 90 | 90 | 90 | 90 | 90 |
|  |  | Aqueous dispersion No. | A4 | A4 | A4 | A4 | A4 | A4 | A4 | A4 |
|  |  | Mixing ratio % | 10 | 10 | 10 | 10 | 10 | 10 | 10 | 10 |
|  | Solid content in coating solution | % | 10 | 30 | 10 | 30 | 10 | 30 | 10 | 30 |
| Coating pattern |  |  | Dot | Dot | Diagonal | Diagonal | Dot | Dot | Diagonal | Diagonal |
| Distance between polymer aggregates (μm) |  |  | 100 | 40 | 100 | 40 | 100 | 40 | 100 | 40 |
| Thermoplastic polymer form |  |  | Particulate | Particulate | Particulate | Particulate | Particulate | Particulate | Particulate | Particulate |
| Thermoplastic polymer coated basis weight | g/m² |  | 0.5 | 1.5 | 0.5 | 1.5 | 0.5 | 1.5 | 0.5 | 1.5 |
| Thermoplastic polymer coating area | % |  | 60 | 80 | 70 | 90 | 60 | 80 | 70 | 90 |
| Electric resistance |  |  | S | S | S | S | S | S | S | S |
| Electrode adhesive |  |  | B | S | B | S | B | S | B | S |
| Hot peel strength |  |  | A | A | A | A | A | A | A | A |
| Ordinary temperature peel strength |  |  | A | A | A | A | A | A | A | A |
| Rate property |  |  | S | S | S | S | S | S | S | S |
| Cycle characteristic |  |  | B | S | B | S | B | S | B | S |

What is claimed is:

1. A separator for an electricity storage device comprising a porous substrate and a thermoplastic polymer layer disposed on at least one portion of an outermost surface of at least one side of the porous substrate,
wherein a thermoplastic polymer in the thermoplastic polymer layer contains a copolymer with a monomer unit of an ethylenic unsaturated monomer having a polyalkyleneglycol group in which an average number of repeating units for the alkyleneglycol units is 4 or more, and the thermoplastic polymer layer contains the thermoplastic polymer at more than 3 weight % and equal to or less than 100 weight %, based on 100 weight % of the thermoplastic polymer layer,
wherein the thermoplastic polymer is in particulate form, and
wherein a dispersion ($\sigma^2$) is 0.01 or more and 0.7 or less, as defined by the following formula, using the areas ($S_i$) of Voronoi polygons obtained by Voronoi tessellation of the thermoplastic polymer layer:

$$\sigma^2 = \sum_i \frac{\left(\frac{S_i}{m} - 1\right)^2}{n} \quad \text{[Mathematical Formula 1]}$$

wherein $S_i$ is the measured area of a given Voronoi polygon, m is average of the measured areas of Voronoi polygons, and n is the total number of Voronoi polygons.

2. The separator for an electricity storage device according to claim 1, wherein the thermoplastic polymer layer is configured to be directly bonded to an electrode.

3. The separator for an electricity storage device according to claim 1, wherein the substrate comprises at least a polyolefin.

4. The separator for an electricity storage device according to claim 1, wherein the substrate and the thermoplastic polymer layer are in direct contact.

5. The separator for an electricity storage device according to claim 1, which comprises the ethylenic unsaturated monomer having a polyalkyleneglycol group at 3 to 50 weight % in terms of the monomer unit in 100 weight % of the thermoplastic polymer composing the thermoplastic polymer layer.

6. The separator for an electricity storage device according to claim 5, wherein the copolymer has, as monomer units, 2 to 50 weight % of the ethylenic unsaturated monomer having a polyalkyleneglycol group and a monomer without a polyalkyleneglycol group that is copolymerizable with the ethylenic unsaturated monomer having a polyalkyleneglycol group, with respect to 100 weight % of the copolymer.

7. The separator for an electricity storage device according to claim 6, wherein the monomer without a polyalkyleneglycol group comprises at least one monomer selected from the group consisting of an ethylenic unsaturated monomer with a carboxyl group (b1), an ethylenic unsaturated monomer with an amide group (b2) and an ethylenic unsaturated monomer with a hydroxyl group (b3), at 0.1 to 10 weight % with respect to 100 weight % of the copolymer.

8. The separator for an electricity storage device according to claim 6, wherein the monomer without a polyalkyleneglycol group comprises a crosslinkable monomer (b4).

9. The separator for an electricity storage device according to claim 6, wherein the monomer without a polyalkyleneglycol group comprises an ethylenic unsaturated monomer with a cycloalkyl group (A) and a (meth)acrylic acid ester monomer (b5),
the (meth)acrylic acid ester monomer (b5) is a (meth)acrylic acid ester monomer comprising an alkyl group of 4 or more carbon atoms and a (meth)acryloyloxy group, and
the total content ratio of the ethylenic unsaturated monomer with a cycloalkyl group (A) and the (meth)acrylic acid ester monomer (b5) is 50 to 98 weight % based on 100 weight % of the copolymer.

10. The separator for an electricity storage device according to claim 1, wherein the coating area of the thermoplastic polymer layer is 95% or less.

11. The separator for an electricity storage device according to claim 1, wherein the value of blocking measured of the thermoplastic polymer layer is 20 N/m or less.

12. An electrode body comprising a positive electrode, the separator for an electricity storage device according to claim 1, and a negative electrode.

13. An electricity storage device comprising the electrode body according to claim 12 and an electrolytic solution.

14. The electricity storage device according to claim 13, wherein the thermoplastic polymer layer of the separator is directly bonded to the positive electrode or the negative electrode.

15. The electrode body according to claim 12, wherein the thermoplastic polymer layer of the separator is directly bonded to the positive electrode or the negative electrode.

16. The separator for an electricity storage device according to claim 1, wherein the average number of repeating units for the alkyleneglycol units is 100 or less.

17. The separator for an electricity storage device according to claim 1, wherein the thermoplastic polymer layer contains the thermoplastic polymer at 10 weight % or more and equal to or less than 100 weight %, based on 100 weight % of the thermoplastic polymer layer.

18. The separator for an electricity storage device according to claim 1, wherein the thermoplastic polymer layer contains the thermoplastic polymer at 20 weight % or more and equal to or less than 100 weight %, based on 100 weight % of the thermoplastic polymer layer.

* * * * *

UNITED STATES PATENT AND TRADEMARK OFFICE
CERTIFICATE OF CORRECTION

PATENT NO. : 10,985,354 B2
APPLICATION NO. : 15/776354
DATED : April 20, 2021
INVENTOR(S) : Hiroshi Miyazawa et al.

Page 1 of 1

It is certified that error appears in the above-identified patent and that said Letters Patent is hereby corrected as shown below:

On the Title Page

Item (30) Foreign Application Priority Data should read:
(30)     Foreign Application Priority Data
Aug. 24, 2016 (JP) .................................. JP2016-163955
Nov. 19, 2015 (JP) .................................. JP2015-226590

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*